US012721285B1

(12) United States Patent
Underhill

(10) Patent No.: US 12,721,285 B1
(45) Date of Patent: Sep. 1, 2026

(54) SPOON DEVICE, SYSTEM AND METHOD FOR RELOCATING AND TRANSPLANTING TREES

(71) Applicant: LTT SYSTEM, LLC, Barberville, FL (US)

(72) Inventor: Vann Underhill, Barberville, FL (US)

(73) Assignee: LTT SYSTEM LLC, Barberville, FL (US)

( * ) Notice: Subject to any disclaimer, the term of this patent is extended or adjusted under 35 U.S.C. 154(b) by 347 days.

(21) Appl. No.: 18/588,884

(22) Filed: Feb. 27, 2024

Related U.S. Application Data

(60) Provisional application No. 63/448,520, filed on Feb. 27, 2023.

(51) Int. Cl.
*A01G 23/04* (2006.01)

(52) U.S. Cl.
CPC .................................. *A01G 23/046* (2013.01)

(58) Field of Classification Search
CPC ............................................. A01G 23/02–046
USPC .......................................................... 111/101
See application file for complete search history.

(56) References Cited

U.S. PATENT DOCUMENTS 4,454,683 A * 6/1984 Schauer et al. ...... A01G 23/043 47/76
9,468,160 B2 10/2016 Underhill et al.
2003/0208957 A1* 11/2003 Meurer .................. A01G 23/04 47/73
2011/0073025 A1* 3/2011 Underhill et al. ... A01G 23/046 111/101

FOREIGN PATENT DOCUMENTS

KR 20150097268 A * 8/2015 ........... A01G 23/046
WO WO-9741722 A1 * 11/1997 ........... A01G 23/043

OTHER PUBLICATIONS

Yu Dong, Jin, Carrying Wood Jig Device (KR-20150097268-A), translation, all pages. (Year: 2015).*

* cited by examiner

*Primary Examiner* — Tara Mayo
(74) *Attorney, Agent, or Firm* — Terry M. Sanks, Esq.; Beusse Sanks, PLLC

(57) ABSTRACT

A tree spoon system for transplanting trees includes a spoon device attached to a machine. The spoon device interfaces with the machine via one or more hydraulic arms such that extension and retraction of the hydraulic arms alters the distance between the spoon device and the machine. The spoon device includes a box with two laterally opposing side walls and a movable pusher plate configured perpendicularly to the side walls. The movable pusher plate slides between the front and back of the box such that a tree's root ball may be received through a front opening of the box. One or more telescoping pusher arms are selectively locked to exert a pushing force on the movable pusher plate to move it towards the front opening of the box when the hydraulic arms are retracted and the box is pulled towards the machine while the movable pusher plate remains generally stationary.

20 Claims, 51 Drawing Sheets

BOM Table/Weldment Cut List

| ITEM NO. | PARTNUMBER | QTY. | DESCRIPTION | LENGTH | MATERIAL |
|---|---|---|---|---|---|
| 1 | MCS-241-1P1 | 1 | PLATE, 3/4" × 86" | 84 5/8" | ASTM A36 Steel |
| 2 | MCS-241-1P2 | 2 | PLATE, 1/2" × 30" | 86" | ASTM A36 Steel |
| 3 | MCS-241-1P3 | 2 | PLATE, 3/4" × 5 1/2" | 8 1/2" | ASTM A36 Steel |
| 4 | MCS-241-1P4 | 4 | PLATE, 3/4" × 5" | 8" | ASTM A36 Steel |
| 5 | MCS-241-1P5 | 6 | PLATE, 1/4" × 10" | 10" | ASTM A36 Steel |
| 6 | MCS-241-1P6 | 2 | PLATE, 1/2" × 10 1/2" | 72 7/16" | ASTM A36 Steel |
| 7 | MCS-241-1P7 | 8 | PLATE, 1/4" × 4" | 2 27/32" | ASTM A36 Steel |
| 8 | MCS-241-1P8 | 4 | PLATE, 1/4" × 3 3/4" | 4 1/32" | ASTM A36 Steel |
| 9 | MCS-241-1P9 | 11 | GUSSET, 1/2" × 2 1/2" | 2 1/2" | ASTM A36 Steel |
| 10 | MCS-241-1P10 | 4 | PLATE, 1/4" × 3 1/2" | 4 3/4" | ASTM A36 Steel |
| 11 | MCS-241-1P11 | 2 | ANGLE, L3×3×0.25 | 88 3/4" | ASTM A36 Steel |
| 12 | MCS-241-1P12 | 2 | ANGLE, L3×3×0.25 | 88 3/4" | ASTM A36 Steel |
| 13 | MCS-241-1P13 | 1 | ANGLE, L3×3×0.25 | 89" | ASTM A36 Steel |
| 14 | MCS-241-1P14 | 2 | ANGLE, L3×3×0.25 | 25 3/8" | ASTM A36 Steel |
| 15 | MCS-241-1P15 | 2 | CHANNEL, MC10×33.6 | 72 7/16" | ASTM A36 Steel |
| 16 | MCS-241-1P16 | 2 | TUBING, TS4×4×0.25 | 3 3/4" | A500 |
| 17 | MCS-241-1P17 | 2 | TUBING, TS2×2×0.25 | 3 1/4" | ASTM A36 Steel |
| 18 | MCS-241-1P18 | 2 | TUBING, TS2×2×0.25 | 3" | ASTM A36 Steel |

FIG. 4A

DETAIL A
SCALE 1:6

BOM Table/Weldment Cut List

| ITEM NO. | PARTNUMBER | QTY. | DESCRIPTION | LENGTH | MATERIAL |
|---|---|---|---|---|---|
| 1 | MCS-241-1P1 | 1 | PLATE, 3/4" × 86" | 84 1/8" | ASTM A36 Steel |
| 2 | MCS-241-1P2 | 2 | PLATE, 1/2" × 30" | 86" | ASTM A36 Steel |
| 3 | MCS-241-1P3 | 2 | PLATE, 3/4" × 5 1/2" | 8 1/2" | ASTM A36 Steel |
| 4 | MCS-241-1P4 | 4 | PLATE, 3/4" × 5" | 8" | ASTM A36 Steel |
| 5 | MCS-241-1P5 | 6 | PLATE, 1/4" × 10" | 10" | ASTM A36 Steel |
| 6 | MCS-241-1P6 | 2 | PLATE, 1/2" × 10 1/2" | 72 7/16" | ASTM A36 Steel |
| 7 | MCS-241-1P7 | 8 | PLATE, 1/4" × 4" | 2 27/32" | ASTM A36 Steel |
| 8 | MCS-241-1P8 | 4 | PLATE, 1/4" × 3 3/4" | 4 1/32" | ASTM A36 Steel |
| 9 | MCS-241-1P9 | 11 | GUSSET, 1/2" × 2 1/2" | 2 1/2" | ASTM A36 Steel |
| 10 | MCS-241-1P10 | 4 | PLATE, 1/4" × 3 1/2" | 4 3/4" | ASTM A36 Steel |
| 11 | MCS-241-1P11 | 4 | ANGLE, L3×3×0.25 | 88 3/4" | ASTM A36 Steel |
| 12 | MCS-241-1P12 | 1 | ANGLE, L3×3×0.25 | 89" | ASTM A36 Steel |
| 13 | MCS-241-1P13 | 2 | ANGLE, L3×3×0.25 | 27 5/16" | ASTM A36 Steel |
| 14 | MCS-241-1P14 | 1 | CHANNEL (RH), MC10×28.5 | 72 7/16" | ASTM A36 Steel |
| 15 | MCS-241-1P15 | 1 | CHANNEL (LH), MC10×28.5 | 72 7/16" | ASTM A36 Steel |
| 16 | MCS-241-1P16 | 2 | TUBING, TS4×4×0.25 | 3 3/4" | A500 |
| 17 | MCS-241-1P17 | 2 | PLATE, 1/2" × 9 1/2" | 31" | ASTM A36 Steel |

FIG. 5A

DETAIL A
SCALE 1:6

| BOM Table | | | | | |
|---|---|---|---|---|---|
| ITEM NO. | PART NUMBER | QTY. PER | Description | Length | Material |
| 1 | MCS-241-1 | 1 | SIDE WELDMENT | 7" | ASTM A36 Steel |
| 2 | MCS-241-2 | 1 | PUSHER PLATE WELDMENT | 83" | ASTM A36 Steel |
| 3 | MCS-241-3 | 2 | TELSECOPING PUSHING ARM | | SEE B.O.M |
| 4 | MCS-241-4 | 2 | CLEVIS WELDMENT | | TYPE 316L |
| 5 | 98306A767 | 4 | 1004-1045 Carbon Steel Clevis Pin | | 1004-1045 Carbon Steel |
| 6 | MCS-241-forklift | 1 | SIDE WELDMENT | 7" | ASTM A36 Steel |

FIG. 6A

SECTION A-A

| BOM Table/Weldment Cut List | | | | | |
|---|---|---|---|---|---|
| ITEM NO. | PARTNUMBER | QTY. | DESCRIPTION | LENGTH | MATERIAL |
| 1 | MCS-241-2P1 | 1 | PLATE, 1/2" × 30" | 83” | ASTM A36 Steel |
| 2 | MCS-241-2P2 | 1 | PLATE, 1/2" × 8" | 78" | ASTM A36 Steel |
| 3 | MCS-241-2P3 | 1 | PLATE, 1/2" × 8" | 76" | ASTM A36 Steel |
| 4 | MCS-241-2P4 | 1 | PLATE, 1/2" × 4 3/4" | 78" | ASTM A36 Steel |
| 5 | MCS-241-2P5 | 1 | PLATE, 1/2" × 4 3/4" | 76" | ASTM A36 Steel |
| 6 | MCS-241-2P6 | 4 | ANGLE, L4×4×0.375 | 12" | ASTM A36 Steel |
| 7 | MCS-241-2P7 | 2 | TUBING, TS2×2×0.25 | 5 5/8" | ASTM A36 Steel |

FIG. 7A

| BOM Table/Weldment Cut List | | | | | |
|---|---|---|---|---|---|
| ITEM NO. | PARTNUMBER | QTY. | DESCRIPTION | LENGTH | MATERIAL |
| 1 | MCS-241-2P1 | 1 | PLATE, 1/2" × 30" | 83" | ASTM A36 Steel |
| 2 | MCS-241-2P2 | 4 | ANGLE, L4×4×0.375 | 10 1/2" | ASTM A36 Steel |
| 3 | MCS-241-2P3 | 2 | WEAM, W8×48 | 81" | ASTM A36 Steel |
| 4 | MCS-241-2P4 | 2 | WEAM, W8×48 | 18 19/32" | ASTM A36 Steel |
| 5 | MCS-241-2P5 | 4 | PLATE, 3/4" × 4" | 4" | ASTM A36 Steel |
| 6 | | 4 | Press-Fit Drill Bushings with Head | | Steel |

FIG. 8A

BOM Table

| ITEM NO. | PART NUMBER | Pc Mark | QTY. PER | TYPE | Description | Length | Finish | Material |
|---|---|---|---|---|---|---|---|---|
| 1 | MCS-241-3P1 | | 1 | TS | Tube square TS5×5×0.375 | 43" | | ASTM A36 Steel |
| 2 | MCS-241-3P2 | | 1 | TS | Tube square TS4×4×0.375 | 43” | | ASTM A36 Steel |
| 3 | MCS-241-3P3 | | 2 | PL | LIFTING HALDLE, Ø1” | 19 1/4" | | ASTM A36 Steel |
| 4 | 98306A763 | | 2 | | 1004-1045 Carbon Steel Clevis Pin | 6" | | 1004-1045 Carbon Steel |

FIG. 9A

| BOM Table/Weldment Cut List | | | | | |
|---|---|---|---|---|---|
| ITEM NO. | PARTNUMBER | QTY. | DESCRIPTION | LENGTH | MATERIAL |
| 1 | MCS-241-5P1 | 2 | PLATE, 3/4" THK | 26 25/32" | TYPE 316L |
| 2 | MCS-241-5P2 | 1 | PLATE, 3/4" THK | 24" | TYPE 316L |
| 3 | MCS-241-5P3 | 2 | PLATE, 3/4" THK × 4 1/2" | 7" | TYPE 316L |
| 4 | MCS-241-5P4 | 2 | PLATE, 3/4" THK | 5 9/16" | TYPE 316L |
| 5 | 31435A711 | 2 | Press-Fit Drill Bushings with Head | | Steel |

SPOON DEVICE, SYSTEM AND METHOD FOR RELOCATING AND TRANSPLANTING TREES

CROSS-REFERENCE TO RELATED APPLICATIONS

This application claims the benefit of U.S. Provisional Application No. 63/448,520 filed Feb. 27, 2023, the entirety of which is incorporated by reference.

BACKGROUND

Embodiments relate to a spoon device, system and method for relocating and transplanting trees, and especially mature trees.

Transplanting large and/or mature trees in a vertical orientation can be a challenge. An example system is described in U.S. Pat. No. 9,468,160, titled "Method and System for Transplanting Large Trees," which is incorporated herein by reference in full.

Protecting the root ball is important for the survival of a dug up mature tree. This may include limited touching of the root ball and maintaining the ground around the root ball intact so that the ground does not crumble away.

There is a need to improve the digging, transporting, and transplanting of a mature tree.

BRIEF SUMMARY

Embodiments relate to a spoon device, system, and method for relocating and transplanting trees or other plants, and especially mature trees.

An aspect of the embodiments comprises a spoon device with extendable telescopic arms coupled to a dependent machine configured to push on at least one movable pusher plate to offload a tree and root ball at a transplant location while maintaining ground and earth material around a root ball compacted as the tree is offloaded.

An aspect of the embodiments comprises a spoon device with at least one movable pusher plate that provides a floating barrier to keep ground and earth material around a root ball compacted as the root ball and tree are dug up and moved onto the spoon device.

An aspect of the embodiments comprises a system with a fork carriage configured to be coupled to a machine and a spoon device with a three-sided bowl or box. The carriage includes two or more forks configured to be inserted into a plurality of fork receiving tubes of the bowl/box. The carriage includes couplers or fasteners configured to selectively connect extendable telescopic arms. The spoon device includes at least one movable pusher plate configured to offload a tree and root ball at a transplant location while maintaining ground and earth material around a root ball compacted as the tree is offloaded.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4A illustrates a list of parts for a three-sided box of FIGS. 4B-4G in accordance with one embodiment.

FIG. 5A illustrates a parts list for a three-sided box of FIGS. 5B-5G in accordance with one embodiment.

FIG. 6A illustrates parts list for a tree spoon system of FIGS. 6B-6E in accordance with one embodiment.

FIG. 7A illustrates a parts list for the movable pusher plate of FIGS. 7B-7F in accordance with one embodiment.

FIG. 8A illustrates a parts list for FIGS. 8B-8G in accordance with one embodiment.

FIG. 9A illustrates a parts list for the telescoping pusher arm of FIGS. 9B-9F in accordance with one embodiment.

FIG. 10A illustrates a parts list of a clevis fastener in FIGS. 10B-10F in accordance with one embodiment.

DETAILED DESCRIPTION

Figure 1A:
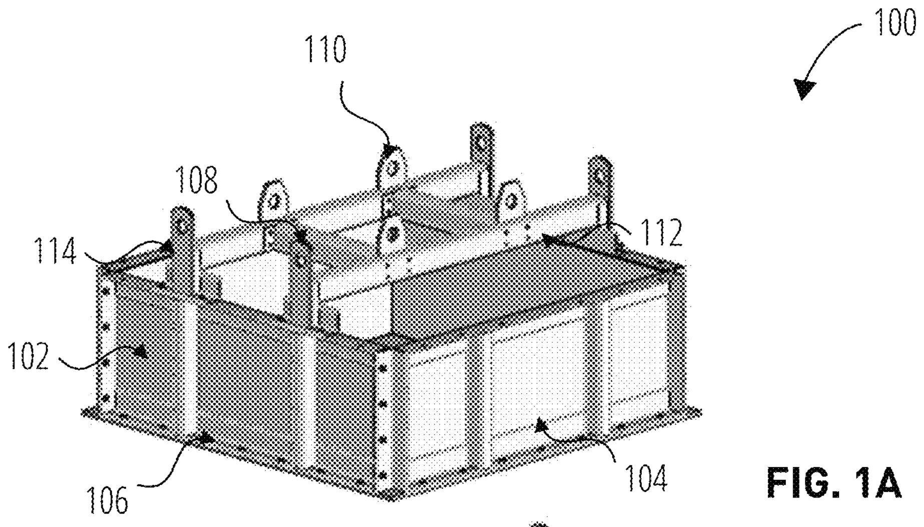
FIG. 1A illustrates a perspective view of a box with lifting apparatus in accordance with one embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.14. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

In some aspects, the spoon device may comprise a three-sided steel box with a steel base plate that is configured to hydraulically dig planted trees for relocation and transport to another location.

In some implementations, the spoon device is configured to dig a tree root structure which mirrors its natural root profile.

In some embodiments, utilization of the spoon device eliminates lower branching structure interference and breakage of limbs.

In some aspects, the spoon device is configured to smoothly cut any top root roots.

In some implementations, utilization of the spoon device is configured to allow a tree to never be physically handheld directly by its trunk or root ball during the digging process.

In some embodiments, the spoon device is configured to provide a flat base for the root ball that reduces or eliminates settling once planted.

In some aspects, utilization of the spoon device increases user productivity without compromising the health of the tree post planting.

In some implementations, the spoon device negates traditional diameter of the spade to depth ratio.

In some embodiments, the spoon device comprises at least one movable pusher plate, wherein the plate is used to reverse the action of digging up and moving the tree to place the tree back into the ground. In some aspects, the box may comprise at least one cutting blade as well as a lifting apparatus for longer distance transportation to a transplant destination location.

FIG. 1A illustrates a perspective view of a box 100 with lifting apparatus 112 in accordance with one embodiment. In some embodiments, the tree is transported to a remote location via a transportation vehicle that may include a shipping truck or other road or highway transportation vehicle to transport a dug up tree. In some non-limiting exemplary implementations, the box 100 may comprise a substantially square shape with sides that are approximately 7 feet long, 10 feet long, or any appropriate dimensions for facilitating the digging, moving, and planting of a tree and the tree's root ball. In some aspects, one or more portions of the box 100 may be rounded or curved, such that the box 100 may comprise a bowl-like structure or appearance. In some non-limiting exemplary embodiments, a tree may be transported locally or a minimum distance, such as, for example, within the same farm or nursery, via the box 100 without requiring the use of a road or highway vehicle.

Figure 1B:
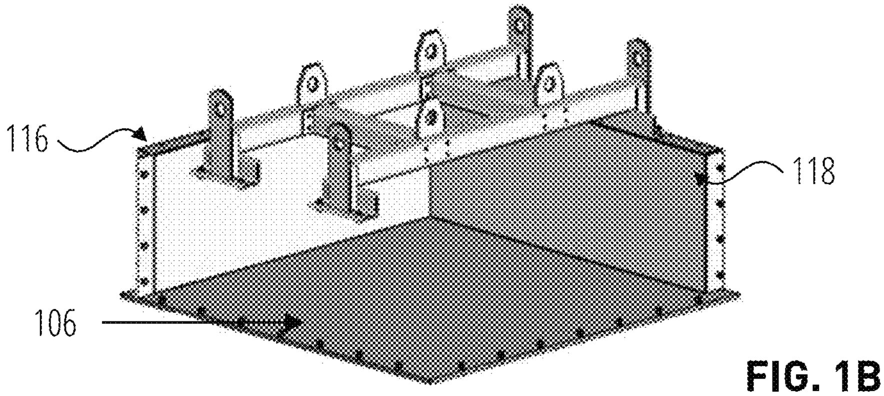
FIG. 1B illustrates the box of FIG. 1A with two walls removed in accordance with one embodiment where the two missing walls have been removed to show a better view of a top lifting apparatus.
Figure 2:
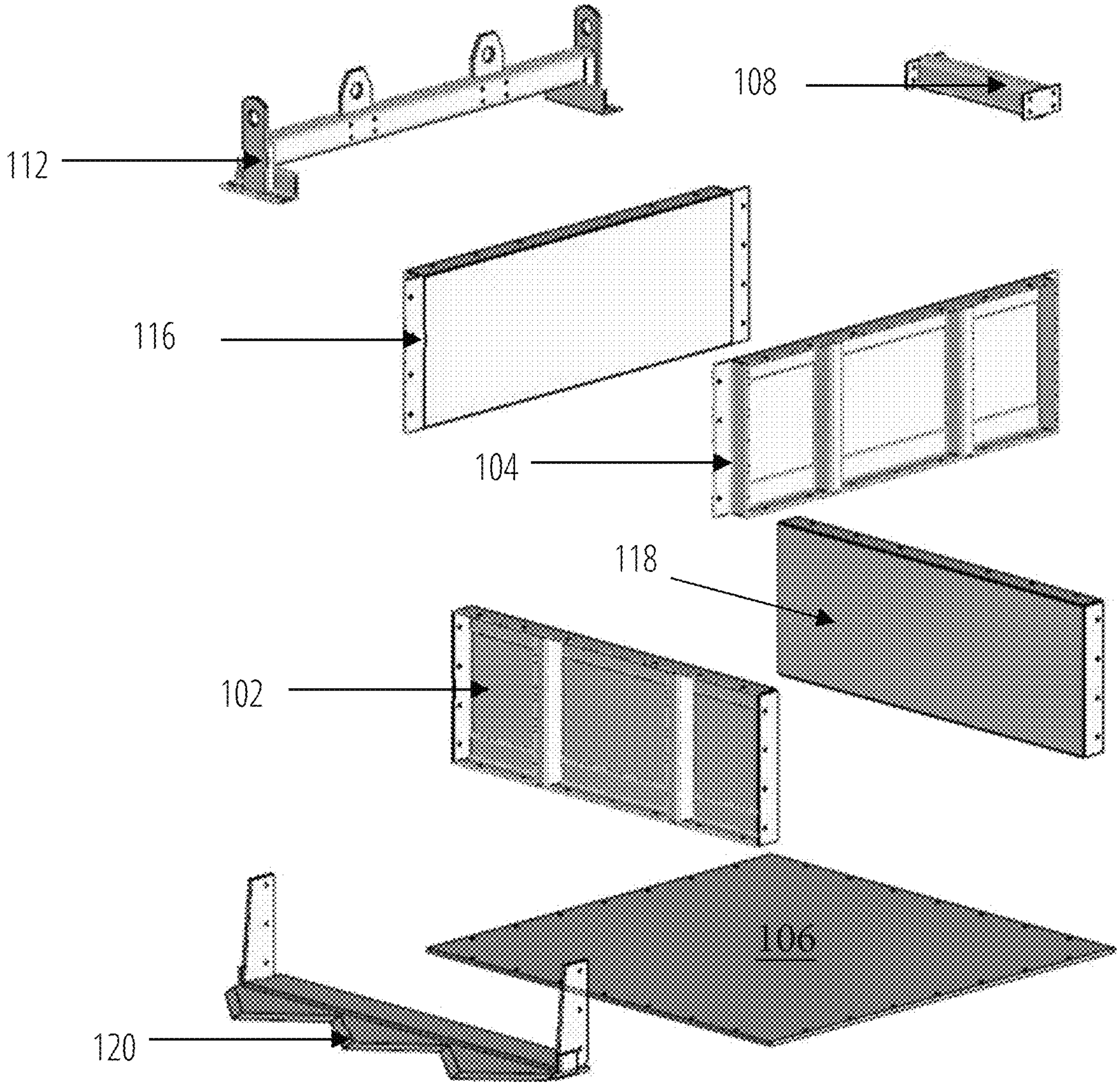
FIG. 2 illustrates parts of the box of FIG. 1A in accordance with one embodiment.

FIG. 2 illustrates parts of the box 100 of FIG. 1A in accordance with one embodiment. In some aspects, the box 100 includes a first side wall 102 and a second side wall 104, perpendicular to the first side wall 102. The box 100 includes a base plate or bottom surface 106. In some implementations, the box 100 may include a top lifting apparatus 112 that is affixed to connectors 110 via cross bars 108. The connectors 110 are connected to third side wall 116 (FIG. 1B). The top lifting apparatus 112 may connect to connectors 114 coupled to the top edge of the first side wall 102. In some embodiments, the base plate or bottom surface 106 may comprise two or more pieces connected together. In some aspects, the lifting apparatus 112 may be attached to the box 100 after the tree is dug up so that it may be lifted and transported to a remote destination location for replanting.

FIG. 1B illustrates the box 100 of FIG. 1A with two walls removed in accordance with one embodiment where the two missing sides have been removed to show a better view of top lifting apparatus 112. In some implementations, the box 100 includes a third side wall 116 and a fourth side wall 118, each perpendicular to the first side wall 102 and second side wall 104, respectively.

Figure 1C:
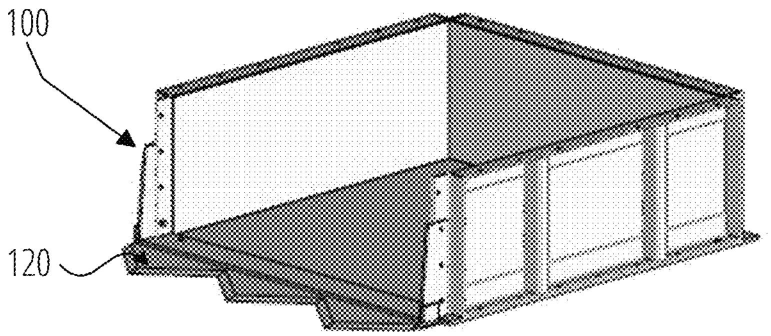
FIG. 1C illustrates the box with a serrated cutting blade attached for digging operation in accordance with one embodiment.

FIG. 1C illustrates the box 100 with a serrated cutting blade 120 attached for digging operation in accordance with one embodiment. In some aspects, the serrated cutting blade 120 may be removably attached to a front end of the base plate or bottom surface 106, such as, for example and not limitation, after side wall 102 is removed. FIG. 1C illustrates a three-sided bowl configuration of the box 100. In some implementations, the first side wall 102 may be selectively used to close the front of the box 100. The serrated cutting blade 120 may be removed from the box 100, in some embodiments.

Figure 20A:
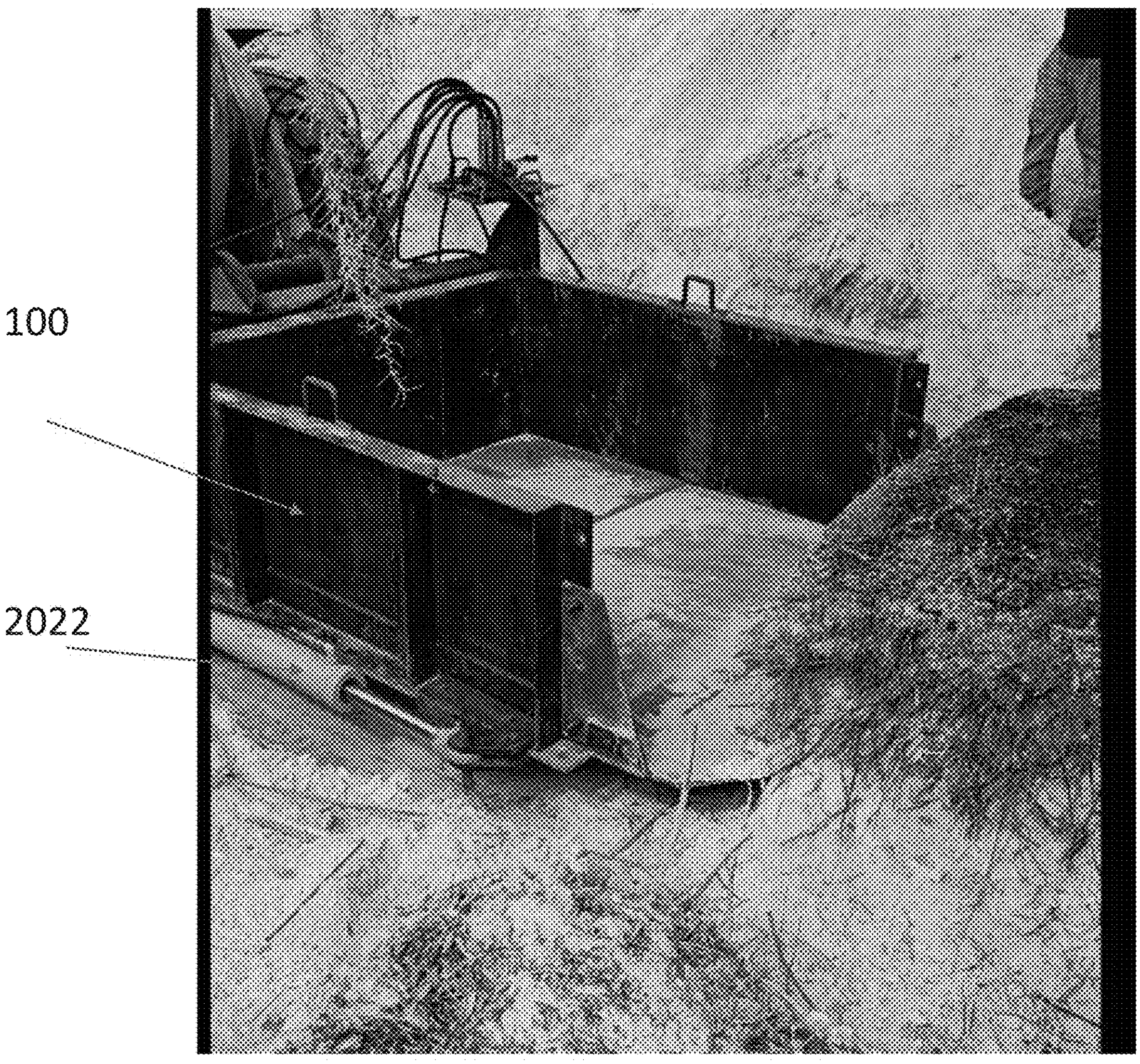
FIG. 20A illustrates a first step of digging a tree with a tree spoon system with the box in FIGS. 1A-1C in accordance with one embodiment.
Figure 20B:
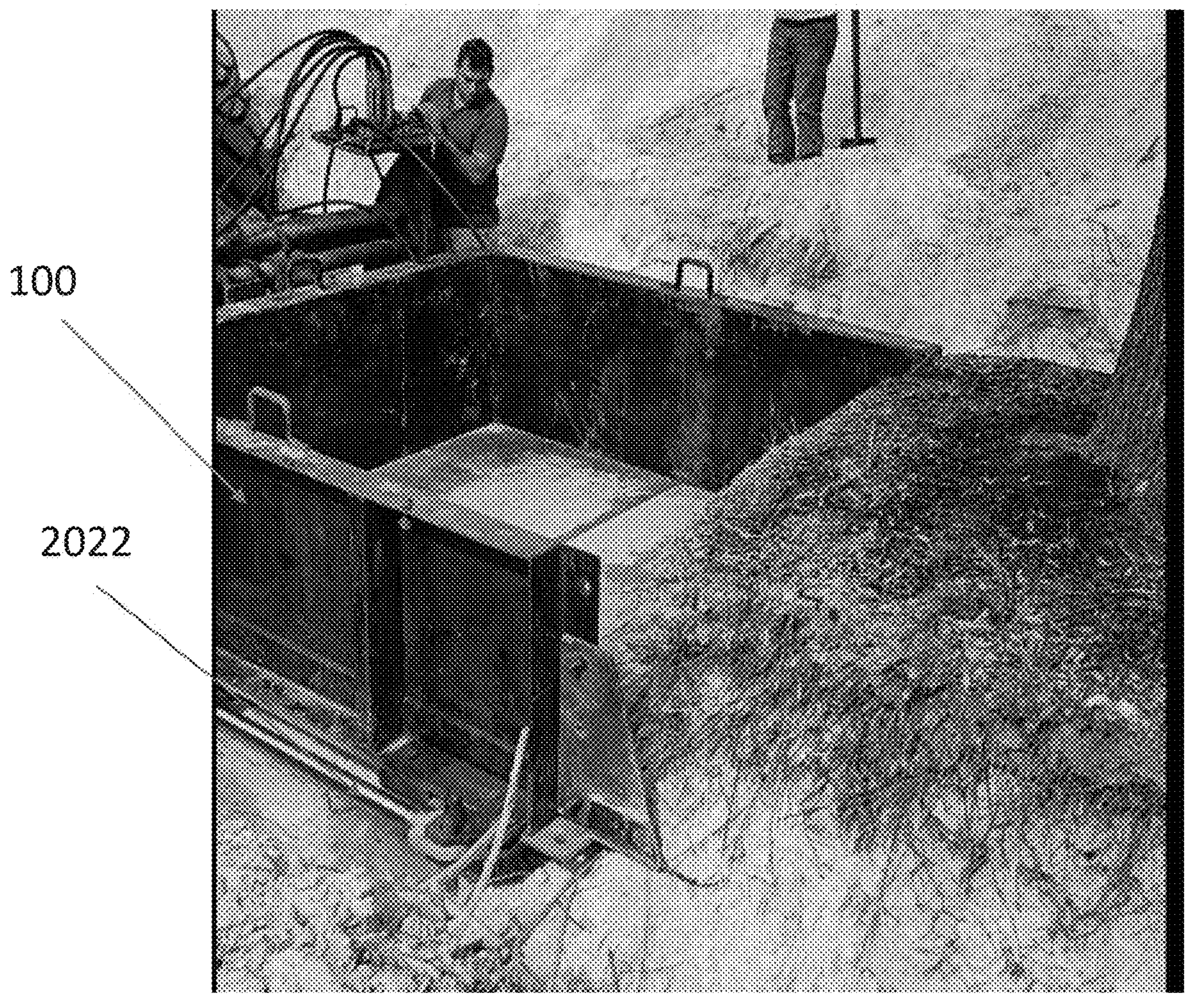
FIG. 20B illustrates an intermediate step of digging a tree in accordance with one embodiment with the box of FIGS. 1A-1C.
Figure 20C:
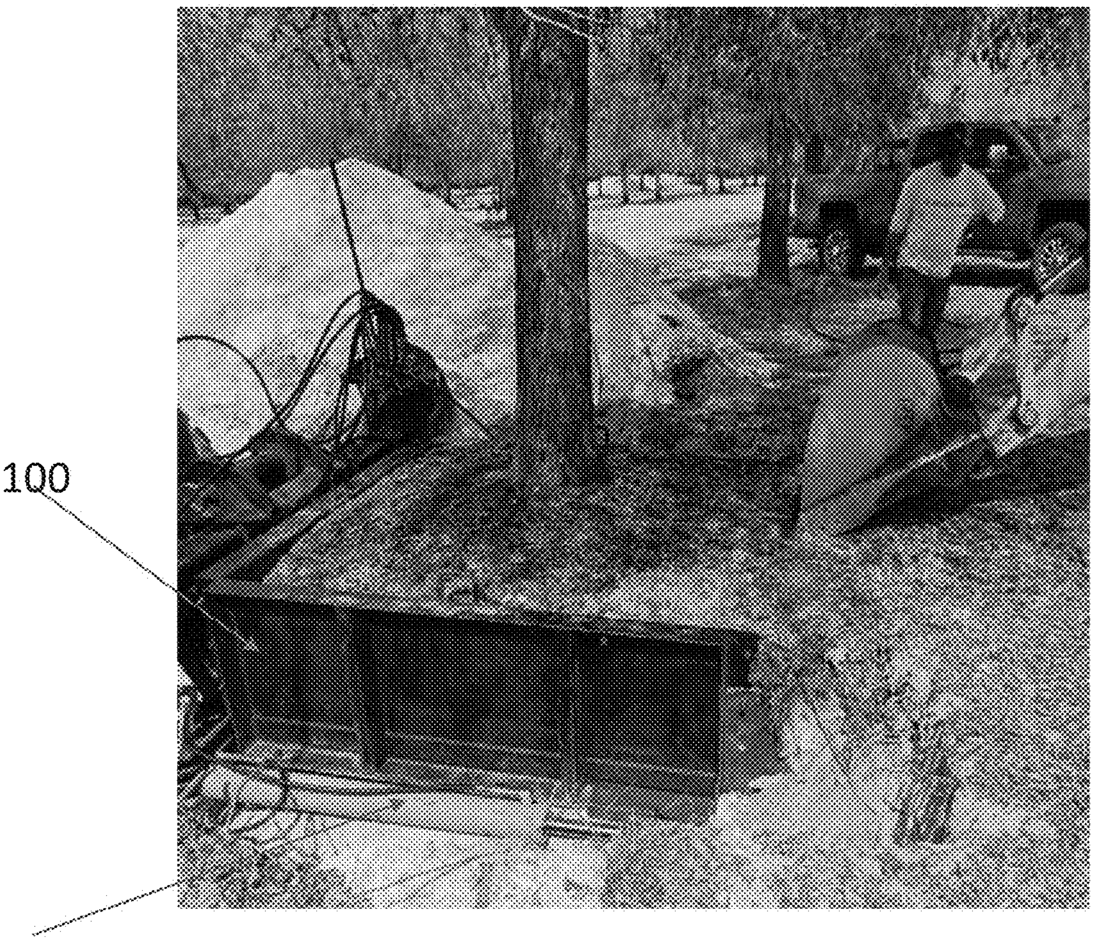
FIG. 20C illustrates an intermediate step of digging a tree in accordance with one embodiment with the box of FIGS. 1A-1C where the root ball is completely received within the box.

In some non-limiting exemplary implementations, the box 100 may be used in a manner as shown in FIGS. 20A-20C.

In some aspects, a tree that has been excavated from a first, origination location may be transported locally or a short distance to a second, destination location without the need for long hauling on roads and highways such that the box 100 may not comprise the lifting apparatus 112 as the lifting apparatus 112 is not needed. In some implementations, the box 100 may be used for moving trees at the same location as opposed to placing them on a truck or other vehicle and transporting the trees to a second local destination location.

Figure 3:
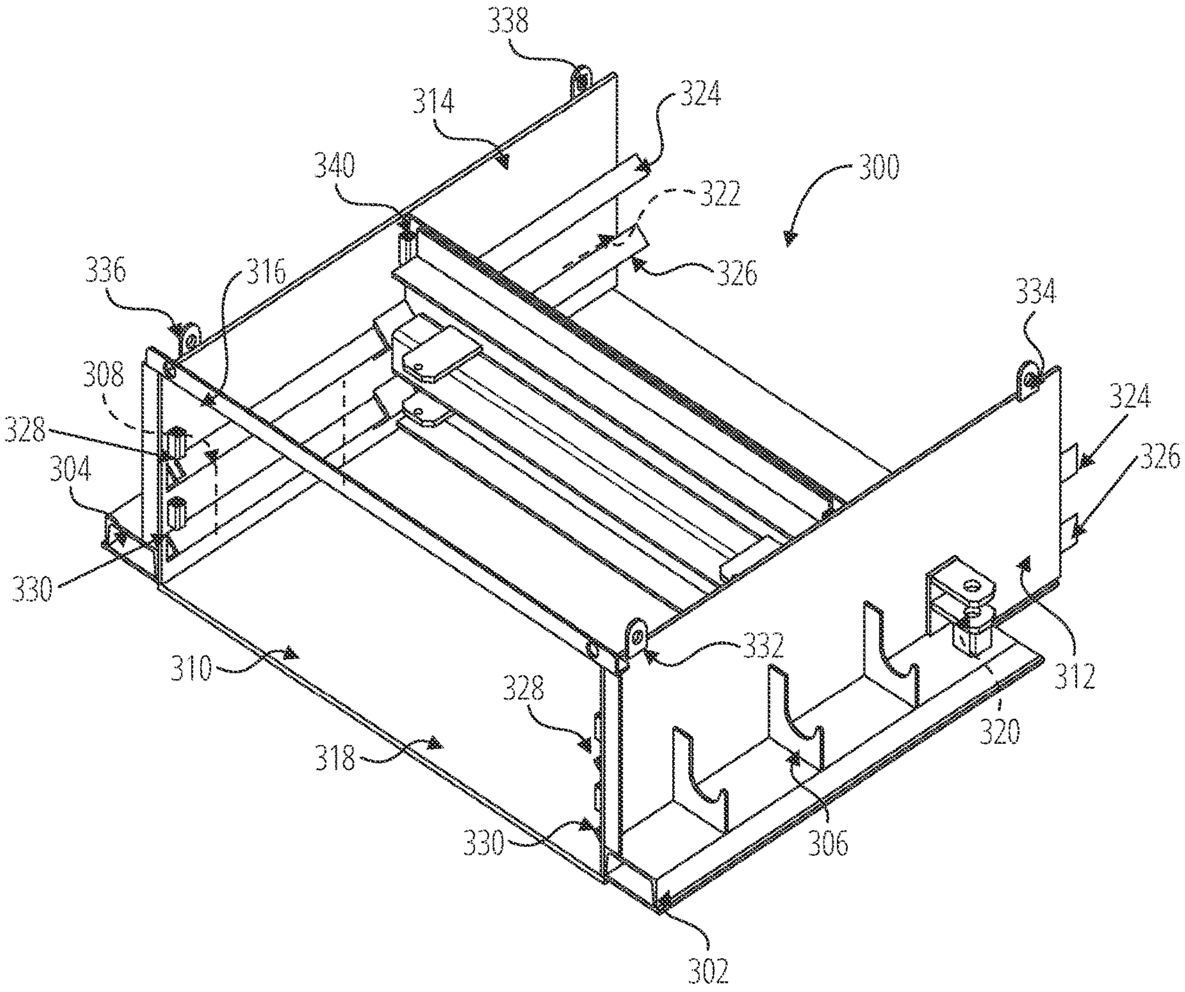
FIG. 3 illustrates a top perspective view of a spoon device with a movable pusher plate in an intermediate position in accordance with one embodiment.

FIG. 3 illustrates a top perspective view of a spoon device 300 with a movable pusher plate 340 in an intermediate position in accordance with one embodiment. In some aspects, the spoon device 300 may comprise a three-sided bowl or box 310 with laterally opposing side walls 312 and 314 and a horizontal back stop 316. In some implementations, the back stop 316 may comprise a horizontal bar or rod that is perpendicularly coupled in proximity to top edges of the side walls 312 and 314. The three-sided box 310 comprises a bottom surface 318 that may be perpendicularly coupled to the bottom edges of the side walls 312 and 314. In some embodiments, the spoon device 300 may comprise a plurality of elongated tubes 302, 304, wherein the plurality of elongated tubes 302, 304 may at least comprise a first elongated tube 302 and a second elongated tube 304. In some aspects, the first elongated tube 302 may be configured adjacent to a first side wall 312 and the second elongated tube 304 may be configured adjacent to a second side wall 314. In some implementations, each of the elongated tubes

302, 304 may be constructed and arranged to removably receive a fork of a fork carriage of a forklift accessory, as will be described in more detail in relation to FIG. 6B and FIG. 6D. The elongated tubes 302, 304 may sometimes be referred to as fork receiving tubes.

In some aspects, the spoon device 300 may comprise one or more supports 306, 308. In some implementations, one or more supports 306 may be configured to connect and brace the first elongated tube 302 to the first side wall 312 and one or more supports 308 may configured to connect and brace the second elongated tube 304 to the second side wall 314. The supports 308 are shown in phantom.

In some embodiments, the spoon device 300 may comprise one or more plates 320, 322. In some implementations, one or more plates 320 may be configured to radiate from the first lateral side 312 at a location above the first elongated tube 302. In some aspects, the plates 320 may comprise a pair of plates configured to be parallel and in space relation. In some implementations, each of the plates 320 may comprise a hole formed at or near the center thereof. In some embodiments, the plates 320 may be configured near the front end of the first elongated tube 302. In some implementations, the plates 322 may be configured to radiate from the second lateral side 314 at a location above the second elongated tube 304. In some aspects, the plates 322 may be configured near the front end of the second elongated tube 304. As a frame of reference, the "front end" is in proximity to the front of the three-sided box 310, where an opening is defined by the front edges of the first side wall 312 and the second side wall 314, wherein the first side wall 312 may be substantially parallel to the second side wall 314. One of the plates 322 is shown in phantom.

In some implementations, each of the side walls 312, 314 may comprise one or more elongated channels 324, 326 that are configured to be substantially parallel and in space relation along an interior surface of each of the side walls 312, 314. In some embodiments, the spoon device 300 may comprise one or more vertical back stops 328, 330. In some aspects, one or more vertical back stops 328, 330 may be positioned in proximity to a rear or back side of the side walls 312, 314.

In some embodiments, the spoon device 300 may comprise at least one movable pusher plate 340 that may be front mounted and configured to move between the front and the back or rear of three-sided box 310 such that the movable pusher plate 340 may be substantially perpendicular to the first and second side walls 312, 314 and configured to extend at least partially between the first and second side walls 312, 314. In some aspects, the movable pusher plate 340 may be configured to extend completely between the first and second side walls 312, 314 such that at least a portion of the opposing lateral ends of the movable pusher plate 340 may be proximate to or may physically contact an interior surface of the first and second side walls 312, 314. In some embodiments, the movable pusher plate 340 may be configured to be temporarily secured to the back stop 316. In some implementations, once the movable pusher plate 340 is installed, the three-sided box 310 may be configured as a shovel apparatus that may be used, for example and not limitation, to dig up or excavate a root ball of a tree. In some aspects, the movable pusher plate 340 may comprise a floating barrier configured to keep ground and earth material compacted around a root ball of a tree as the tree is received by or removed from the three-sided box.

In some embodiments, the elongated channels 324, 326 may be configured to extend beyond the front edge of the side walls 312, 314. In some aspects, this may allow the movable pusher plate 340 to mate with and be installed on the elongated channels 324 and 326 outside of the three-sided box 310 and moved along the channels 324 and 326 to the back stop 316 of three-sided box 310. In some implementations, the movable pusher plate 340 together with the side walls 312, 314 and bottom surface 318 may define the overall shape of the three-sided box 310. The movable pusher plate 340 will be described in relation to FIGS. 7A-7F. The three-sided box 310 comprises three vertically oriented sides such that the three-sided box may be configured to capture dirt and the root ball of a tree during a digging or excavation operation. The bottom surface 318 closes the bottom side of the three-sided box 310 to define a volume of space within an interior portion of the three-sided box 310.

In some aspects, the movable pusher plate 340 may be configured to achieve translational movement along a longitudinal axis parallel to the first and second side walls 312, 314 by sliding along the elongated channels 324 and 326 via the application of one or more forces between the front and back of the three-sided box 310 within the interior portion of the three-sided box 310. In some implementations, once the movable pusher plate 340 reaches the vertical back stops 328 and 330, the movable pusher plate 340 may be stopped via physical contact therewith and be configured at an initial installation position.

In some embodiments, the spoon device may comprise at least one serrated cutting blade (such as, for example and not limitation, cutting blade 120 of FIG. 1C). In some aspects, the blade (i.e., blade 120) may be configured to be at least temporarily affixed or secured to the front end of the three-sided box 310, such as, for example and not limitation, at least a portion of the bottom surface 318, to facilitate cutting through the ground and lower roots of a tree's root ball.

Figure 4B:
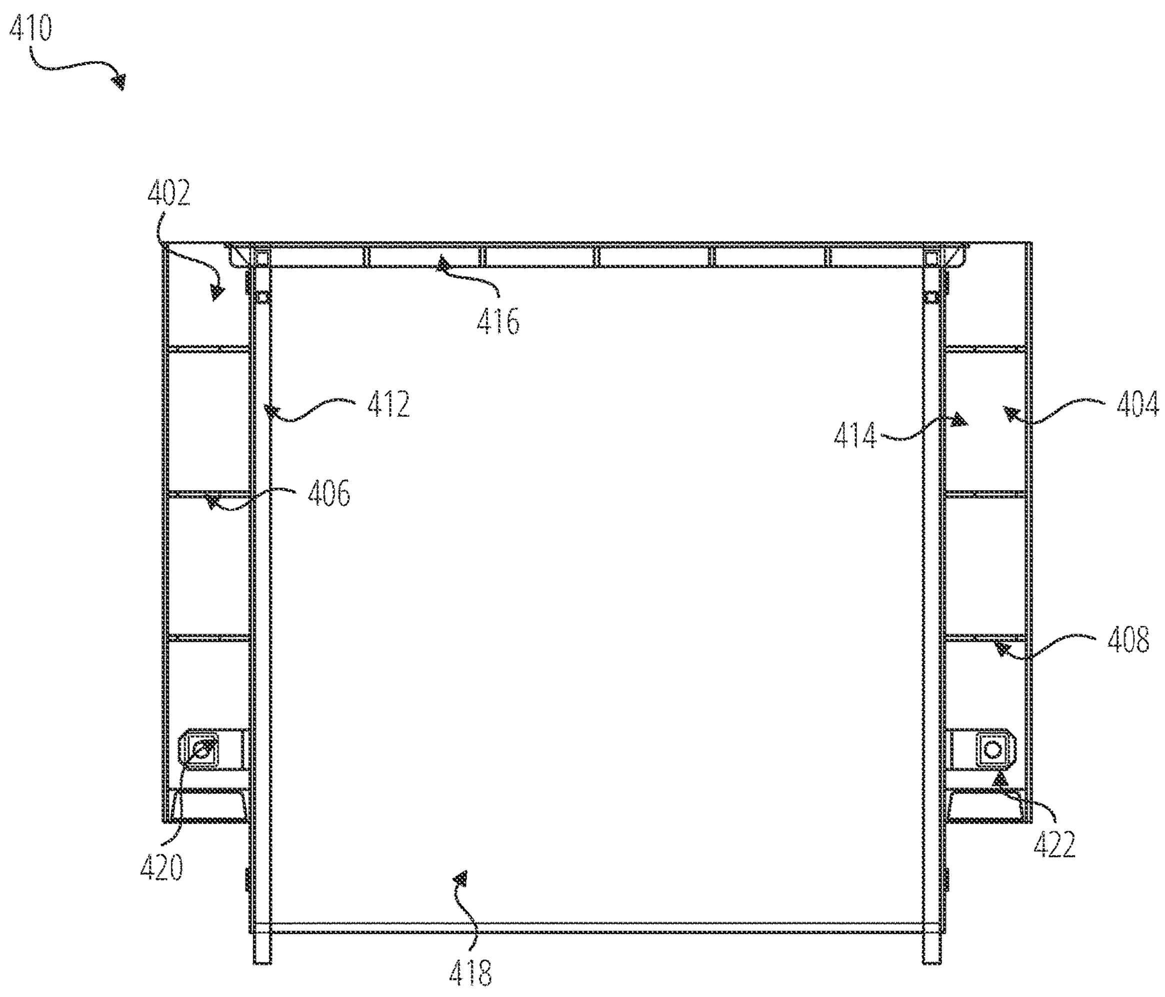
FIG. 4B illustrates a top view of a three-sided box with the movable pusher plate removed in accordance with one embodiment.

FIG. 4A illustrates a list of parts for a three-sided box 410 of FIGS. 4B-4G in accordance with one embodiment. FIGS. 4B-4G are different views of the three-sided box 410 with the movable pusher plate removed. To avoid overcrowding in the figures, only some components of the three-sided box 410 will be referenced and described in a particular figure.

FIG. 4B illustrates a top view of the three-sided bowl 410 with the removable pusher plate removed in accordance with one embodiment. In some aspects, the three-sided bowl 410 may comprise lateral opposing side walls 412, 414 and a horizontal back stop 416. In some implementations, the back stop 416 may comprise a bar or rod that may be perpendicularly coupled to upper ends of the side walls 412, 414. The three-sided bowl 410 comprises a bottom surface 418 that is may be perpendicularly coupled to the bottom edges of side walls 412, 414. In some embodiments, the three-sided box 410 may comprise a plurality of elongated tubes 402, 404, wherein the plurality of elongated tubes 402, 404 may comprise at least a first elongated tube 402 and a second elongated tube 404. In some implementations, the first elongated tube 402 may be configured adjacent to a first side wall 412 and second elongated tube 404 may be configured adjacent to second side wall 414. In some embodiments, each of the elongated tubes 402, 404 may be constructed and arranged to receive a fork of a fork carriage of a forklift accessory, as will be described in more detail in relation to FIG. 6B and FIG. 6D.

In some implementations, the three-sided box 410 may comprise one or more supports 406, 408. In some aspects, one or more supports 406 may be configured to connect and brace the first elongated tube 402 to the first side wall 412 and one or more supports 408 may be configured to connect and brace the second elongated tube 404 to the second lateral side 414. In some embodiments, the supports 406, 408 may include a cradle or similar structure configured to support and hold a hydraulic arm, as will be discussed in relation to FIGS. 6F-6G.

In some aspects, the three-sided box 410 may comprise one or more plates 420, 422. In some implementations, a first plate 420 may be configured to radiate from the first side wall 412 at a location above the first elongated tube 402. In some embodiments, the first plate 420 may be configured at or near the front end of the first elongated tube 402. In some aspects, a second plate 422 may be configured to radiate from the second side wall 414 at a location above the second elongated tube 404. In some implementations, the second plate 422 may be configured at or near the front end of the second elongated tube 404.

Figure 4C:
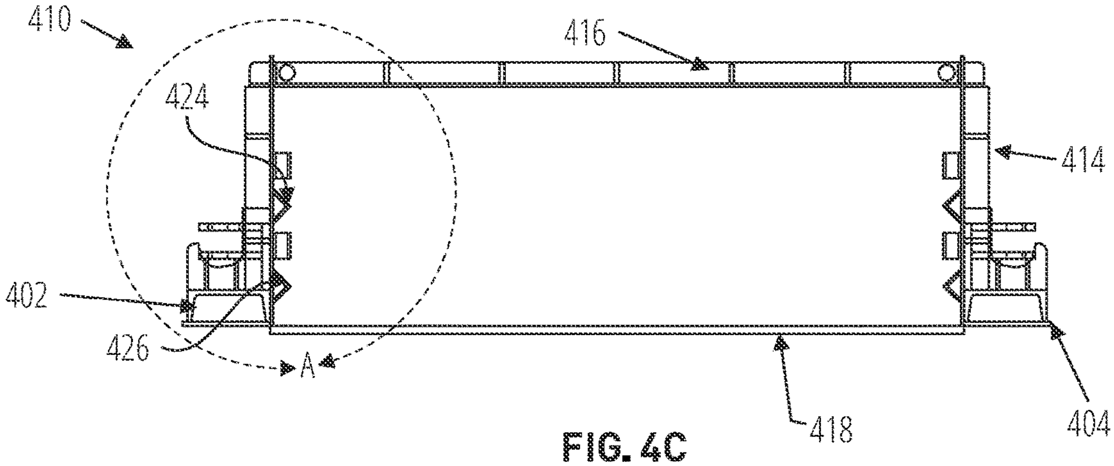
FIG. 4C illustrates an end view of the three-sided box of FIG. 4B in accordance with one embodiment.

FIG. 4C illustrates an end view of the three-sided box 410 FIG. 4B in accordance with one embodiment. In some aspects, the interior surface of each side wall 412, 414 may comprise one or more elongated channels 424, 426 that are parallel and in space relation and may serve as a rail such that one or more tracks of a movable pusher plate may be configured to mate with the elongated channels 424, 426 when the removable pusher plate is installed to enable the movable pusher plate to move between the front and the rear or back of the three-sided box 410.

Figure 4D:
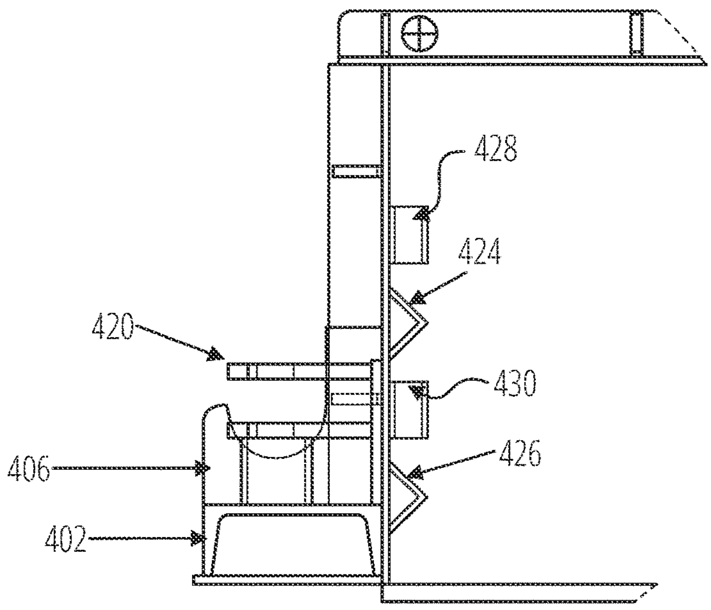
FIG. 4D illustrates detail A view of FIG. 4C in accordance with one embodiment.

FIG. 4D illustrates a detail A view of FIG. 4C in accordance with one embodiment. In some aspects, three-sided box 410 may comprise one or more blocks 428, 430 or similar structures. In some implementations, the blocks 428, 430 may be coupled to the interior side of the first side wall 412. In some embodiments, the block 428 may be configured parallel to and above a first elongated channel 424. In some implementations, the block 430 may be configured parallel to and below the first elongated channel 424 and parallel to and above a second elongated channel 426. As seen in FIG. 4D, the supports 406 may comprise a generally J-shape to brace the first elongated tube 402 and the first side wall 412 together. In this view, the opening into the first elongated tube 402 can be seen. The supports 406 and 408 are essentially the same, except for being configured on opposite sides of the spoon device 400.

Figure 4E:
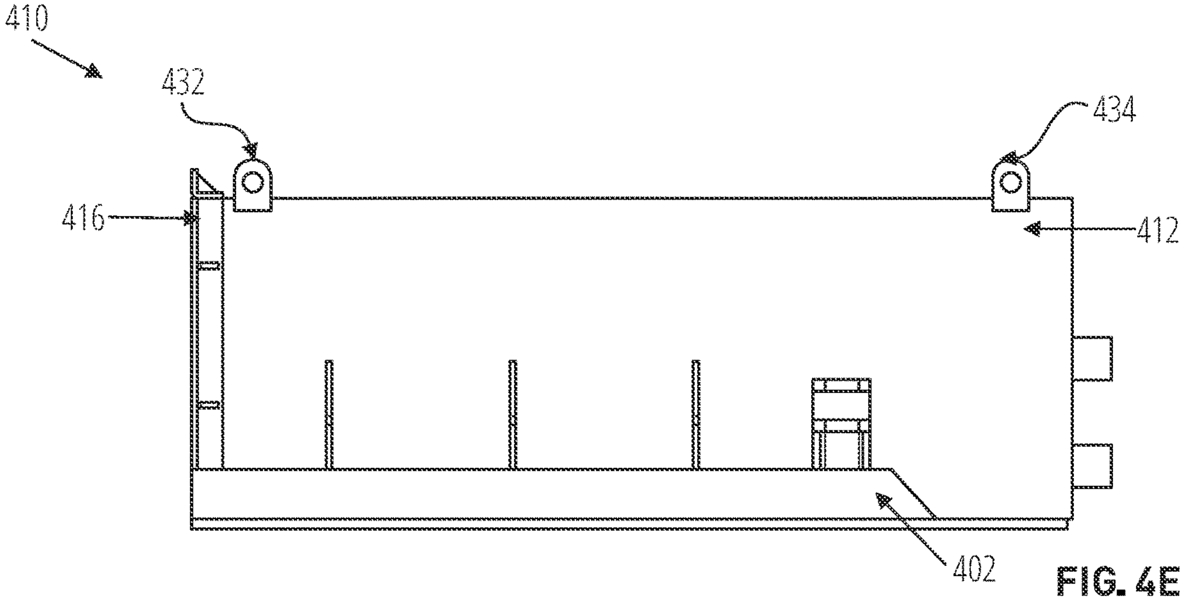
FIG. 4E illustrates a side view of the three-sided box of FIG. 4B in accordance with one embodiment.

FIG. 4E illustrates a side view of three-sided box 410 FIG. 4B in accordance with one embodiment. In some aspects, the first side wall 412 may comprise one or more eyelets 432, 434 mounted to a top edge of the first side wall 412. In the illustration, eyelet 432 is positioned in proximity to the back stop 416 and eyelet 434 is positioned in proximity to the front of three-sided box 410.

Figure 4F:
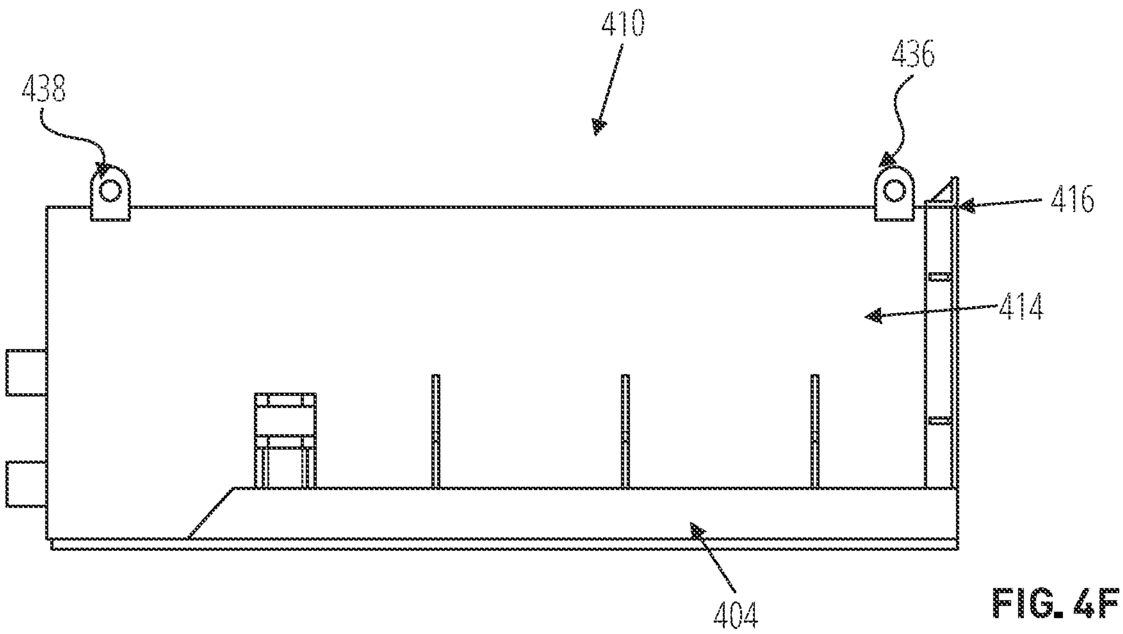
FIG. 4F illustrates a side view of the three-sided box of FIG. 4B in accordance with one embodiment.

FIG. 4F illustrates a side view of three-sided box 410 FIG. 4B in accordance with one embodiment. In some aspects, the second side wall 414 may comprise one or more eyelets 436, 438 mounted to a top edge of the second side wall 414. In the illustration, eyelet 436 is positioned in proximity to the back stop 416 and eyelet 438 is positioned in proximity to the front of three-sided box 410.

Figure 4G:
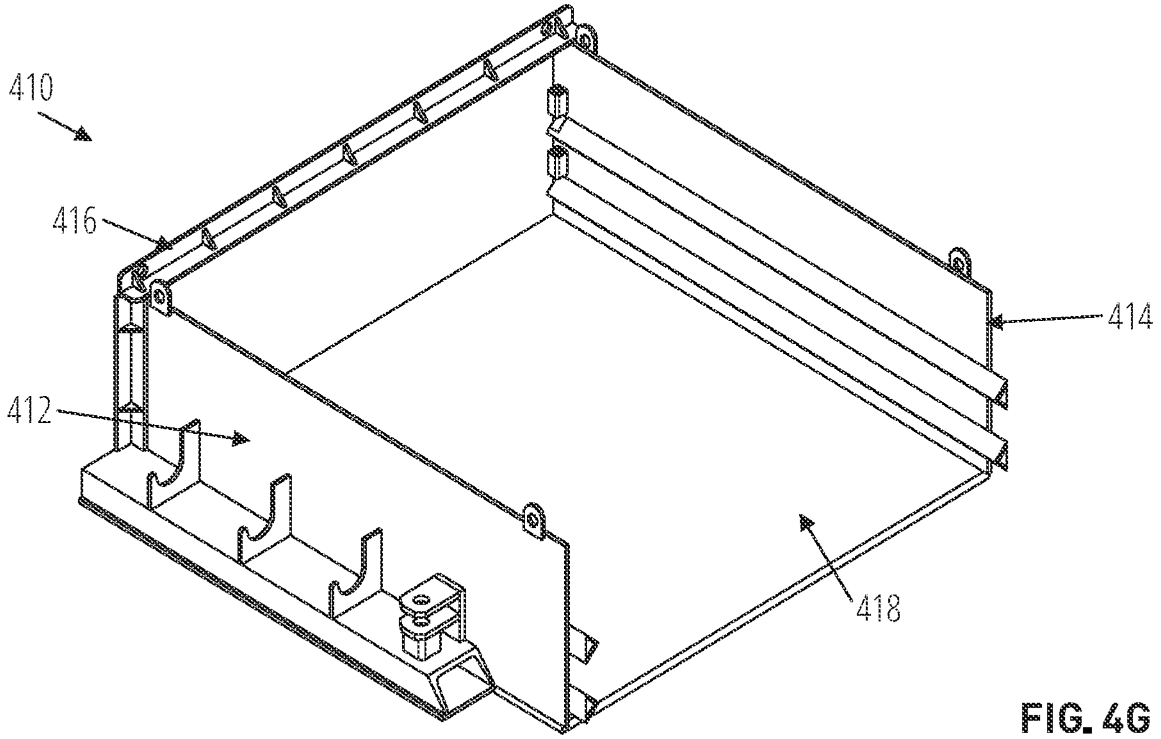
FIG. 4G illustrates a perspective view of the three-sided box with the removable pusher plate removed in accordance with one embodiment.

FIG. 4G illustrates a perspective view of the three-sided box 410 of FIG. 4B in accordance with one embodiment. In this illustration, the elongated channels 424, 426 are not shown. In some aspects, the three-sided box 410 may comprise a substantially open front portion to allow the movable pusher plate 340 (FIG. 3) to be installed. The openings into the first elongated tube 402 coupled to the first side wall 412 and the second elongated tube 404 coupled to second side wall 414 are open from the same direction as the front of the three-sided box 410 to receive the forks of the fork carriage. The bottom surface 418 is configured to support the weight of a tree placed within the three-sided box 410.

Figure 5B:
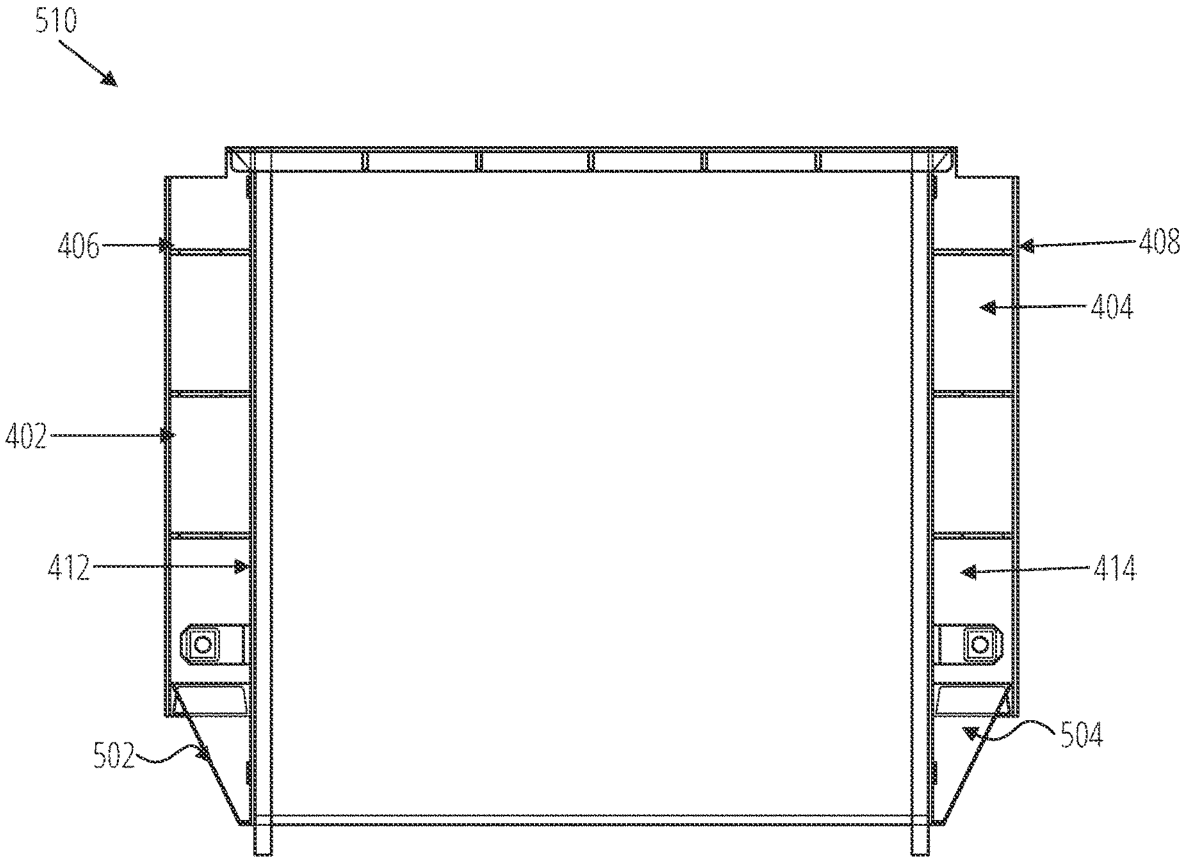
FIG. 5B illustrates a top view of the three-sided box with the movable pusher plate removed in accordance with one embodiment.

FIG. 5A illustrates a parts list for a three-sided bowl 510 of FIGS. 5B-5G in accordance with one embodiment. FIGS. 5B-4G are different views of the three-sided box 510. To avoid overcrowding in the figures, only some components of the three-sided box 510 will be referenced and described in a particular figure. Additionally, the three-sided box 510 is similar to the three-sided box 410. Therefore, only the differences will be described.

FIG. 5B illustrates a top view of the three-sided bowl 510 with the movable pusher plate removed in accordance with one embodiment. In some aspects, the three-sided box 510 may comprise at least one support member 502 that is coupled to the first side wall 412 in proximity to the front end of the first elongated tube 402. The support member 502 extends from the front end along a top side of the first elongated tube 402 and angles in an upward direction to one of: an upper end or top edge of the first side wall 412. In some implementations, the support member 502 may comprise a solid metal plate or a metal band. The support member 502 may provide additional bracing of the first elongated tube 402 to the first side wall 412. In some aspects, the support member 502 may serve as a stop plate or diverter plate.

In some implementations, the three-sided box 510 may comprise at least one support member 504 that is coupled to the second side wall 414 in proximity to the front end of the second elongated tube 404. In some aspects, the support member 504 may extend from the top side of the second elongated tube 404 and angle in an upward direction to one of: an upper end or top edge of the second side wall 414. In some embodiments, the support member 504 may comprise a solid metal plate or a metal band. The support member 504 may provide additional bracing of the second elongated tube 404 to the second side wall 414. In some aspects, the support member 504 may serve as a stop plate or diverter plate.

Figure 5C:
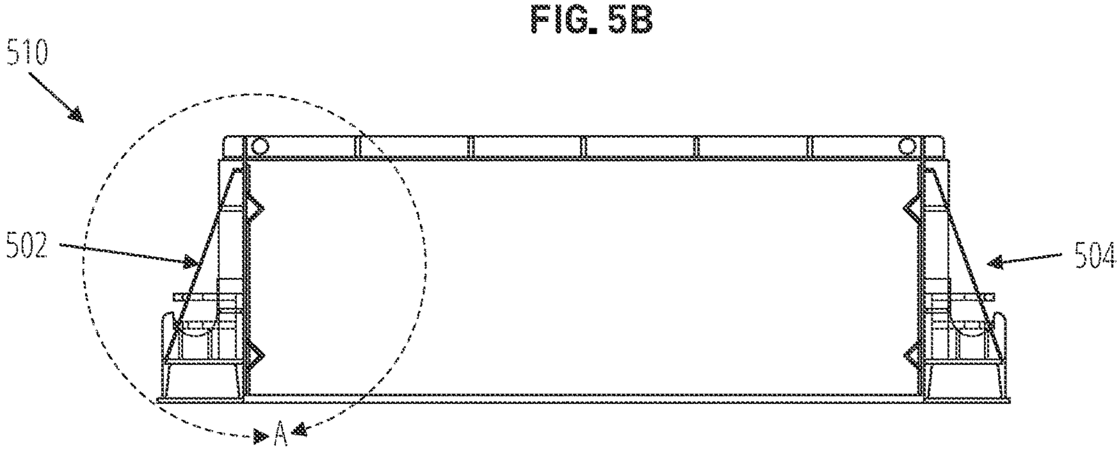
FIG. 5C illustrates an end view of the three-sided bowl of FIG. 5B in accordance with one embodiment.

FIG. 5C illustrates an end view of the three-sided box 510 of FIG. 5B in accordance with one embodiment. In this illustration, the angled or sloped profile of the support member 502 can be seen. In some aspects, the support member 502 may extend substantially to the top of the first side wall 412.

Figure 5D:
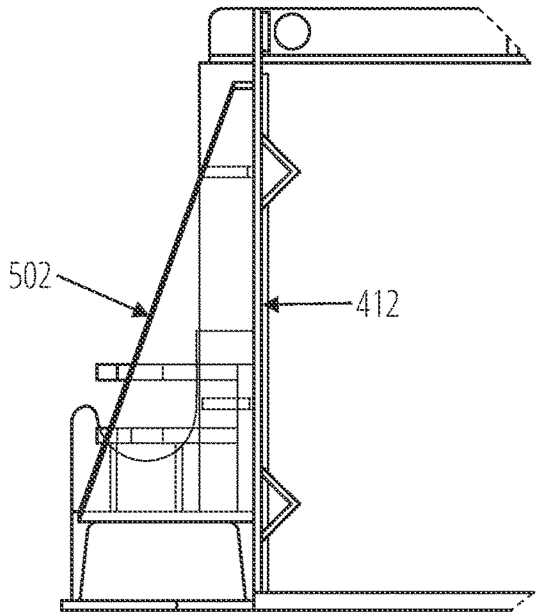
FIG. 5D illustrates detail A view of FIG. 5C in accordance with one embodiment.

FIG. 5D illustrates detail A view of FIG. 5C in accordance with one embodiment. In some aspects, the support member 502 may extend substantially to the top of the first side wall 412.

Figure 5E:
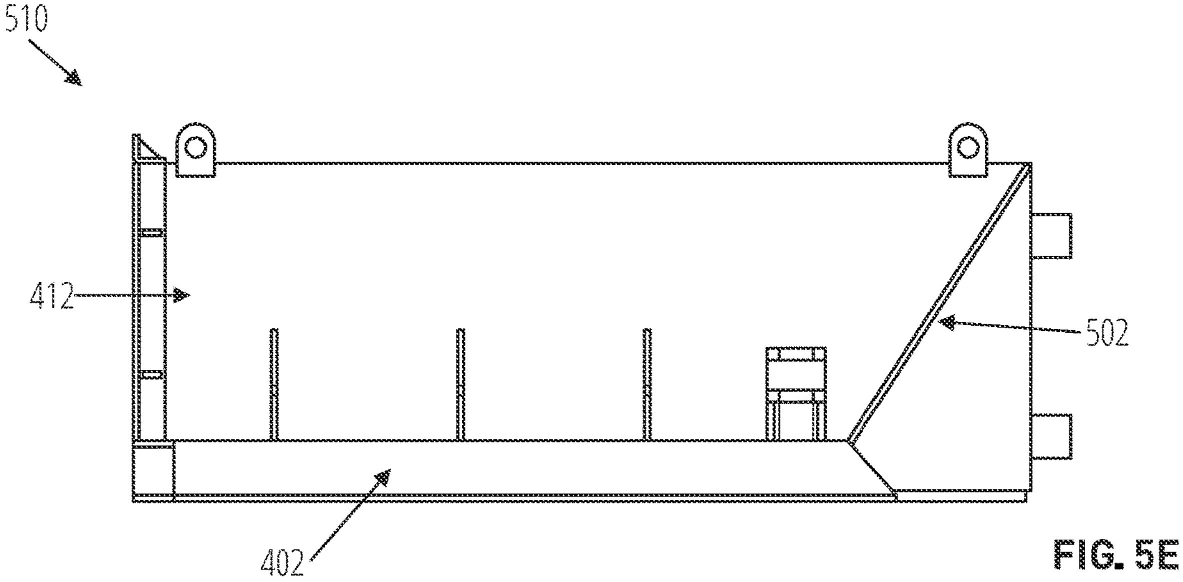
FIG. 5E illustrates a side view of the three-sided bowl of FIG. 5B in accordance with one embodiment.

FIG. 5E illustrates a side view of three-sided box 510 of FIG. 5B in accordance with one embodiment. The side view shows that, in some aspects, the support member 502 may extend substantially from the top of the first elongated tube 402 to the top front corner of the first side wall 412.

Figure 5F:
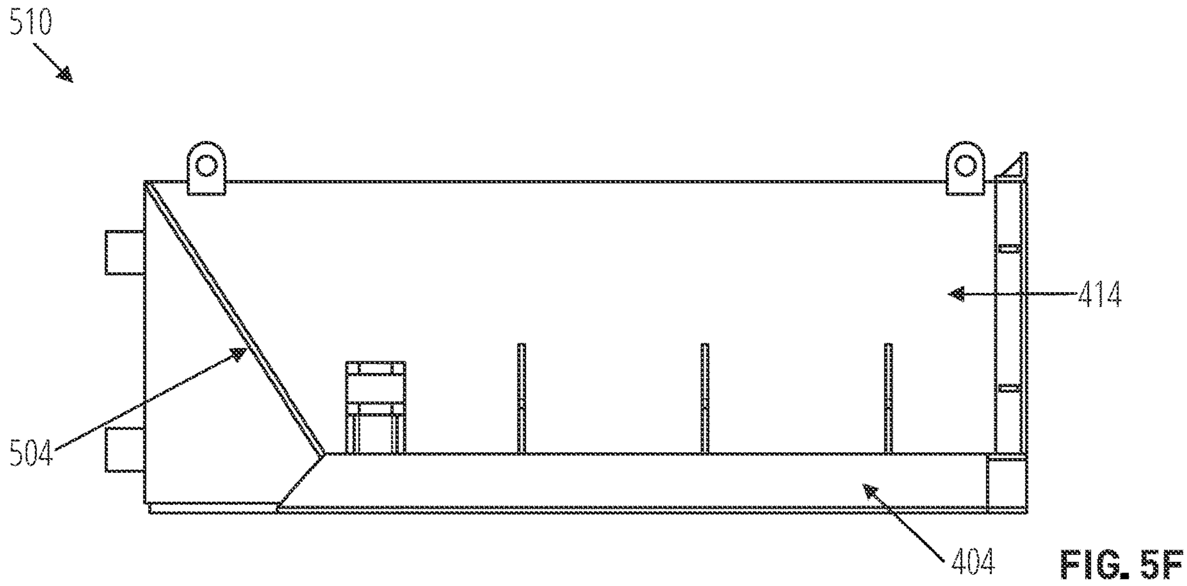
FIG. 5F illustrates a side view of the three-sided bowl of FIG. 5B in accordance with one embodiment.

FIG. 5F illustrates a side view of three-sided box 510 of FIG. 5B in accordance with one embodiment. The side view shows that, in some aspects, the support member 504 may extend substantially from the top of the second elongated tube 404 to the top front corner of the second lateral side 414.

Figure 5G:
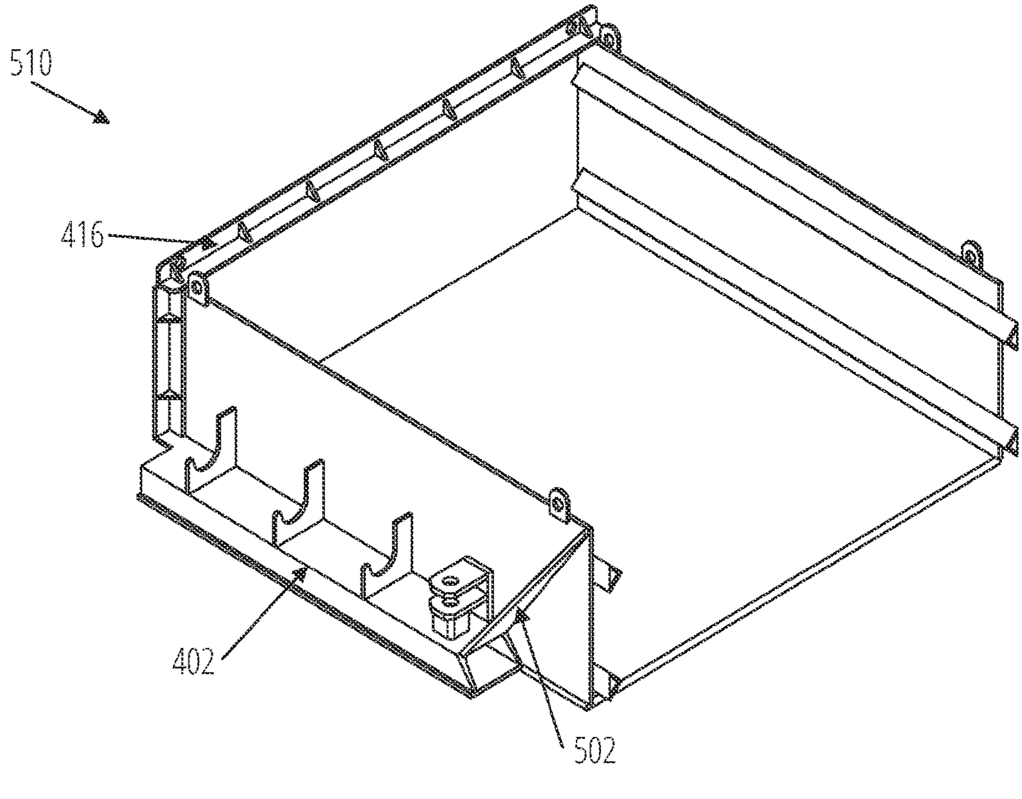
FIG. 5G illustrates a perspective view of the three-sided bowl with the removable pusher plate removed in accordance with one embodiment.

FIG. 5G illustrates a perspective view of the three-sided box 510 with the removable pusher plate removed in accordance with one embodiment.

Figure 6B:
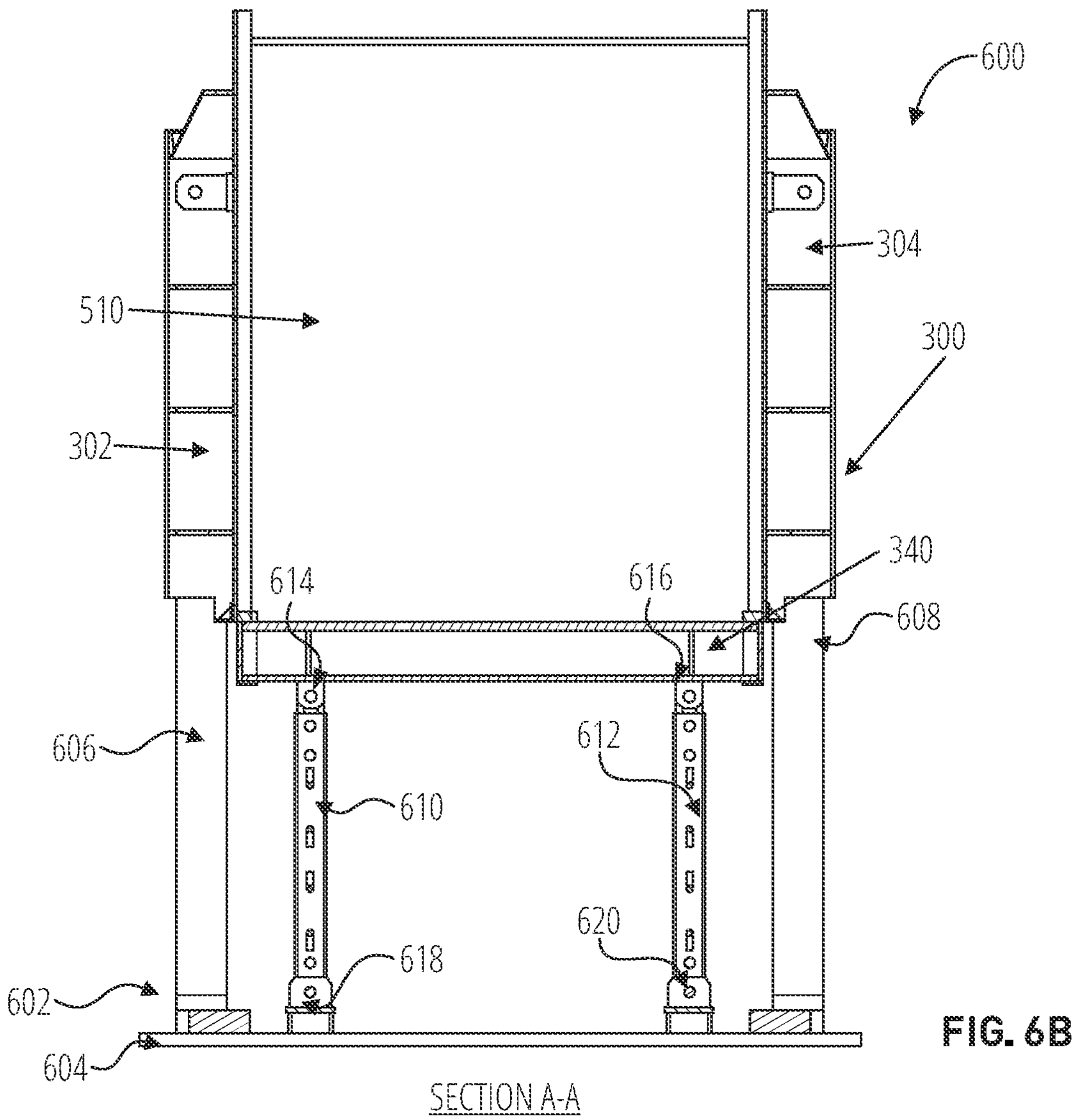
FIG. 6B illustrates a top view of the tree spoon system in a non-telescoped position in accordance with one embodiment.

FIG. 6A illustrates parts list for a tree spoon system 600 of FIGS. 6B-6E in accordance with one embodiment. FIGS. 6B-6E are different views of the tree spoon system 600. To avoid overcrowding in the figures, only some components of the tree spoon system 600 will be referenced and described in a particular figure. Additionally, the tree spoon system 600 includes a spoon device 300 previously described in relation to FIG. 3. Therefore, only the differences will be described.

FIG. 6B illustrates a top view of the tree spoon system 600 in a non-telescoped position in accordance with one embodiment. In some aspects, the tree spoon system 600 may comprise a spoon device 300. The spoon device 300 is shown with an exemplary three-sided box 510 (FIGS. 5B-5G), for example. In some implementations, the tree spoon system 600 may comprise the three-sided box 310 or the three-sided box 410, as non-limiting examples.

In this view, the movable pusher plate 340 is installed at the rear or back end of the three-sided box 510. The three-sided box 510 is shown coupled to a forklift accessory 602 such that forks 606 and 608 are received within first and second elongated tubes 302 and 304, respectively. In some implementations, the forklift accessory 602 may comprise a fork carriage 604 and two or more forks 606 and 608 that are coupled to and extend from the fork carriage 604. The forks 606 and 608 are constructed and arranged to align with and be inserted into an opening of each of the first elongated tube 302 and the second elongated tube 304 such that the forks 606 and 608 may be removably received by the first and second elongated tubes 302, 304.

In some aspects, the fork carriage 604 may comprise one or more arm brackets 618, 620 for at least temporarily affixing or securing an end of one or more telescoping pusher arms 610, 612, such as, for example and not limitation, a first telescoping pusher arm 610 and a second telescoping pusher arm 612.

Figure 6C:
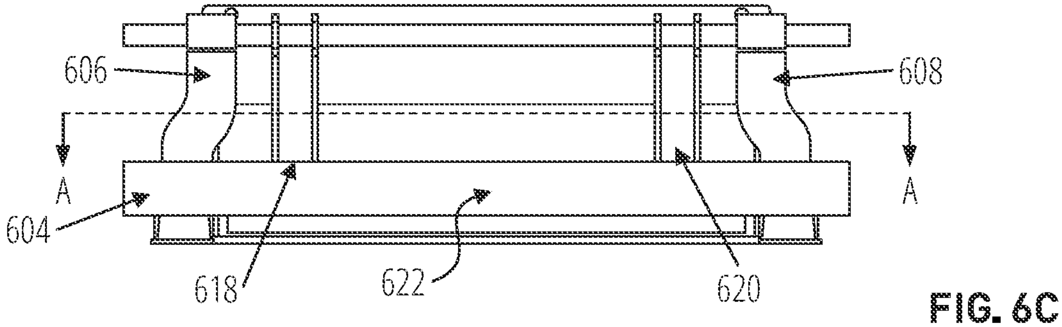
FIG. 6C illustrates an end view of tree spoon system of the FIG. 6B in accordance with one embodiment.

FIG. 6C illustrates an end view of the tree spoon system 600 of FIG. 6B in accordance with one embodiment. In some aspects, the fork carriage 604 may comprise at least one cross support 622 configured to connect to the arm brackets 618, 620.

Figure 6D:
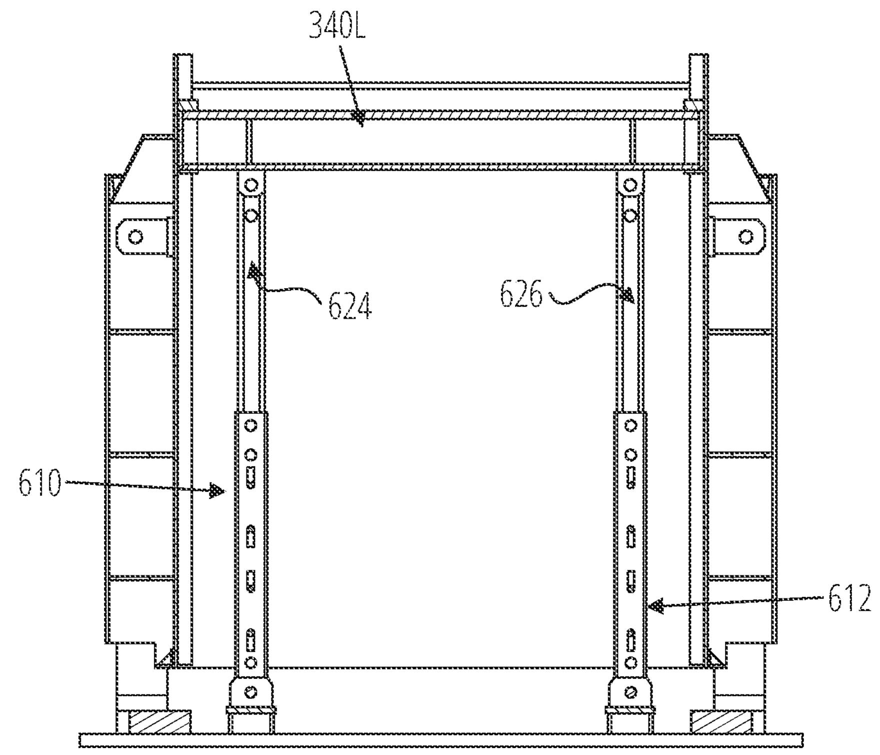
FIG. 6D illustrates a top view of the tree spoon system with the telescoping pusher arms in a telescoped position pushing the movable pusher plate in accordance with one embodiment.

FIG. 6D illustrates a top view of the spoon system 600 with the telescoping pusher arms 610, 612 in a telescoped position pushing the movable pusher plate 340 in accordance with one embodiment. In this view, the telescoping pusher arms 610 and 612 each include a telescopic extender 624 and 626, respectively, configured to extend the length of the telescoping pusher arms 610 and 612.

Figure 6E:
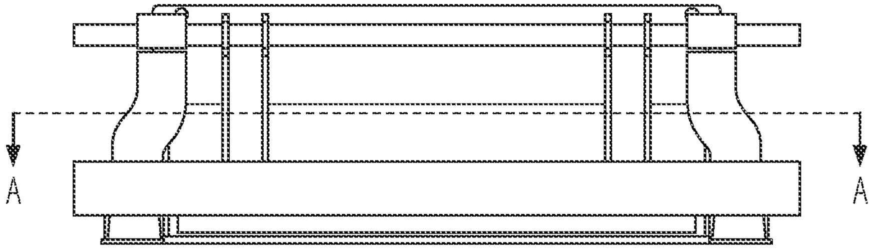
FIG. 6E illustrates an end view of tree spoon system of FIG. 6D in accordance with one embodiment.

FIG. 6E illustrates an end view of the tree spoon system 600 of FIG. 6D in accordance with one embodiment.

Figure 6F:
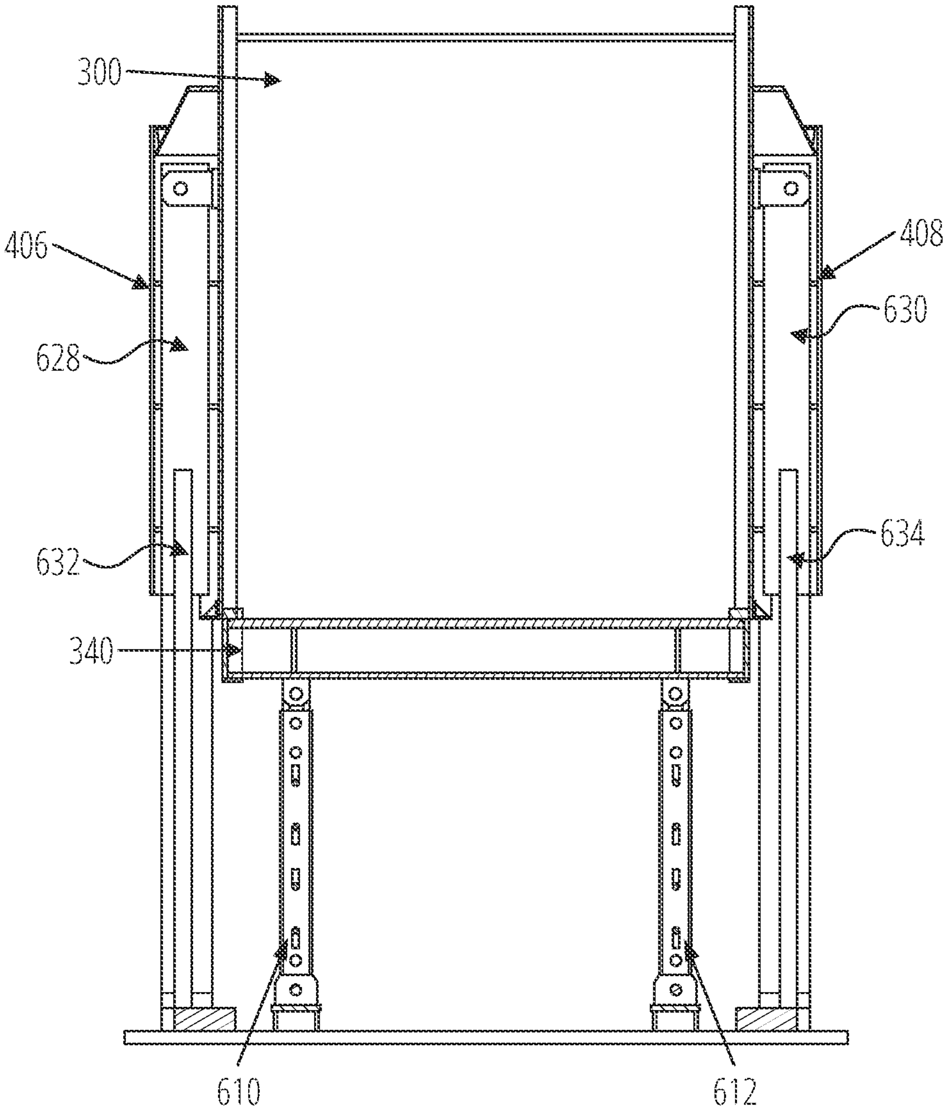
FIG. 6F illustrates the top view of the tree spoon system in a non-telescoped position of FIG. 6B with a hydraulic arms installed in accordance with one embodiment.

FIG. 6F illustrates the top view of the tree spoon system 600 in a non-telescoped position of FIG. 6B with a plurality of hydraulic arms 628, 630 installed in accordance with one embodiment. In some implementations, the plurality of hydraulic arms 628, 630 may comprise at least a first hydraulic arm 628 and a second hydraulic arm 630. In some embodiments, each of the hydraulic arms 628, 630 may be alterable between an extended position and a retracted position. In some aspects, the hydraulic arms 628 and 630 are installed and cradled in supports 406 and supports 408, respectively. In some implementations, the hydraulic arms 628 and 630 may each comprise a hydraulic arm extender 632 and 634, respectively, wherein at least a portion of each hydraulic arm extender 632, 634 is exposed when its associated hydraulic arm 628, 630 is in an at least partially extended position. The details of the operation of the hydraulic arms 628 and 630 and hydraulic arm extenders 632 and 634 will be described and shown in regard to FIGS. 16A-16E, 17A-17D, 18A-18C. In the fully extended position of the hydraulic arm extenders 632, 634, the fork carriage 604 is farthest from the three-sided box 310.

Figure 6G:
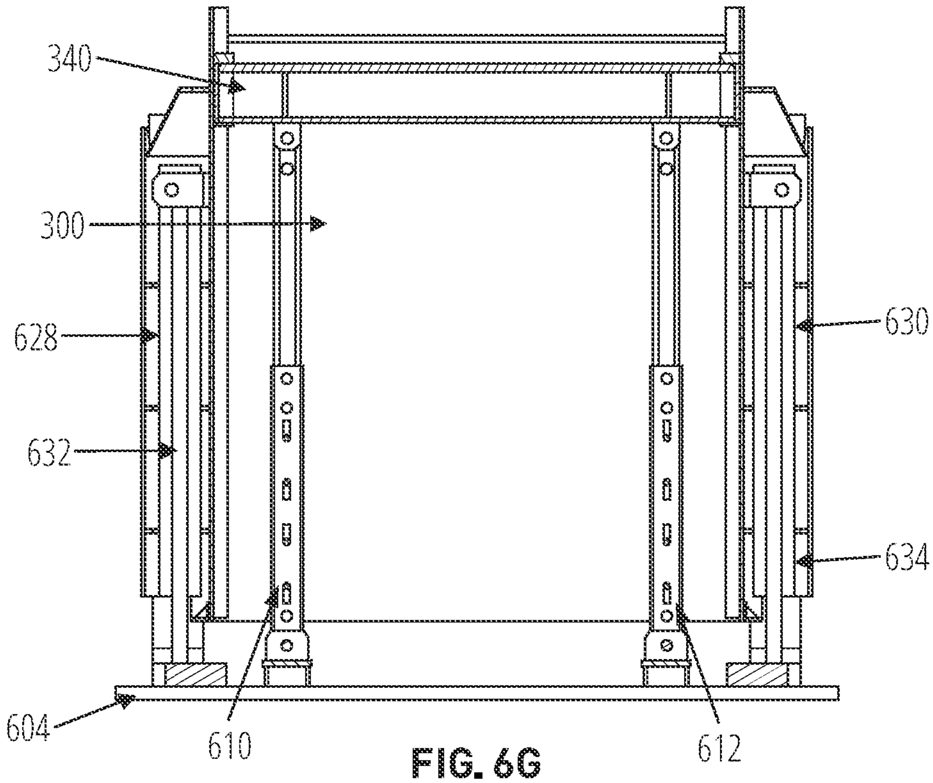
FIG. 6G illustrates the top view of the tree spoon system in a telescoped position of FIG. 6D with the plurality of hydraulic arms installed in accordance with one embodiment.

FIG. 6G illustrates the top view of the tree spoon system 600 in a telescoped position of FIG. 6D with the plurality of hydraulic arms 628, 630 installed in accordance with one embodiment. In this view, the hydraulic arm extenders 632, 634 are in a fully retracted position. In the fully retracted position of the hydraulic arm extenders 632, 634, the fork carriage 604 is proximate to the three-sided box 310 and is in its closest position thereto.

Figure 7B:
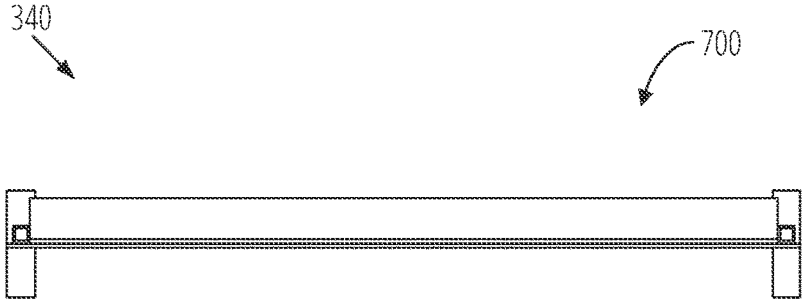
FIG. 7B illustrates a top view of the movable pusher plate in accordance with one embodiment.

FIG. 7A illustrates a parts list for the movable pusher plate 340 of FIGS. 7B-7F in accordance with one embodiment.

FIG. 7B illustrates a top view of the movable pusher plate 340 in accordance with one embodiment.

Figure 7C:
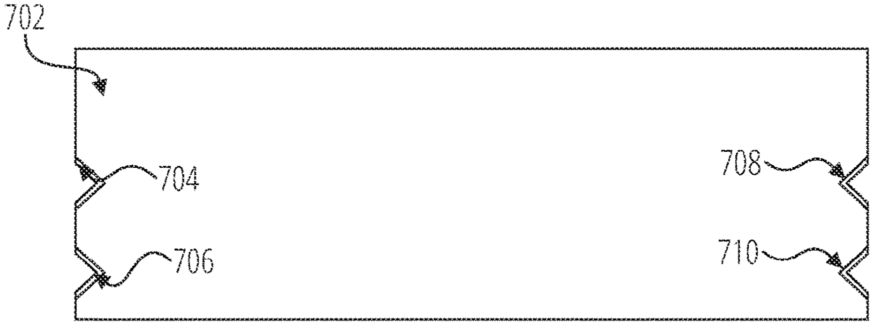
FIG. 7C illustrates a side view of the movable pusher plate of FIG. 7B in accordance with one embodiment.

FIG. 7C illustrates a side view of the movable pusher plate 340 of FIG. 7B in accordance with one embodiment. In some aspects, the movable pusher plate 340 may comprise a first side 702. In some implementations, the movable pusher plate 340 may comprise one or more first side tracks 704, 706 configured on the first lateral end or side 702 of the movable pusher plate 340 to mate with or be slidably received by elongated channels 424, 426 (rails) configured on the first side wall 412. In some embodiments, the movable pusher plate 340 may one or more second side tracks 708 and 710 configured on an opposite (opposing) lateral end or side to mate with or be slidably received by elongated channels 424, 426 (rails) configured on the second side wall 414. In some non-limiting exemplary embodiments, the first and second side tracks 704, 706, 708, 710 may comprise indentations, recesses, grooves, protrusions, ridges, extensions, or similar structural configurations.

Figure 7D:
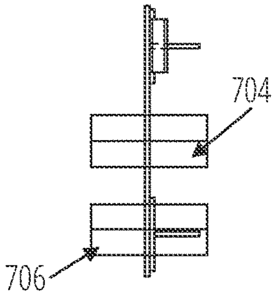
FIG. 7D illustrates an end view of the movable pusher plate of FIG. 7B in accordance with one embodiment.

FIG. 7D illustrates an end view of the movable pusher plate 340 of FIG. 7B in accordance with one embodiment. This view shows an end view of side tracks 704 and 706. In some aspects, the tracks 704 and 706 may be dimensioned and configured to ride along elongated channels 424, 426 (rails) as the movable pusher plate 340 is pushed via one or more applied forces.

Figure 7E:
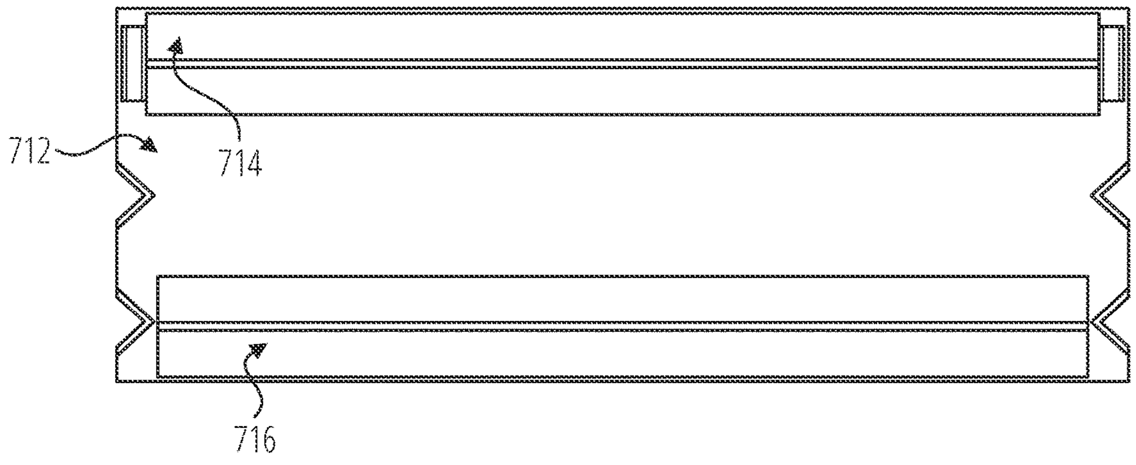
FIG. 7E illustrates a side view of the movable pusher plate in accordance with one embodiment.

FIG. 7E illustrates a side view of the movable pusher plate 340 of FIG. 7B in accordance with one embodiment. In some aspects, the movable pusher plate 340 may comprise a second side 712, wherein the first side 702 and the second side 712 may be configured on opposite (opposing) sides of the movable pusher plate 340. In some embodiments, the movable pusher plate 340 may comprise one or more supports 714, 716 mounted in parallel on the second side 712.

Figure 7F:
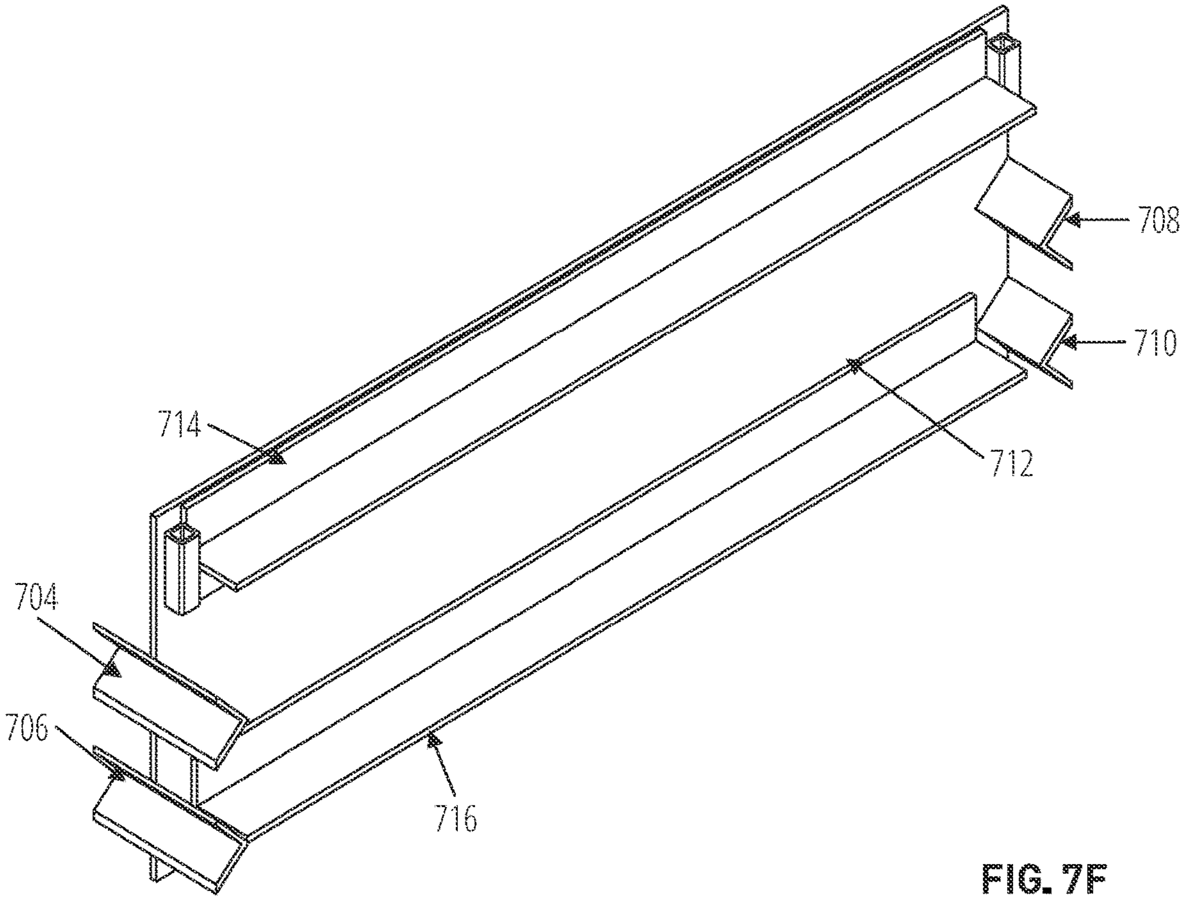
FIG. 7F illustrates a perspective view of the movable pusher plate in accordance with one embodiment.

FIG. 7F illustrates a perspective view of the movable pusher plate 340 in accordance with one embodiment. By way of example and not limitation, each of the supports 714, 716 may comprise an L-shape or other shape. In some non-limiting exemplary implementations, the each of the tracks 704, 706 may comprise a V-shape or other shape. In some aspects, the tracks 708 and 710 may comprise a V-shape or other shape to be configured to mate with the corresponding elongated channels 424 and 426 (rails).

Figure 8B:
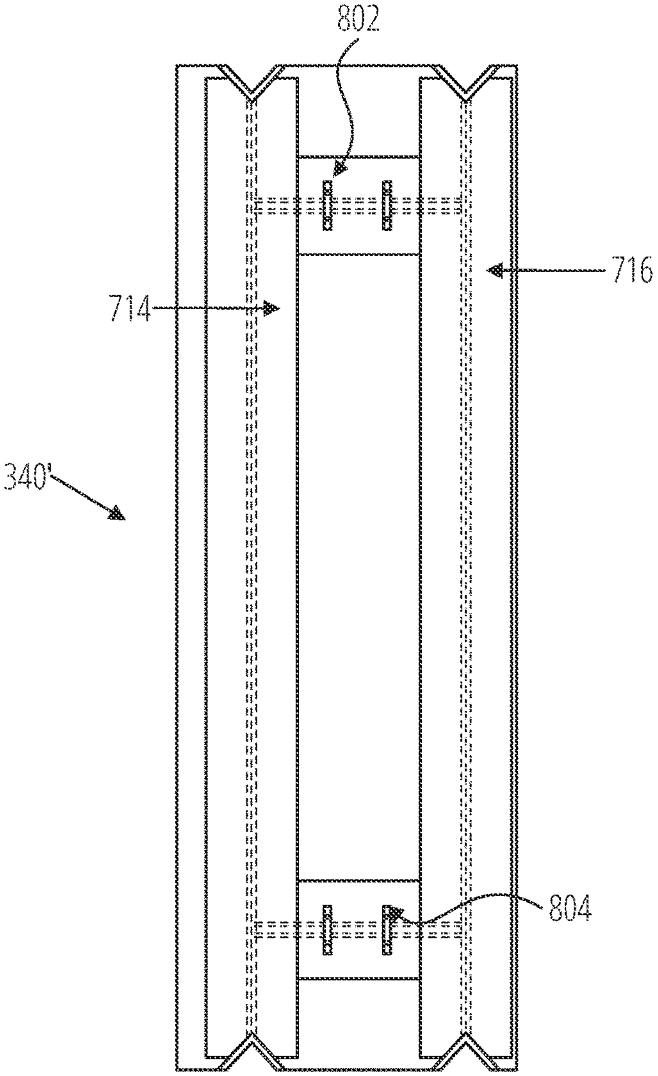
FIG. 8B illustrates a side view of the movable pusher plate in accordance with one embodiment.

FIG. 8A illustrates a parts list for FIGS. 8B-8E in accordance with one embodiment. FIGS. 8B-8E show an alternate embodiment of the movable pusher plate 340'. The movable pusher plate 340 of FIGS. 7A-7F is similar to the movable pusher plate 340' of FIGS. 8B-8E, so only the differences will be explained.

FIG. 8B illustrates a side view of the movable pusher plate 340' in accordance with one embodiment. In some aspects, the movable pusher plate 340' may comprise one or more brackets 802, 804 configured to be at least temporarily attached or secured to one end of the telescoping pusher arm 610, 612. In some implementations, the other end of each telescoping pusher arm 610, 612 may be configured to be at least temporarily attached or secured to an arm bracket 618, 620 on the fork carriage 604. In some embodiments, the supports 714 and 716 may have the brackets 802 and 804 attached thereto.

Figure 8D:
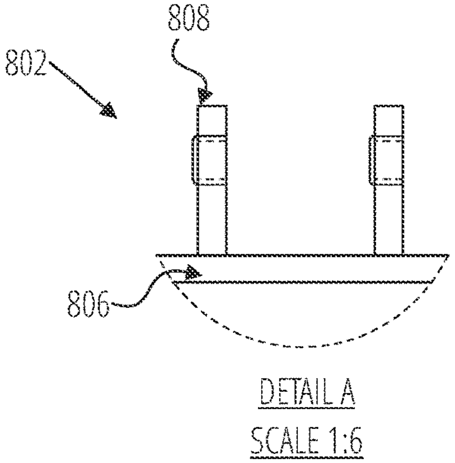
FIG. 8D illustrates detail A view of FIG. 8C in accordance with one embodiment.
Figure 8C:
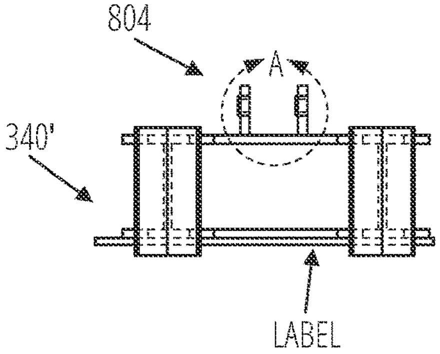
FIG. 8C illustrates an end view of the movable pusher plate in FIG. 8B in accordance with one embodiment.

FIG. 8C illustrates an end view of the movable pusher plate 340' in FIG. 8B in accordance with one embodiment. This view shows an end view from the perspective of bracket 804.

FIG. 8D illustrates a detail A view of FIG. 8C in accordance with one embodiment. In some aspects, the bracket 802 may include a mounting plate 806 configured to mount to the supports 714 and 716. In some implementations, the bracket 802 may comprise one or more attachment plates 808, each having a hole configured to receive a fastener (not shown) for attaching the telescoping pusher arms 610 and 612.

Figure 8E:
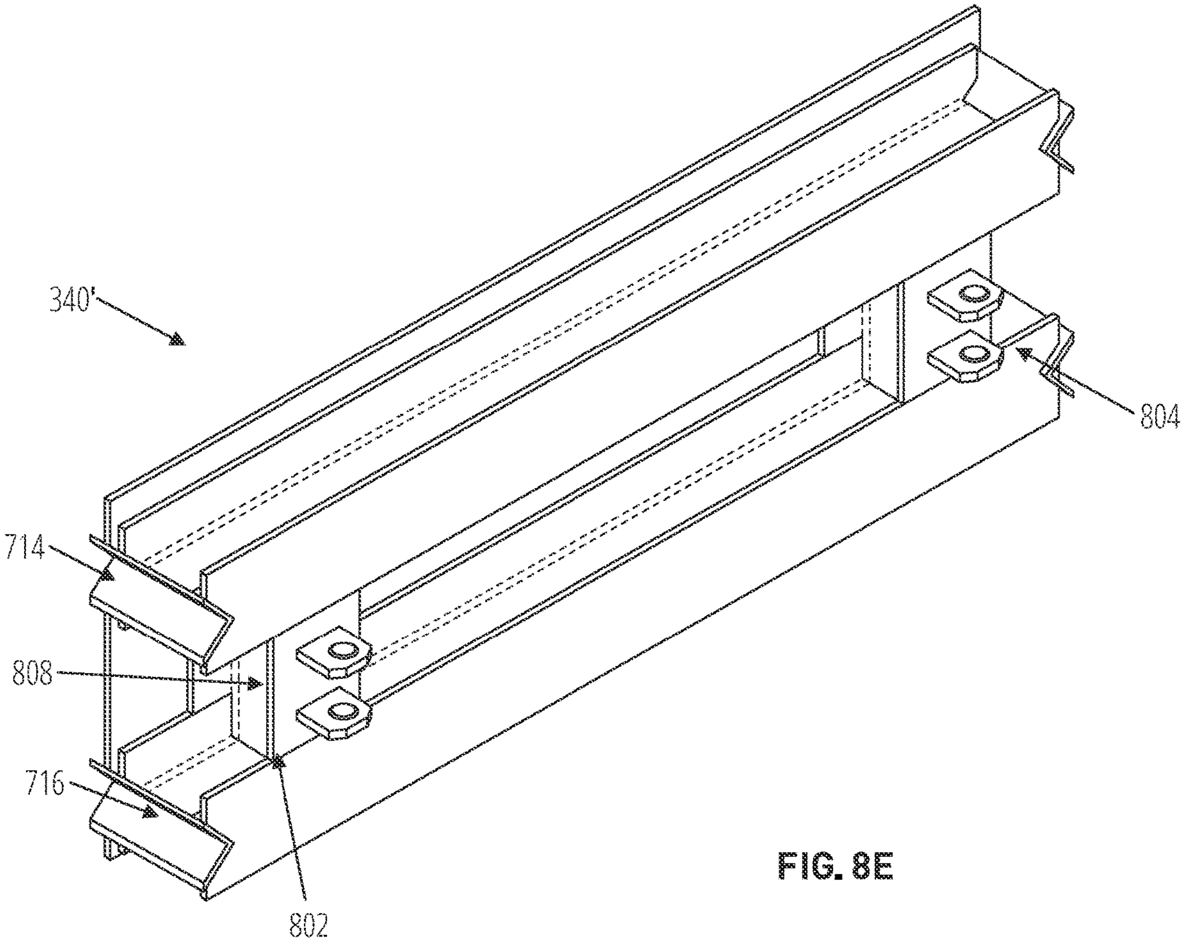
FIG. 8E illustrates a perspective view of the movable pusher plate in accordance with one embodiment.

FIG. 8E illustrates a perspective view of the movable pusher plate 340' in accordance with one embodiment. In some aspects, the mounting plates 806 may be used for attaching the brackets 802, 804 between the supports 714 and 716.

Figure 9B:
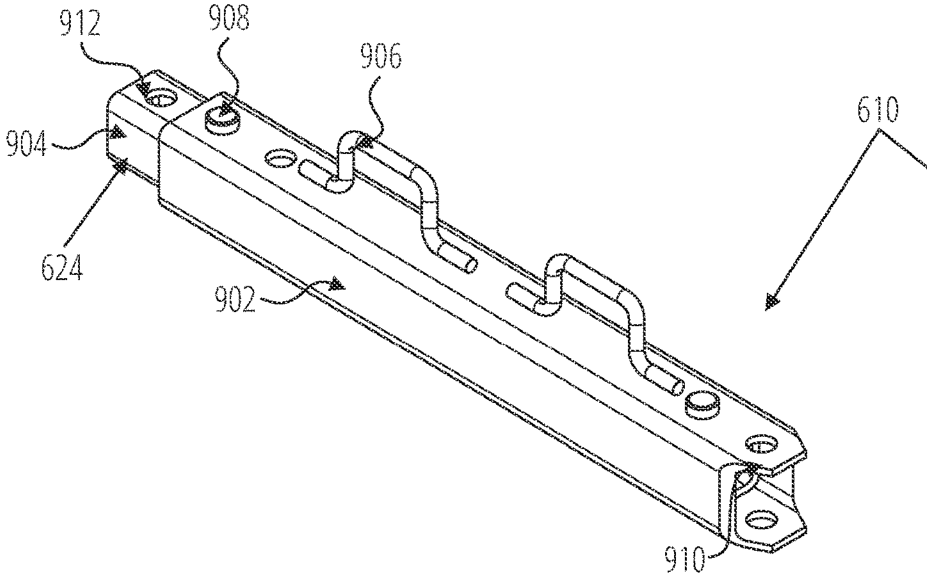
FIG. 9B illustrates a perspective view of the telescopic pusher arm in a non-telescoped (retracted) position in accordance with one embodiment.
Figure 9C:
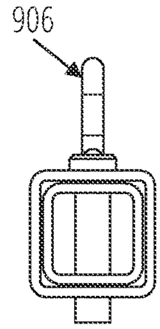
FIG. 9C illustrates an end view of a telescoping pusher arm of FIG. 9B in accordance with one embodiment.
Figure 9D:
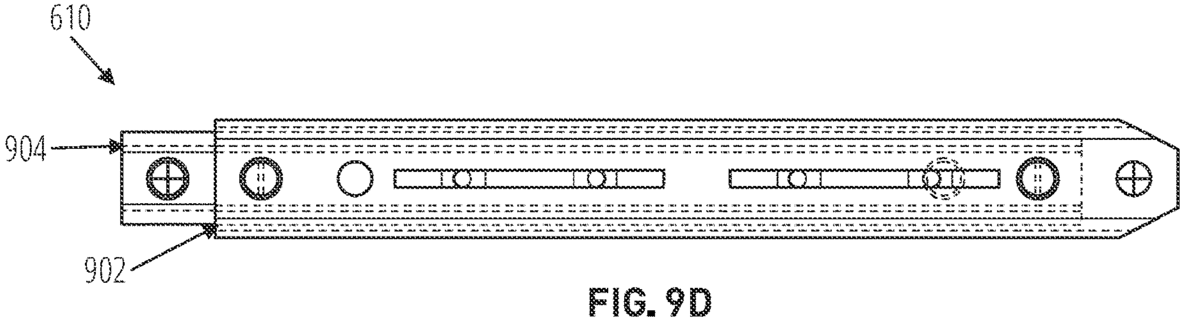
FIG. 9D illustrates a top view of a telescoping pusher arm of FIG. 9B in accordance with one embodiment.
Figure 9E:
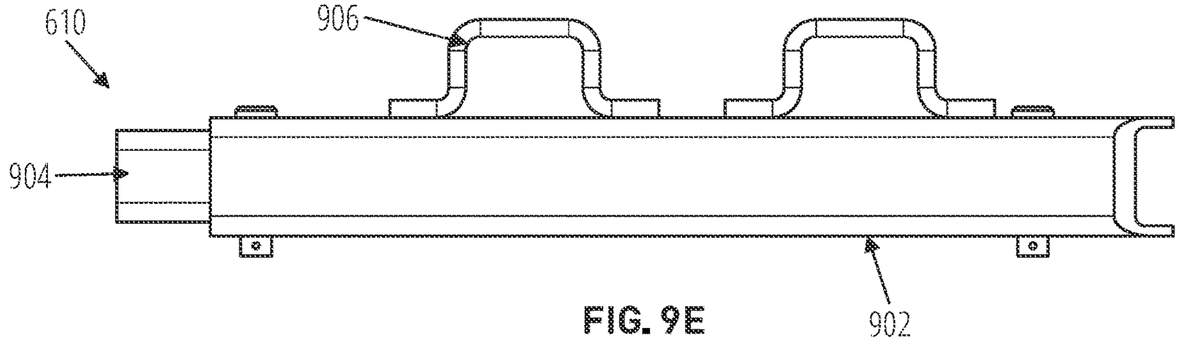
FIG. 9E illustrates a side view of a telescoping pusher arm of FIG. 9B in accordance with one embodiment.
Figure 9F:
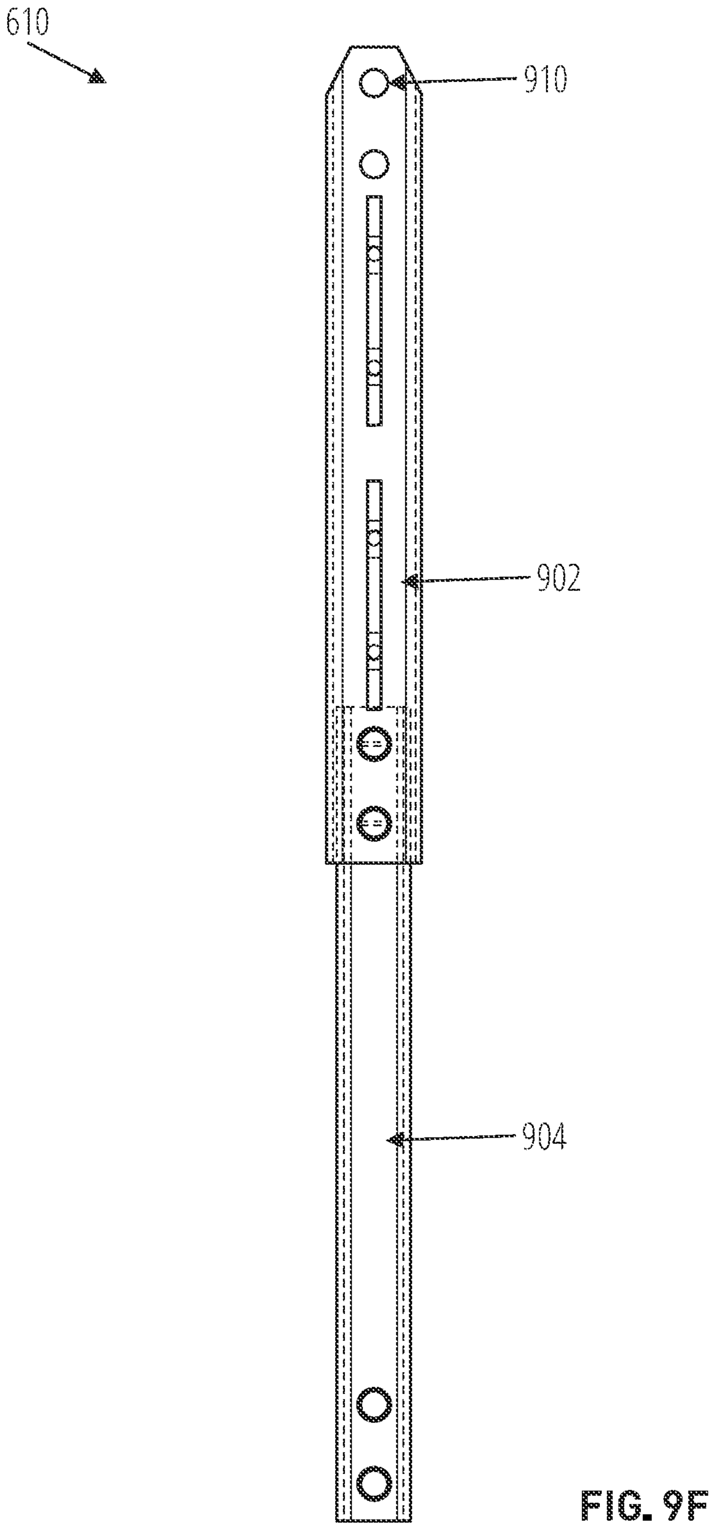
FIG. 9F illustrates a top view of a telescoping pusher arm of FIG. 9B in a telescoped (extended) position in accordance with one embodiment.

FIG. 9A illustrates a parts list for the telescopic pusher arm 610 of FIGS. 9B-9F in accordance with one embodiment. FIGS. 9B-FIG. 9E show the telescopic pusher arm 610 in a non-telescoped (retracted) position. FIG. 9F shows the telescopic pusher arm 610 in a telescoped (extended) position. The telescoping pusher arms 610 and 612 are essentially the same. Therefore, only one telescoping pusher arm 610 will be described.

FIG. 9B illustrates a perspective view of the telescopic pusher arm 610 in a non-telescoped (retracted) position in accordance with one embodiment. In some aspects, the telescoping pusher arm 610 may comprise a first tubular member 902. In some implementations, the telescoping pusher arm 610 may comprise at least one handle 906 mounted on a top side of the first tubular member 902. In the illustration, there are two handles 906. In some embodiments, the telescoping pusher arm 610 may comprise at least one fastener 908.

In some aspects, the telescoping pusher arm 610 may comprise a telescopic extender 624 in the form of a second tubular member 904 having a smaller diameter than the first tubular member 902 such that the second tubular member 904 may be able to slide within the first tubular member 902 to facilitate alteration of the telescoping pusher arm 610 between an extended position and a retracted position, wherein the exposed length of the second tubular member is greater in the extended position than in the retracted position. In some implementations, the first tubular member 902 and second tubular member 904 may each comprise one or more holes formed therein and configured to removably receive the at least one fastener 908 (such as, for example and not limitation, a pole, rod, bar, or similar elongated member) such that when at least one hole of the first tubular member 902 is aligned with at least one hole of the second member 904, the aligned holes may define an aperture such that when the at least one fastener is received within the aperture, the telescoping pusher arm 610 may be altered to a locked state wherein the position of the first tubular member 902 relative to the second tubular member 904 is substantially fixed. In operation, removing the fastener 908 may allow the second tubular member 904 to be moved freely in a sliding fashion relative to the first tubular member 902 to extend the length or shorten the length of the telescoping pusher arm 610.

In some aspects, the first tubular member 902 may comprise a connector end 910 configured to at least temporarily attach the telescoping pusher arm 610 to the fork carriage 604 (FIG. 6B). In some implementations, the second tubular member 904 may comprise a connector end 912 configured to at least temporarily attach the telescoping pusher arm 610 to bracket 802 (FIG. 8B).

FIG. 9C illustrates an end view of a telescoping pusher arm 610 of FIG. 9B in accordance with one embodiment.

FIG. 9D illustrates a top view of a telescoping pusher arm 610 of FIG. 9B in accordance with one embodiment.

FIG. 9E illustrates a side view of a telescoping pusher arm 610 of FIG. 9B in accordance with one embodiment.

FIG. 9F illustrates a top view of a telescoping pusher arm 610 of FIG. 9B in a telescoped (extended) position in accordance with one embodiment.

Figure 10B:
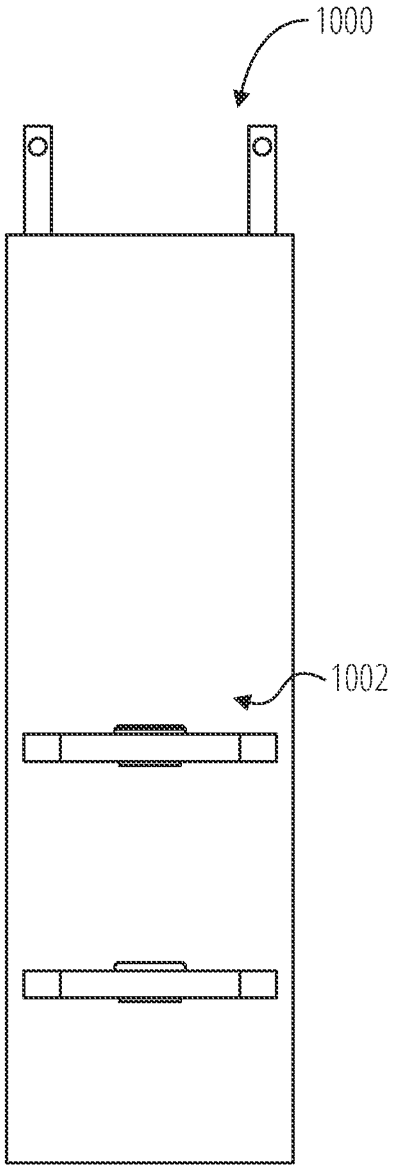
FIG. 10B illustrates a front view of the clevis fastener in accordance with one embodiment.

FIG. 10A illustrates a parts list of a clevis fastener 1000 in FIGS. 10B-10F in accordance with one embodiment.

FIG. 10B illustrates a front view of the clevis fastener 1000 in accordance with one embodiment. In some aspects, the clevis fastener 1000 may comprise one or more brackets 1002 for attachment of the hydraulic arms 628, 630.

Figure 10C:
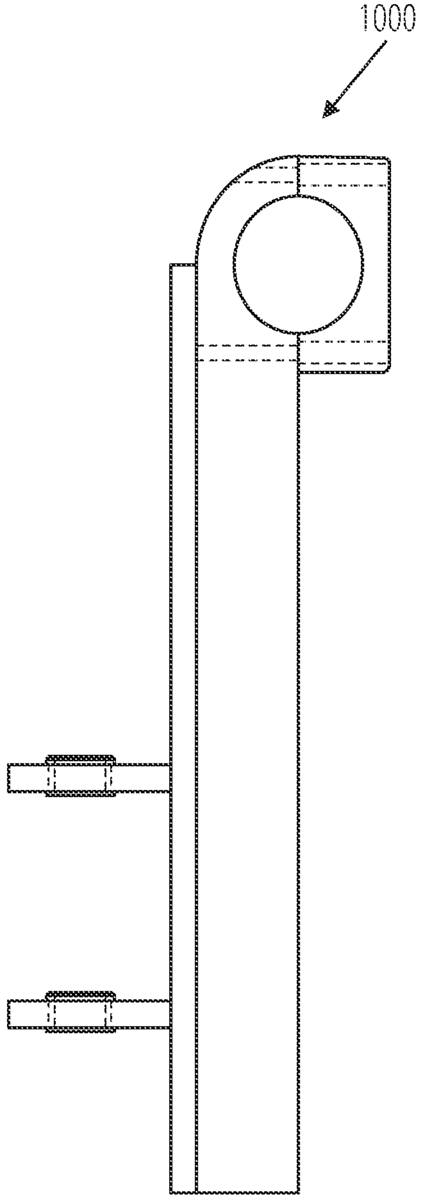
FIG. 10C illustrates a side view of the clevis fastener of FIG. 10B in accordance with one embodiment.
Figure 10D:
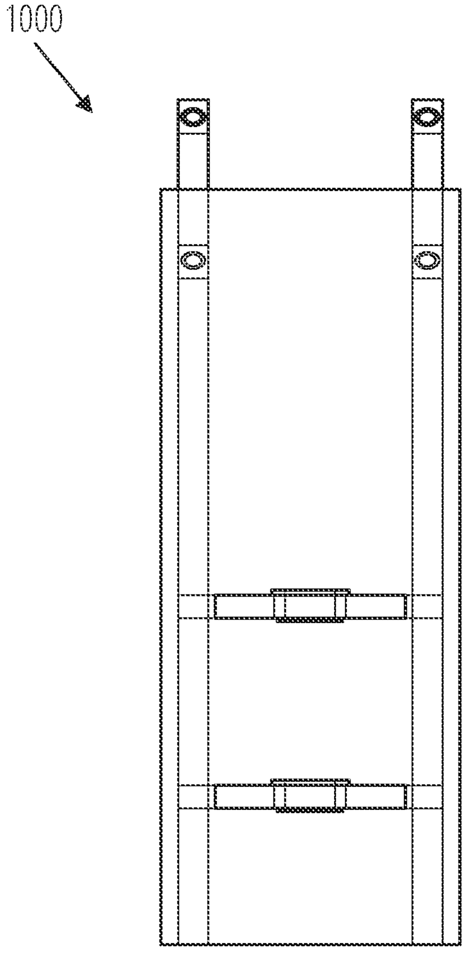
FIG. 10D illustrates a side view of the clevis fastener of FIG. 10B in accordance with one embodiment.
Figure 10E:
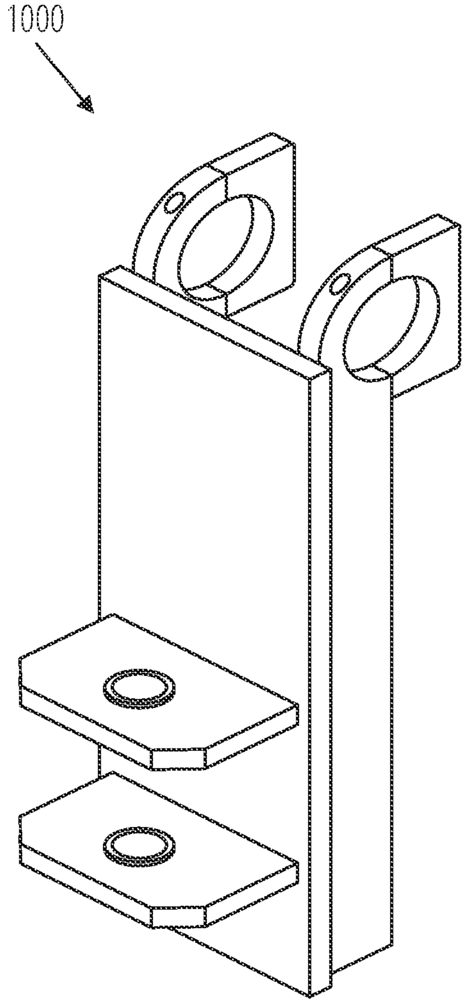
FIG. 10E illustrates a perspective view of the clevis fastener of FIG. 10B in accordance with one embodiment.
Figure 10F:
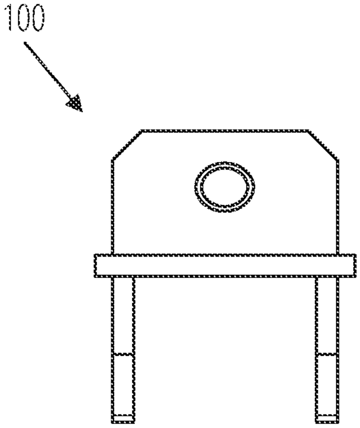
FIG. 10F illustrates a top view of the clevis fastener of FIG. 10B in accordance with one embodiment.

FIG. 10C illustrates a side view of the clevis fastener 1000 of FIG. 10B in accordance with one embodiment. FIG. 10D illustrates a side view of the clevis fastener 1000 of FIG. 10B in accordance with one embodiment. FIG. 10E illustrates a perspective view of the clevis fastener 1000 of FIG. 10B in accordance with one embodiment. FIG. 10F illustrates a top view of the clevis fastener 1000 of FIG. 10B in accordance with one embodiment.

Figure 11A:
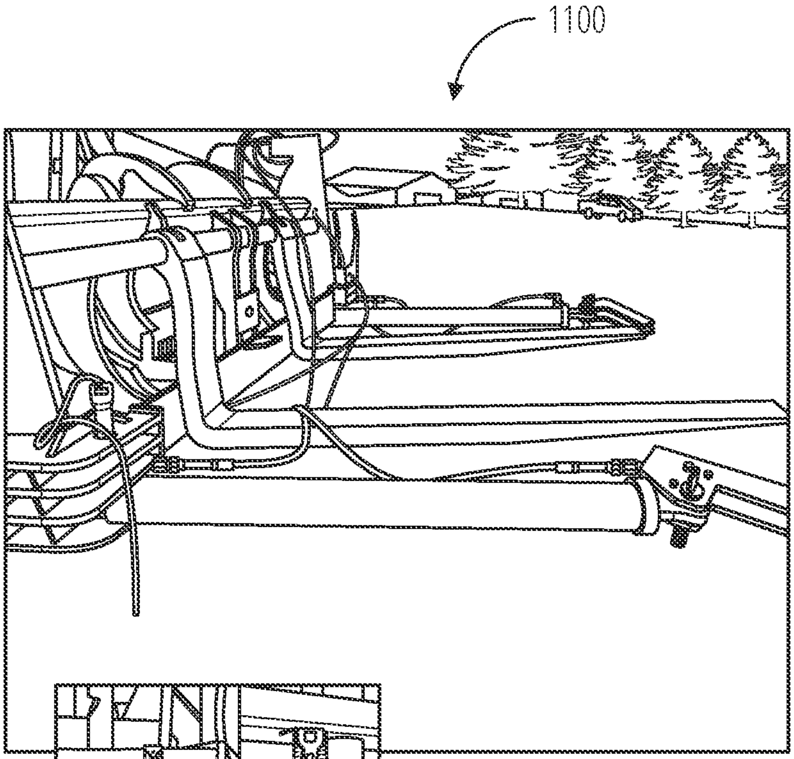
FIG. 11A illustrates an image of a retrofitted machine in accordance with one embodiment.
Figure 11B:
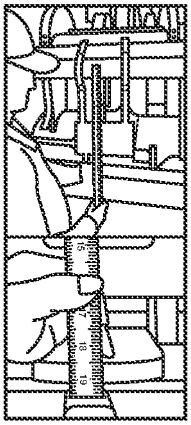
FIG. 11B illustrates an image showing measurement of dimension 2 in accordance with one embodiment.
Figure 11C:
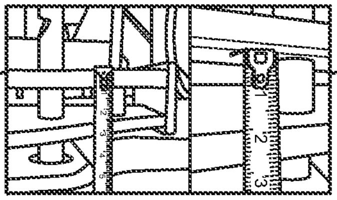
FIG. 11C illustrates an image showing measurement of dimension 5 in accordance with one embodiment.

FIG. 11A illustrates an image 1100 of a retrofitted machine 20 (not labeled in FIG. 11A) in accordance with one embodiment. In some aspects, the machine 20 may comprise two or more forks 606, 608 (FIG. 6B). In FIG. 11A, dimension 2 is the measurement between a carriage rod and the cross support of the carriage. Dimension 4 is the measurement between the forks. Dimension 3 is the size of the carriage rod. Dimension 5 is the measurement of a lower cross support from which the forks radiate from the carriage. FIG. 11B illustrates an image showing measurement of dimension 2 in accordance with one embodiment. FIG. 11C illustrates an image showing measurement of dimension 5 in accordance with one embodiment.

Figure 12:
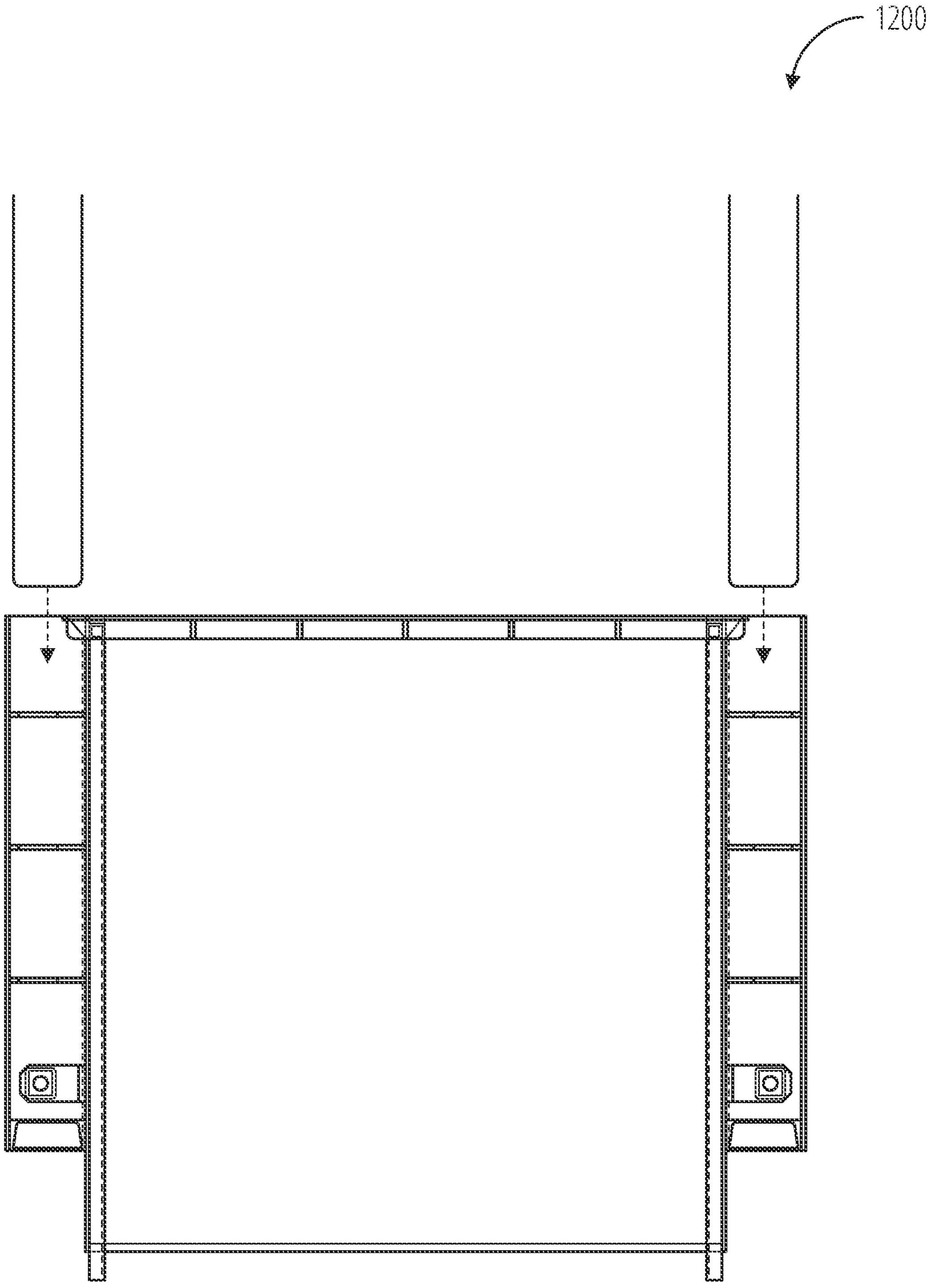
FIG. 12 illustrates a top view of the spacing of the forklift arms in accordance with one embodiment.

FIG. 12 illustrates a top view 1200 of the spacing of the forklift arms in accordance with one embodiment.

Figure 13:
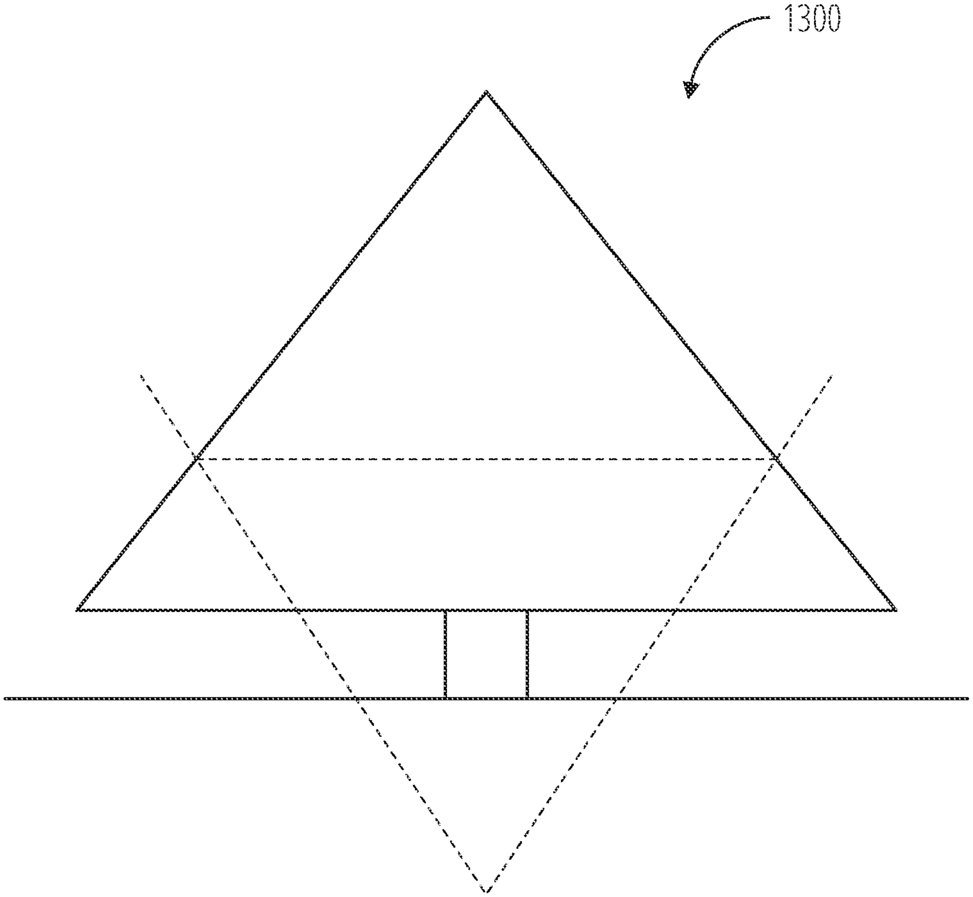
FIG. 13 illustrates an example spade orientation of a tree in accordance with one embodiment.

FIG. 13 illustrates an example spade orientation 1300 of a tree in accordance with one embodiment.

Figure 14B:
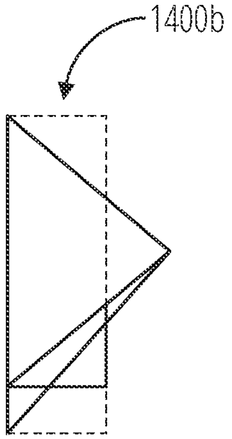
FIG. 14B illustrates a spade relative to an installed spoon device in accordance with one embodiment.
Figure 14C:
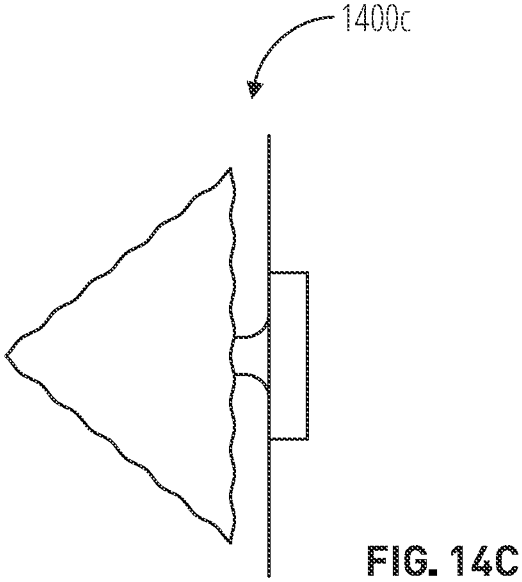
FIG. 14C illustrates a spoon device installed under a low canopy tree in accordance with one embodiment.
Figure 14A:
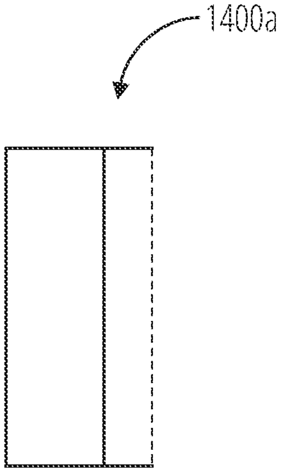
FIG. 14A illustrates an installed spoon device in accordance with one embodiment.
Figure 14D:
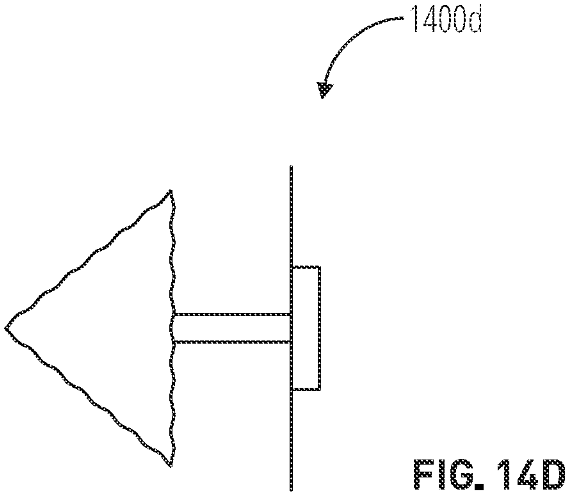
FIG. 14D illustrates a spoon device installed under a high canopy tree in accordance with one embodiment.
Figure 15:
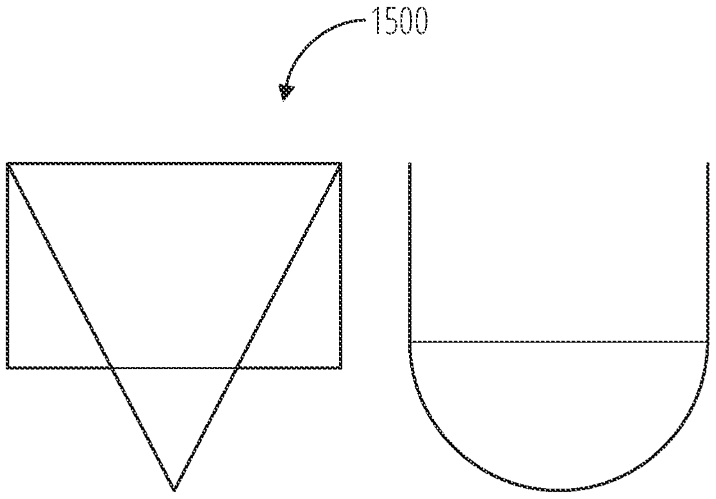
FIG. 15 illustrates remaining dirt of a spade relative to a spoon device in accordance with one embodiment.

With respect to FIGS. 14B, 14C, 14D and 15, the spoon device 1400*b*, 1400*c*, 1400*d*, 1500 is represented by the rectangular box. The spade in FIGS. 14B and 15 are representative of an exemplary tree. In some aspects, the spade dimensions may vary based at least partially on the size of the tree and type of tree.

FIG. 14A illustrates an installed spoon device 1400*a* in accordance with one embodiment. FIG. 14B illustrates a spade relative to an installed spoon device 1400*b* in accordance with one embodiment. FIG. 14C illustrates a spoon device 1400C installed under a low canopy tree in accordance with one embodiment. FIG. 14D illustrates a spoon device 1400D installed under a high canopy tree in accordance with one embodiment. FIG. 15 illustrates remaining dirt of a spade relative to a spoon device 1500 in accordance with one embodiment. The spade represents the area where the root ball is most collected. The remaining area is for the surrounding sand or dirt of the mature tree.

An exemplary method for digging a tree with a tree spoon system to facilitate transplanting of the tree will now be described in relation to FIGS. 16A-16E. In some aspects, digging the tree for transplantation may comprise a plurality of steps. In some implementations, at least a portion of these steps may be directed to one or more aspects of the operation of the tree spoon system 600. In some embodiments, the tree spoon system may comprise at least one controller 1602 and one or more hydraulic arms 1604 (only one shown). In some implementations, one or more portions or components of the system 600 may be driven or otherwise moved via one or more forces applied from at least one machine 20. In some aspects, the machine 20 may comprise at least one forklift accessory 602 coupled thereto. In some embodiments, the forklift accessory 602 may comprise one or more connectors, wherein each connector may be configured for at least temporarily connecting or securing to one end of one or the hydraulic arms 1604. In some implementations, the forklift accessory 602 may comprise one or more connectors configured to be at least temporarily connected to one or more of the telescopic pusher arms, as will be seen in FIG. 17A. In some aspects, a second end of each hydraulic arm 1604 may be at least temporarily secured to one of the side walls 312, 314 (not labeled in FIGS. 16A-16E, but shown in FIG. 3) of a three-sided box 310, such as, for example and not limitation, proximate to a front end of one of the side walls 312, 314.

Figure 16A:
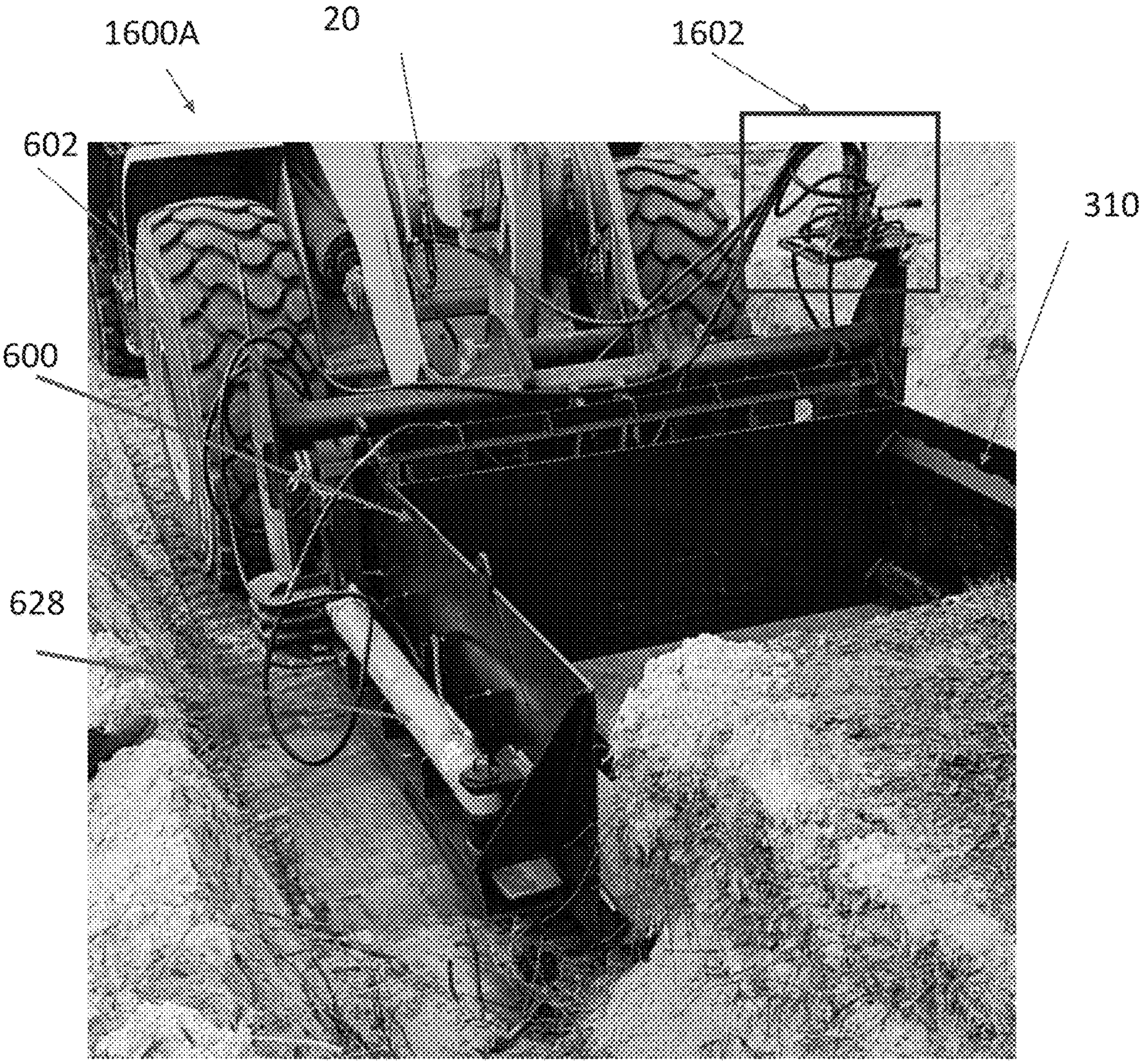
FIG. 16A illustrates a first step of digging a tree with the tree spoon system in accordance with one embodiment.

FIG. 16A illustrates a first step 1600A of digging a tree with the tree spoon system 600 in accordance with one embodiment. In FIG. 16A, the hydraulic arms 628 and 630 (only 628 shown in this view) are in a completely retracted position; however, in some aspects the hydraulic arms 628 and 630 may initially comprise a partially retracted position. In this view, the forks 606, 608 (not visible in FIG. 16A, but shown in FIG. 6B) of fork carriage 604 (not labeled in FIG. 16A) are connected to the tree spoon system 600 and fully inserted into elongated tubes 302, 304 (not labeled in FIG. 16A, but shown in FIG. 3). In some aspects, the tree spoon system 600 may be pushed forward or pulled backward by the machine 20. In this view, the serrated cutter 342 (not labeled in FIG. 16A, but shown in FIG. 3) is at least temporarily affixed to the front end of the three-sided box 310 of the spoon device to facilitate cutting through the ground and lower roots of a tree's root ball.

As can be seen in FIG. 16A, the machine 20 is at least temporarily attached at to a back or rear portion of the spoon device to push the spoon device away from the machine 20 and the fork carriage 604 as the hydraulic arms 628, 630 are altered to an at least partially extended position. In some aspects, the machine 20 may be configured to operate by implementing a series of alternating strokes, wherein the machine 20 pushes the spoon device forward, drives forward while the spoon device remains generally stationary to "catch up" to the spoon device, and then push the spoon device forward again, similar to the way a worm inches forward, as the spoon device digs increasingly farther under at least a portion of the root ball and the tree associated therewith.

Figure 16B:
FIG. 16B illustrates an intermediate step of digging the tree in accordance with one embodiment.

FIG. 16B illustrates an intermediate step 1600B of digging the tree in accordance with one embodiment. In some aspects, one or more applied forces from one or more motors of the machine 20 may push the three-sided box 310 (not labeled in FIG. 16B but shown in FIG. 3) and the serrated cutter 342 (not labeled in FIG. 16B but shown in FIG. 3) associated therewith forward to instigate one or more initial cuts through the ground and roots of the tree.

Figure 16C:
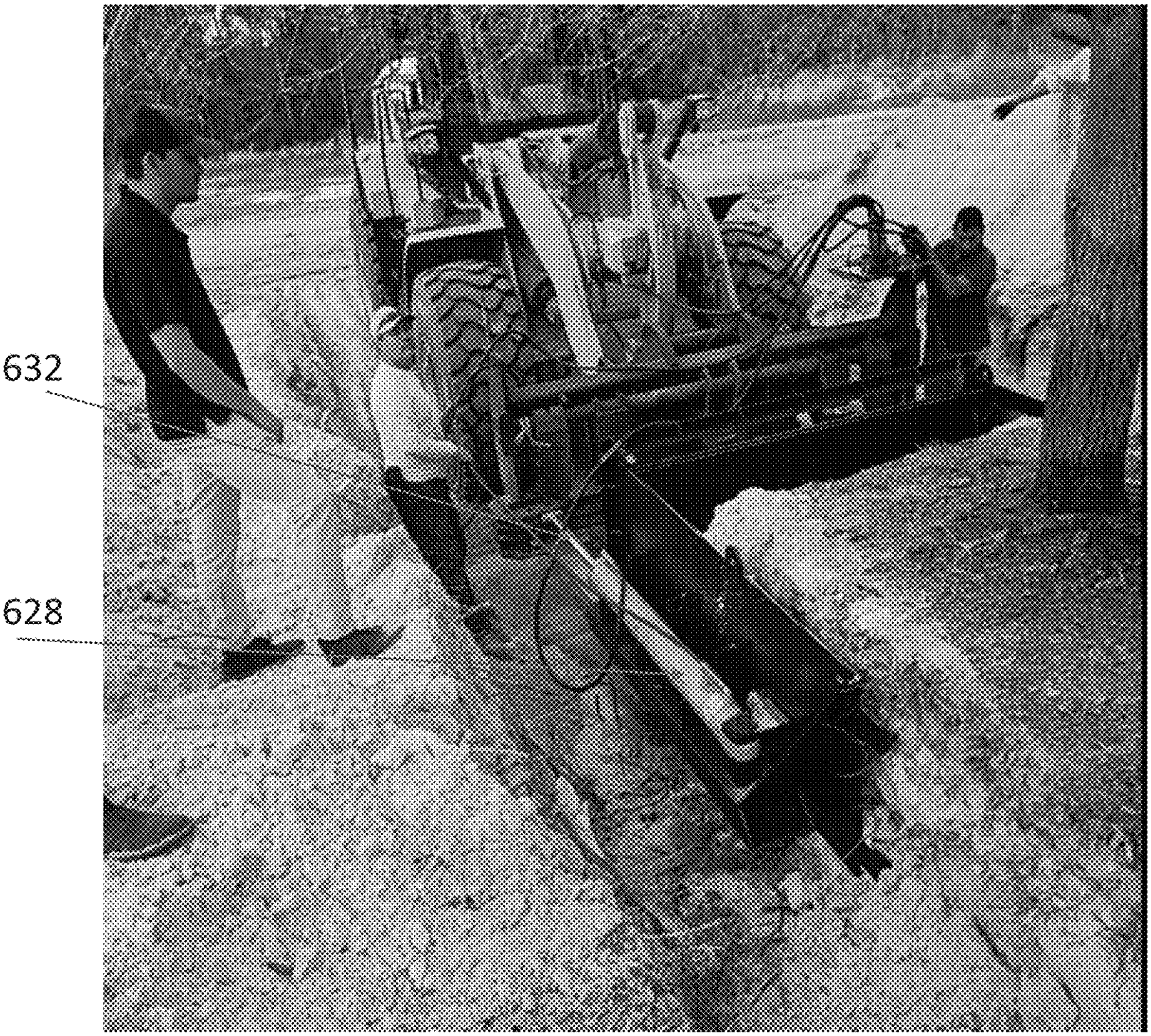
FIG. 16C illustrates an intermediate step of digging the tree in accordance with one embodiment.

FIG. 16C illustrates an intermediate step 1600C of digging the tree in accordance with one embodiment. In some aspects, the controller 1602 (not labeled in FIG. 16C) may be communicatively coupled to the hydraulic arms 628, 630 (only 628 shown in this view) such that the controller 1602 may be configured to control activation and deactivation of the hydraulic arms 628, 630 to facilitate alteration of the hydraulic arms 628, 630 between an extended state and a retracted state. In some embodiments, activating the hydraulic arms 628, 630 may alter the hydraulic arms 628, 630 to an at least partially extended position to push the three-sided box 310 and serrated cutter 342 (not labeled in FIG. 16C) associated therewith forward such that the bottom surface 318 (not labeled in FIG. 16A but shown in FIG. 3) of the three-sided box 310 slides under at least a portion of the root ball and at least a portion of the root ball is received by the opening defined by the front edges of the first and second side walls 312, 314 (not labeled in FIG. 16A but shown in FIG. 3). In some non-limiting exemplary implementations, the three-sided box 310 and serrated cutter may be pushed forward until the operational end of each hydraulic arm extenders 632, 634 (only 632 shown in this view) is in a fully extended position. In some embodiments, the controller 1602 may be communicatively coupled to one or more motors configured to drive or otherwise move one or more portions of the machine 20 such that the controller 1602 may be configured to control one or more aspects of the operation of the motor(s), such as, for example and not limitation, activation or deactivation of the motor(s). In some implementations, the controller 1602 may be configured to receive one or more user inputs, such as, for example and not limitation, via one or more buttons, switches, or similar input devices, to activate the hydraulic arms 628, 630 and/or the motor(s) of the machine 20, or the controller 1602 may be configured to operate in an at least partially autonomous fashion via one or more coded instructions or algorithms that may be accessed and executed by at least one processing device communicatively coupled to or integrated with the controller 1602, as non-limiting examples.

In FIG. 16C, the tree and the root ball associated therewith have not been fully received by the three-sided box 310. Accordingly, to continue the digging process, the machine 20 may be moved forward via activation of one or more motors while the controller 1602 is used to concurrently activate the hydraulic arm extenders 632 and 634 (only 632 shown in this view) to alter the hydraulic arm extenders to an at least partially retracted position such that the machine 20 moves towards the spoon device and the three-sided box 310 associated therewith as the spoon device remains generally stationary to start another stroke or cycle.

Figure 16D:
FIG. 16D illustrates an intermediate step of digging the tree in accordance with one embodiment.
Figure 16E:
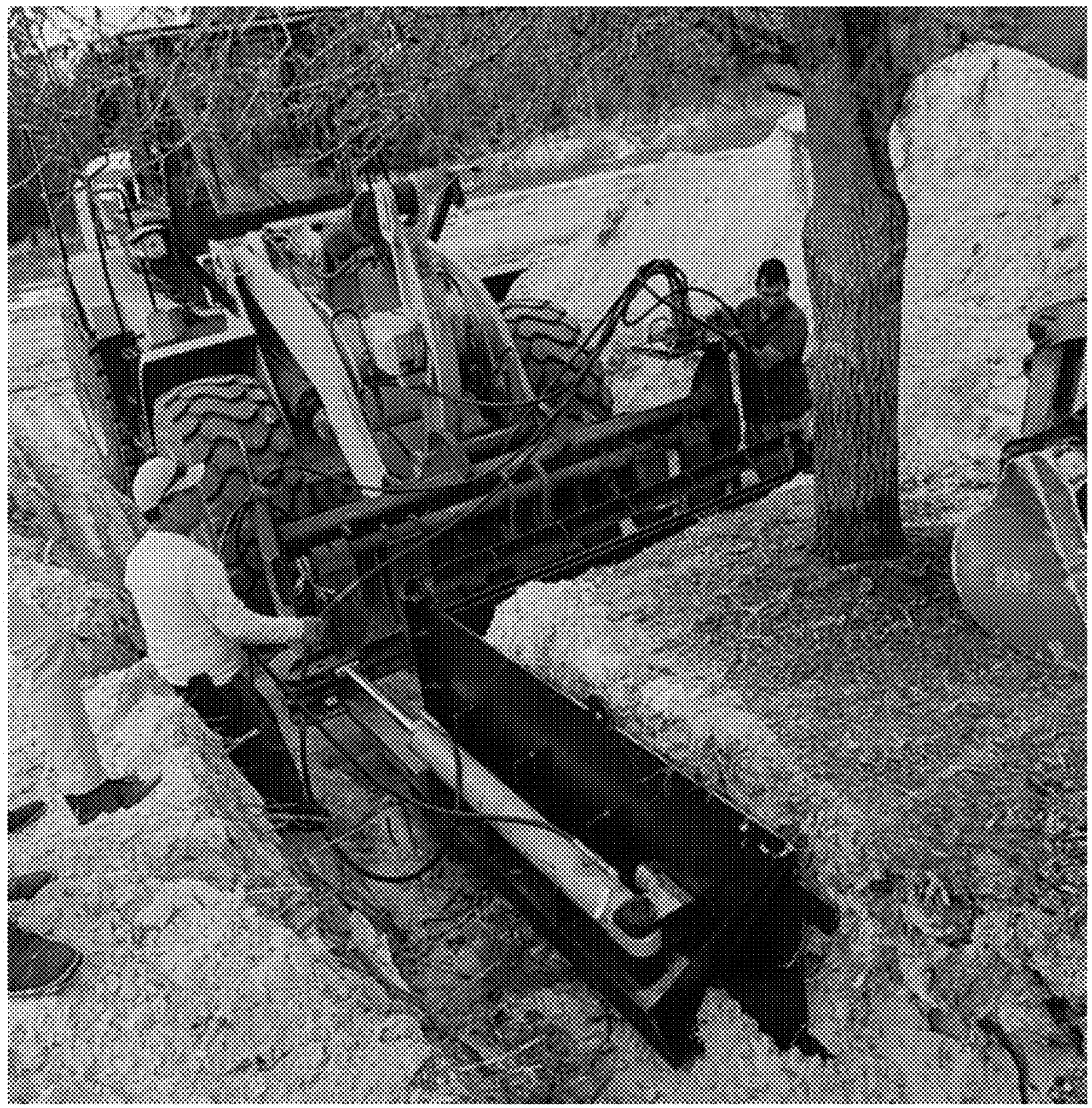
FIG. 16E illustrates an intermediate step of digging the tree in accordance with one embodiment.

FIG. 16D illustrates an intermediate step 1600D of digging the tree in accordance with one embodiment. FIG. 16E illustrates an intermediate step 1600E of digging the tree in accordance with one embodiment. The intermediate steps 1600D and 1600E of FIGS. 16D and 16E are essentially the same as intermediate steps 1600B and 1600C of FIGS. 16B-16C except that intermediate steps 1600D and 1600E comprise a second stroke of the hydraulic arms 628 and 630 (only 628 shown in this view) to push the three-sided box 310 and associated serrated cutter 342 (not labeled in FIGS. 16D and 16E) forward until the operational end of each of the hydraulic arm extenders 632, 634 (only 632 shown in this view) is in an at least partially extended position. In some aspects, the execution of intermediate steps 1600D and 1600E may facilitate the ability of the serrated cutter 342 to cut through the ground and roots of the tree while also maintaining the tree in a substantially vertical or upright orientation. In some implementations, intermediate steps 1600D and 1600E may be repeated as necessary until at least a portion of the root ball of the tree is completely received by the three-sided box 310 (not labeled in FIGS. 16D and 16E).

In some embodiments, after the root ball has been completely received by the three-sided box 310 after completion of steps 1600A, 1600B, 1600C, 1600D, and 1600E, the tree may be lifted up and away to be transported and replanted at a second, destination location.

FIGS. 17A-17F show different steps to remove a tree from the three-sided box 310 of the tree spoon system 600. In some non-limiting exemplary implementations, once the tree is dug up and ready for transport, the serrated cutter 342 may be removed. In some embodiments, the serrated cutter 342 may be permanently fixed to the front end of the three-sided box 310.

Figure 17A:
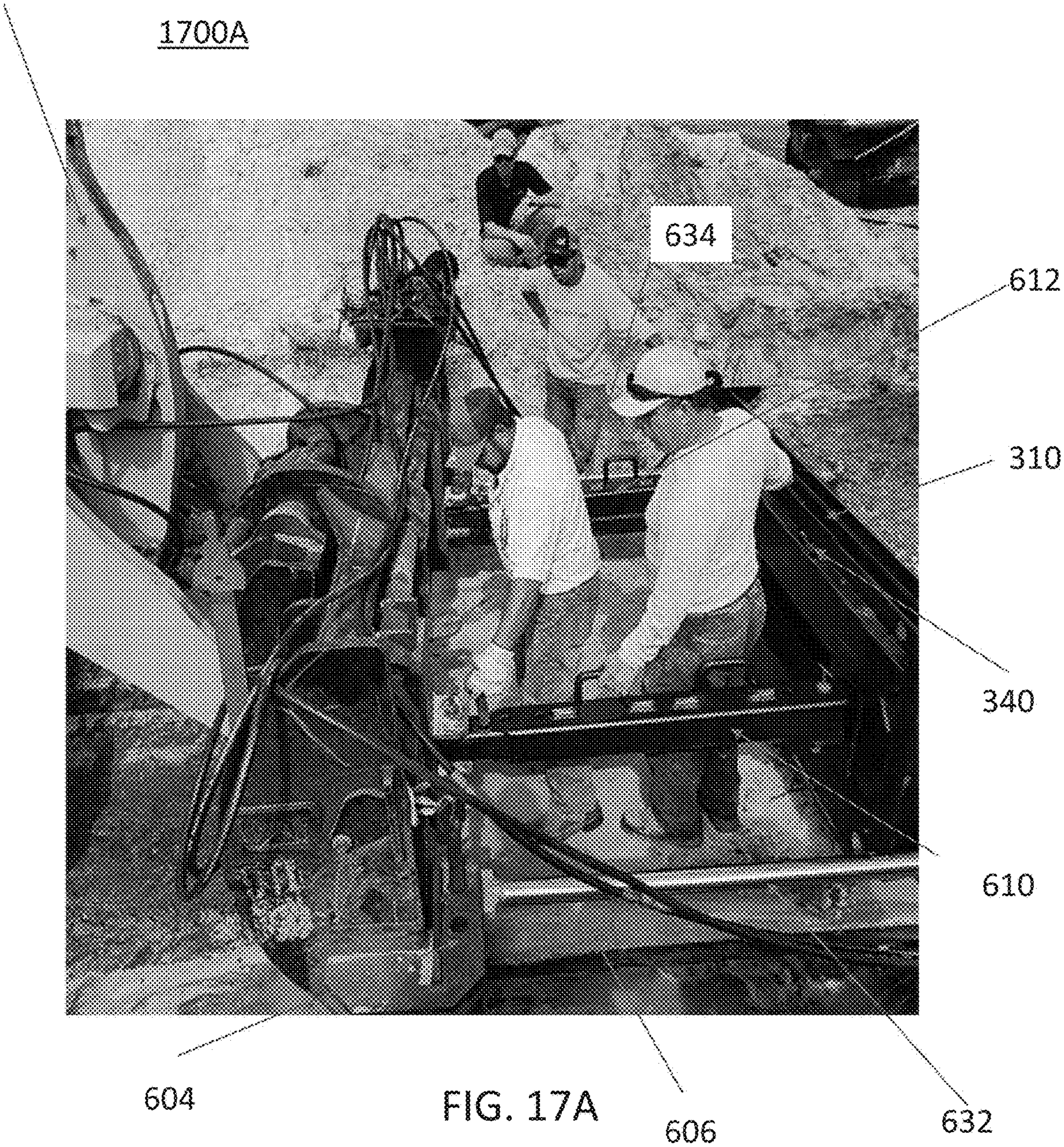
FIG. 17A illustrates a first step of removing a tree from the tree spoon system in accordance with one embodiment.

FIG. 17A illustrates a first step 1700A of removing a tree from the tree spoon system 600 in accordance with one embodiment. The fork carriage 604 is shown attached to the machine 20. In some aspects, the forks 606 and 608 (only fork 606 is labeled in FIG. 17A) are coupled to the carriage 604 and may be removably received by the elongated tubes 302, 304 (not visible in FIG. 17A but shown in FIG. 3) of the three-sided bowl 310. In some implementations, the forks 606 and 608 are constructed and arranged to align with and be inserted into openings of the elongated tubes 302, 304. In some embodiments, the tree may remain on the same machine 20 used to dig the tree or tree may be transported and/or planted using a different machine 20.

In this view, to remove the tree, one or more telescoping pusher arms 610, 612 are inserted between the fork carriage 604 and the movable pusher plate 340, wherein opposing ends of the telescoping pusher arms 610, 612 are at least temporarily attached or secured to the fork carriage 604 and the movable pusher plate 340. In some embodiments, the hydraulic arm extenders 632, 634 may be altered to an at least partially extended position to increase the distance between the fork carriage 604 and the three-sided box 310 (including the movable pusher plate 340 associated therewith) to provide clearance for the telescoping pusher arms 610 and 612. In this step, the telescoping pusher arms 610 and 612 may be in an at least partially retracted position or a completely retracted position.

Figure 17B:
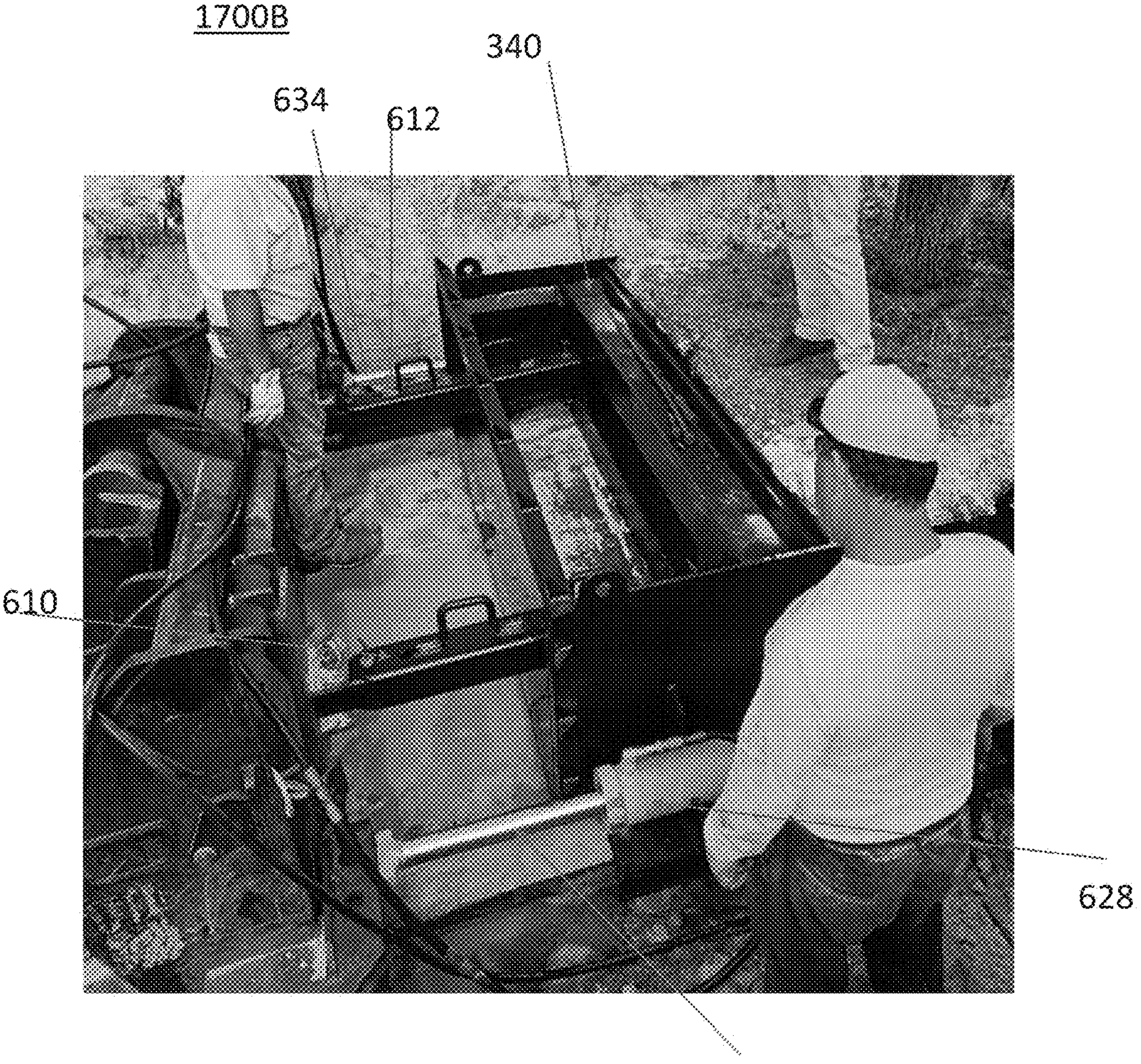
FIG. 17B illustrates an intermediate step of removing the tree in accordance with one embodiment.

FIG. 17B illustrates an intermediate step 1700B of removing the tree in accordance with one embodiment. In some aspects, the controller 1602 (not visible in FIG. 17B) may activate the hydraulic arms 628, 630 (only 628 is labeled in FIG. 17B) to alter each of the hydraulic arms 628, 630 to an at least partially retracted position wherein an exposed portion of the hydraulic arm extenders 632, 634 is decreased, thereby causing the three-sided box 310 (not labeled in FIG. 17B) to be pulled closer to the machine 20 (not visible in FIG. 17B) and the fork carriage 604 (not labeled in FIG. 17B) coupled thereto while the telescoping pusher arms 610, 612 exert one or more forces on the movable pusher plate 340 to maintain the movable pusher plate 340 in a generally stationary position, such that the movable pusher plate 340 moves forward within the three-sided box 310 as the three-sided box 310 moves backward relative to the stationary movable pusher plate 340. The telescoping pusher arms 610, 612 may comprise a locked state during the execution of step 1700B to maintain a substantially rigid configuration that allows the telescoping pusher arms 610, 612 to exert one or more pushing forces upon the movable pusher plate 340. In some non-limiting exemplary implementations, one or more motors of the machine 20 may be activated or one or more brakes of the machine 20 may be applied during at least a portion of step 1700B to maintain the machine 20 in a generally stationary position.

Figure 17C:
FIG. 17C illustrates an intermediate step of removing the tree in accordance with one embodiment.

FIG. 17C illustrates an intermediate step 1700C of removing the tree in accordance with one embodiment. In some implementations, at step 1700C, the hydraulic arm extenders 632 and 634 (not labeled in FIG. 17C) are activated by the controller 1602 (not labeled in FIG. 17C) to be altered to the fully retracted position. In some aspects, the telescoping pusher arms 610, 612 may remain in the locked state such that each of the telescoping pusher arms 610, 612 maintain a substantially fixed length, thereby allowing full stroke or cycle to be completed.

Figure 17D:
FIG. 17D illustrates an intermediate step of removing the tree in accordance with one embodiment.

FIG. 17D illustrates an intermediate step 1700D of removing the tree in accordance with one embodiment. In some aspects, at step 1700D, a second stroke or cycle is initiated, which may comprise altering each of the telescoping pusher arms 610, 612 (not labeled in FIG. 17D) to the unlocked state such that the second tubular member 904 (not labeled in FIG. 17D) of each telescoping pusher arm 610, 612 is able to slide freely within the first tubular member 902 (not labeled in FIG. 17D) and activating (such as, for example and not limitation, via the controller 1602 (not labeled in FIG. 17D)) the hydraulic arms 628, 630 (not labeled in FIG. 17D) to alter the hydraulic arms 628, 360 to an at least partially extended position to increase the length of the exposed portion of each of the hydraulic arm extenders 632, 634 (not labeled in FIG. 17D) while simultaneously activating one or more motors of the machine 20 (not visible in FIG. 17D) to move the machine 20 backward such that the three-sided box 310 (not labeled in FIG. 17D) and the movable pusher plate 340 (not labeled in FIG. 17D) associated therewith remain generally stationary as the length of the exposed portion of the second tubular member 904 of each telescoping pusher arm 610, 612 is increased and the machine 20 moves away from the three-sided box 310. In some implementations, each of the telescoping pusher arms 610, 612 may be altered to the locked state to fix the exposed length of the second tubular member 904 associated therewith. In some embodiments, the movable pusher plate 340 may maintain the ground and root ball material in a substantially vertical orientation as well as substantially straight to keep the material compacted.

Figure 17E:
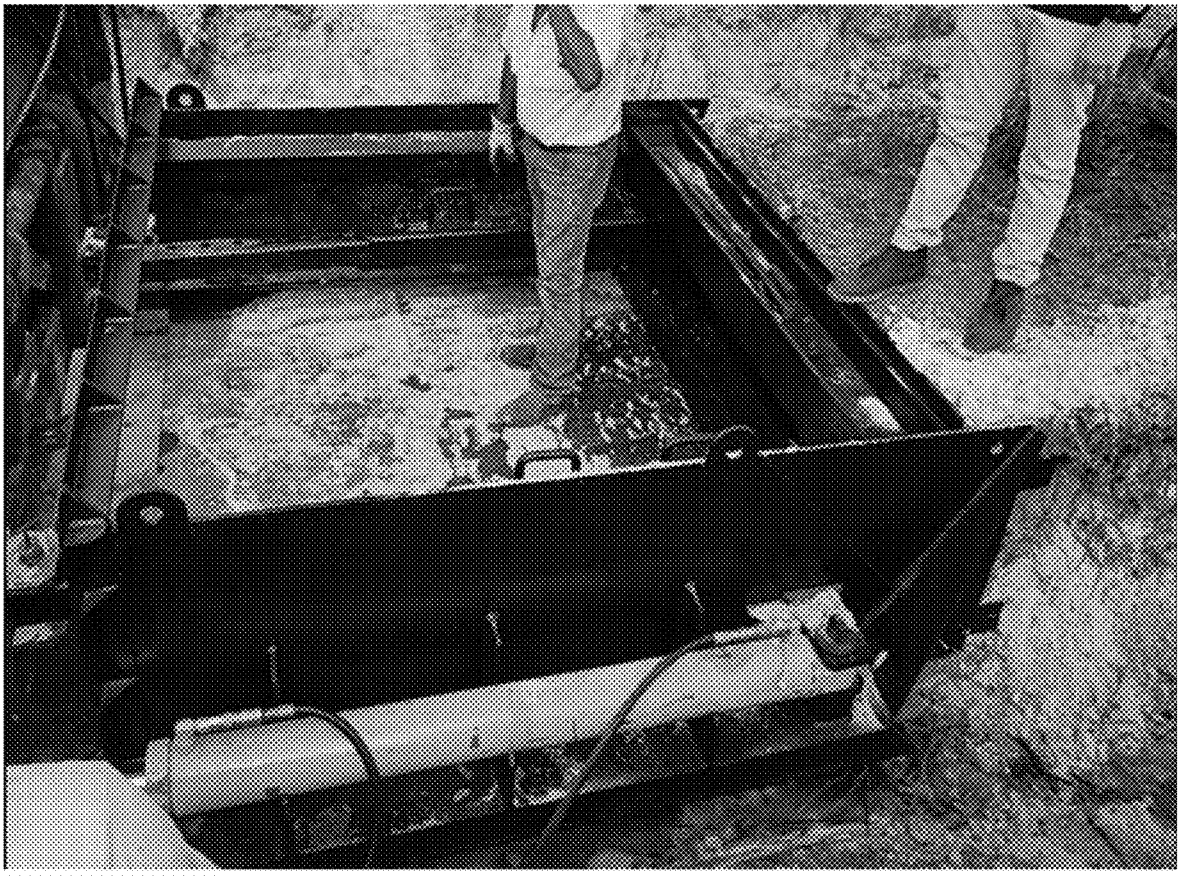
FIG. 17E illustrates an intermediate step of removing the tree in accordance with one embodiment.

FIG. 17E illustrates an intermediate step 1700E of removing the tree in accordance with one embodiment. In some aspects, at step 1700E, the hydraulic arms 628, 630 (not labeled in FIG. 17E) may be activated and altered to an at least partially retracted position such that the exposed length of the hydraulic arm extenders 632, 634 (not labeled in FIG. 17E) is decreased. In some implementations, the hydraulic arms 628, 630 may be activated by the controller 1602 (not visible in FIG. 17E), either based at least partially on one or more user inputs or in an autonomous fashion. In some embodiments, the telescoping pusher arms 610, 612 (not labeled in FIG. 17E) may comprise the locked state during step 1700E, such that the telescoping pusher arms 610, 612 may apply one or more forces to the movable pusher plate 340 (not labeled in FIG. 17E) to maintain the movable pusher plate 340 in a generally stationary position as the three-sided box 310 (not labeled in FIG. 17E) is pulled backward such that the movable pusher plate 340 moves towards the front of the three-sided box 310 (not labeled in FIG. 17E). In some implementations, the bottom surface or bottom edge of the movable pusher plate 340 may be configured proximate to the bottom surface 318 (not labeled in FIG. 17E). In some embodiments, at least a portion of the bottom edge of the movable pusher plate 340 may be configured to physically contact the bottom surface 318 of the three-sided box 310 such that the bottom edge of the movable pusher plate 340 may scrape the bottom surface 318 as the movable pusher plate 340 moves forward relative to the three-sided box 310 such that the tree and root ball with collected ground material may be pushed off of and out of the three-sided box 310 via the open portion thereof for replanting (or in some cases, initial planting). In some non-limiting exemplary implementations, one or more motors of the machine 20 (not visible in FIG. 17E) may be activated or one or more brakes of the machine 20 may be applied during at least a portion of step 1700E to maintain the machine 20 in a generally stationary position.

Figure 17F:
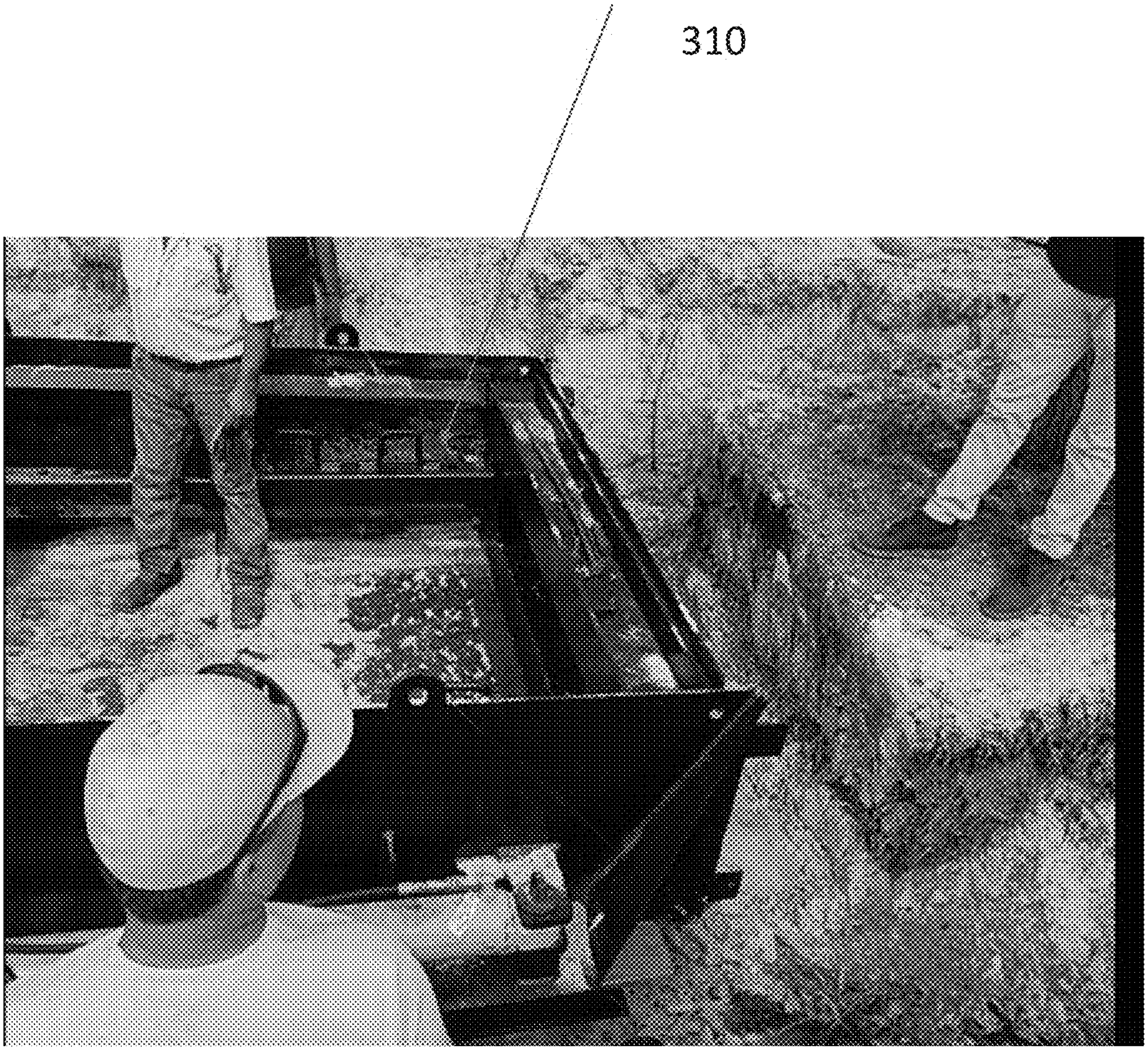
FIG. 17F illustrates an intermediate step of removing the tree in accordance with one embodiment.

FIG. 17F illustrates an intermediate step 1700F of removing the tree in accordance with one embodiment. In this view, the three-sided box 310 has been moved rearward by the machine 20 (not visible in FIG. 17F) away from the offloaded tree and root ball.

In the embodiment of FIGS. 16A-16E, the movable pusher plate 340 is initially installed at the rear or back end of the three-sided box 310 and remains at the rear or back end during the digging process. In some embodiments, the movable pusher plate 340 may be initially installed at the front end of the three-sided box 310 such that as the tree and root ball are dug up, the movable pusher plate 340 may be moved towards the rear or back of the three-sided box 310, as will be described in FIGS. 18A-18C. The embodiment shown in FIGS. 18A-18C is otherwise substantially similar to the embodiment shown in FIGS. 16A-16E; therefore, only the differences are described.

Figure 18A:
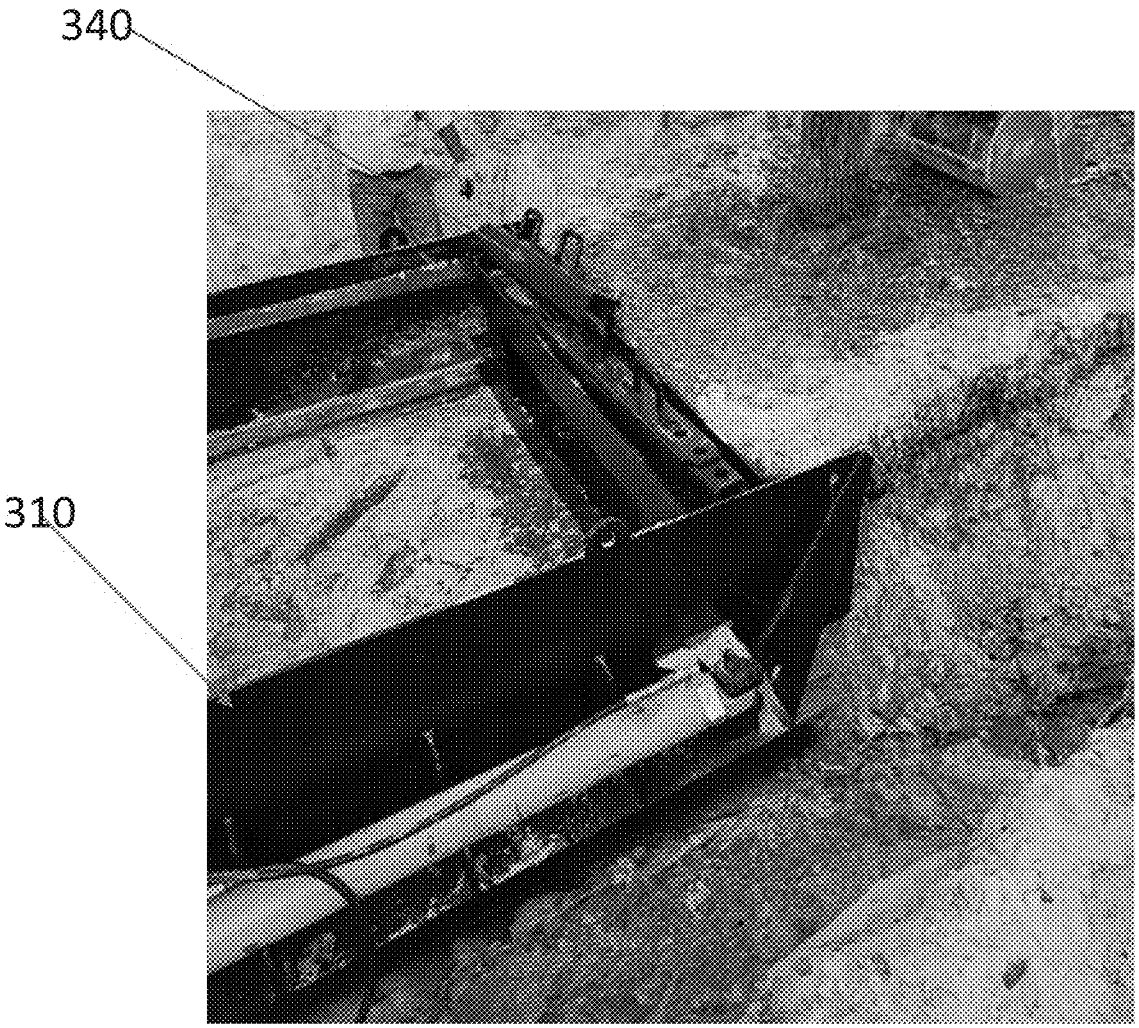
FIG. 18A illustrates a first step of digging a tree with the tree spoon system in accordance with one embodiment.

FIG. 18A illustrates a first step 1800A of digging a tree with the tree spoon system 600 in accordance with one embodiment. In some embodiments, the movable pusher plate 340 may be initially positioned at the front of the three-sided box 310. In this view, the telescoping pusher arms 610, 612 are not installed.

Figure 18B:
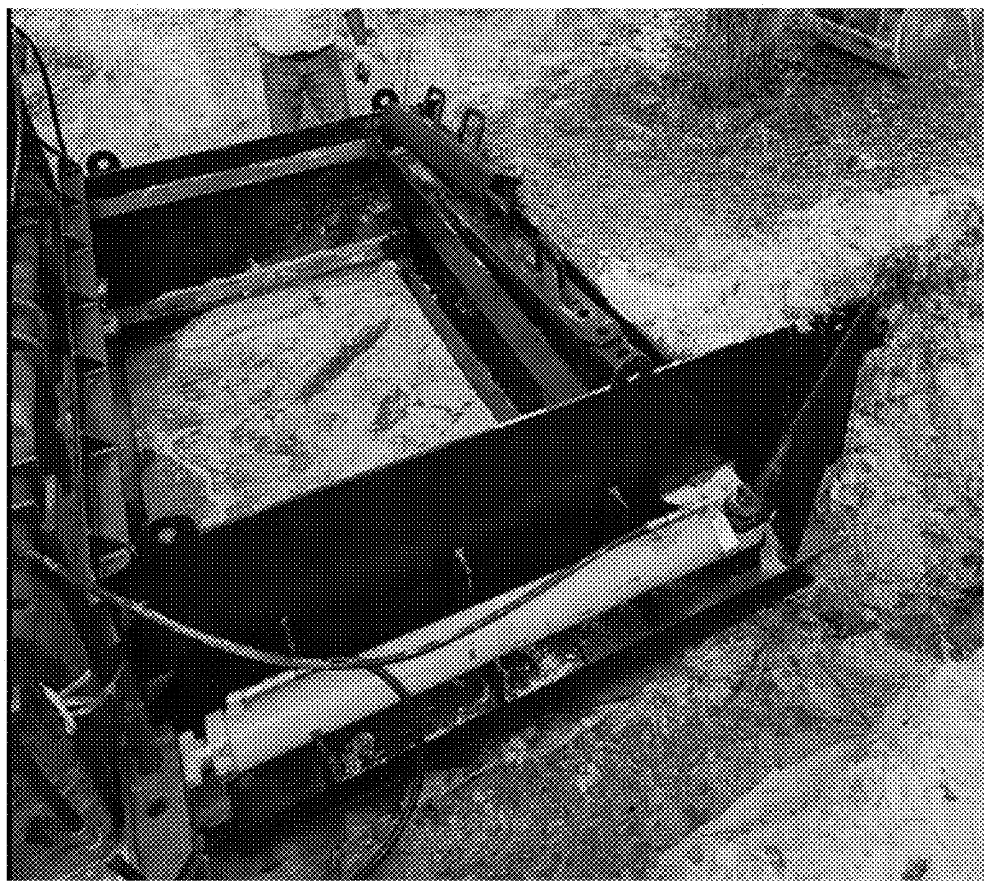
FIG. 18B illustrates an intermediate step of digging a tree in accordance with one embodiment.

FIG. 18B illustrates an intermediate step 1800B of digging a tree in accordance with one embodiment. In this view, the controller 1602 (not visible in FIG. 18B) activates one or more motors of the machine 20 (not visible in FIG. 18B) and/or activates the hydraulic arms 628, 630 (not labeled in FIG. 18B), either based on one or more user inputs or in an autonomous manner, so that the bottom surface 318 (not labeled in FIG. 18B) of the three-sided box 310 (not labeled in FIG. 18B) is pushed under the tree and at least a portion of the root ball associated therewith such that the movable pusher plate 340 (not labeled in FIG. 18B) is pushed towards the back or rear portion of the three-sided box 310 and the root ball is received within the interior portion of the three-sided box 310.

Figure 18C:
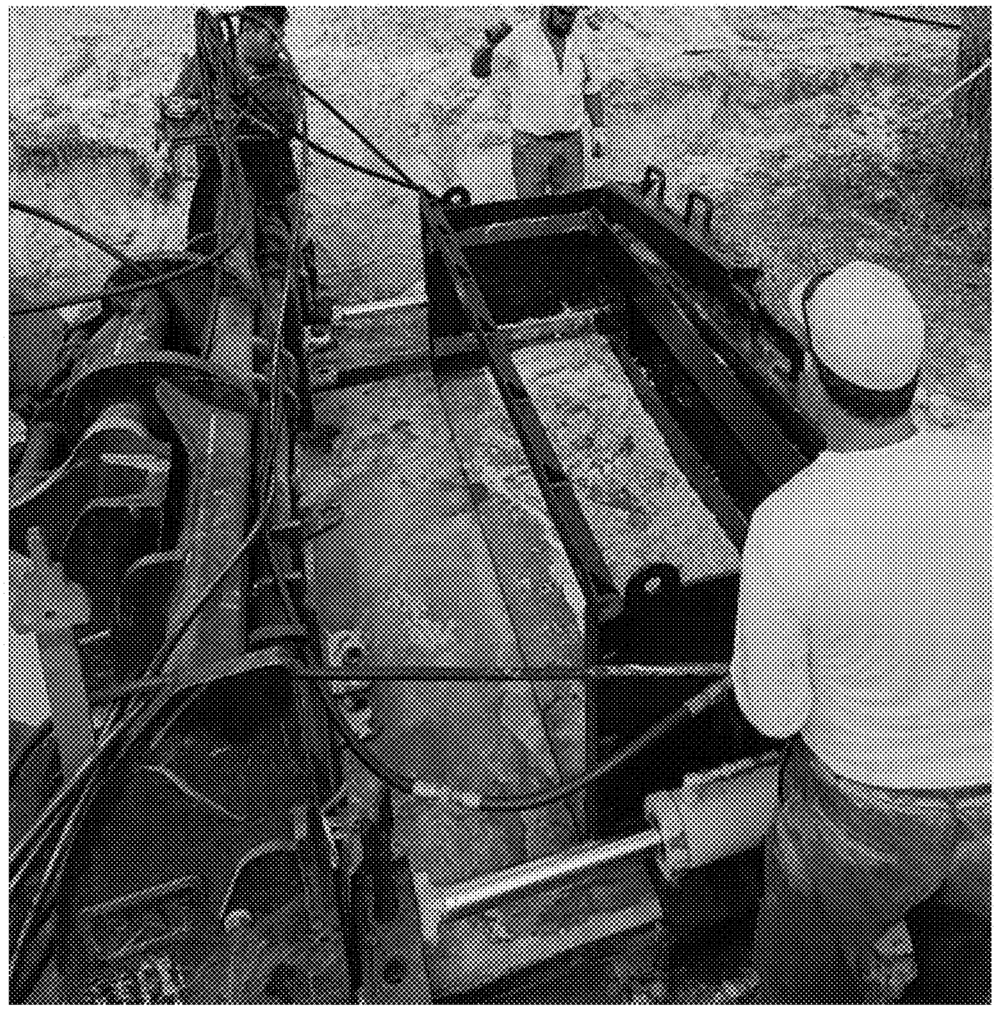
FIG. 18C illustrates an intermediate step of digging a tree in accordance with one embodiment.

FIG. 18C illustrates an intermediate step 1800C of digging a tree in accordance with one embodiment. In this view, the digging process is near the end. This view shows the movable pusher plate 340 (not labeled in FIG. 18C) closer to the back end of the three-sided bowl 310 (not labeled in FIG. 18C).

Figure 19:
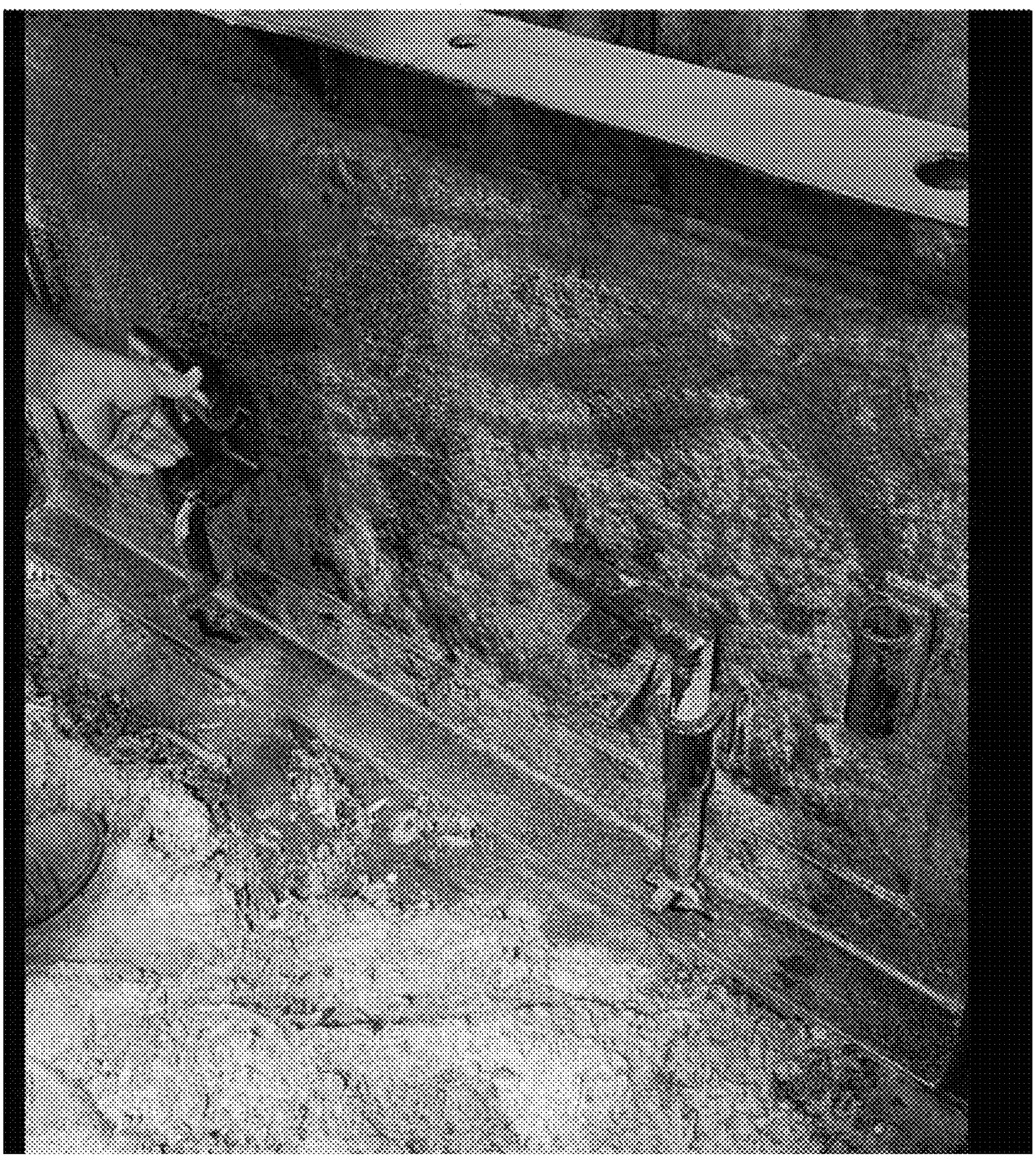
FIG. 19 illustrates a pair of pole locks in accordance with one embodiment.

FIG. 19 illustrates a pair of pole locks 1900 in accordance with one embodiment. In some aspects, the pole locks 1900 may be used to removably secure one or more portions of the bottom surface 318 (not visible in FIG. 19) to one or more of the side walls 312, 314 (not labeled in FIG. 19) of the three-sided box 310 (not labeled in FIG. 19). In some implementations, each of the pole locks 1900 may configured to be removably received by a pair of aligned apertures within an outer lip or rim of each side wall 312, 314 and the bottom surface 318. In some embodiments, each pole lock 1900 may comprise one or more protrusions configured to be received by one or more corresponding slots or notches extending from the aligned apertures such that each pole lock 1900 may be removed from or inserted into the aligned apertures when the protrusion(s) are aligned with the notch(es), wherein rotating the pole lock 1900 may cause the protrusion(s) to be unaligned with the notch(es) such that the pole lock 1900 may be physically prevented from being removed from the apertures, thereby locking the pole lock 1900 within the aligned apertures and securing the side walls 312, 314 to the bottom surface 318.

FIG. 20A illustrates a first step 2000A of digging a tree with a tree spoon system in accordance with one embodiment. In some aspects, the tree spoon system in FIG. 20A may comprise the box 100 previously described in relation to FIGS. 1A-1C and 2. In some embodiments, the tree digging system in FIG. 20A may comprise one or more hydraulic arms 2022; however, the hydraulic arms 2022 of this embodiment may be oriented in a different direction and may attach differently. In some aspects, at step 2000A, the three-sided box 100 may be moved towards the tree and the tree's root ball. In this illustration, the machine 20 (not labeled in FIG. 20A) and the hydraulic arms 2022 are configured to moves the box 100 such that the bottom surface 106 (not labeled in FIG. 20A) slides under at least a portion of the tree's root ball to dig under the root ball and tree as the box 100 is pushed away from the machine 20 and each of the hydraulic arms 2022 is altered to the extended position. In some aspects, each of the hydraulic arms 2022 is pivotally connected to one of the laterally opposing side walls 104, 116 (not labeled in FIG. 20A) of the box 100 in proximity to the front end of the box 100. In some implementations, this configuration may allow the box 100 to be lifted from the back or rear end portion such that the front end tilts to dig deeper into the ground or earth around the root ball while being moved forward toward the root ball during a digging stroke or cycle. In this position, the bottom surface 106 of the box 100 is slightly angled relative to a horizontal plane such that the rear end of the box 100 is elevated relative to the front end of the box 100. In some aspects, the front end of the box 100 may then be lifted so that the bottom surface of the box 100 is essentially parallel to the horizontal plane.

In some implementations, the tree spoon system may be used to repeat the digging stroke followed by lifting the front end to be essentially parallel with the horizontal plane until the root ball and tree associated therewith are completely received by and fully loaded into the box 100. In some aspects, after the root ball is dug up, the machine 20 may be used to lift the box 100 away from the ground to transport the tree to a second location, wherein the second location may comprise a local or remote location. While not shown, in some implementations, the lifting apparatus 112 may be attached to the top portion of the box 100, the cutting blade 120 may be removed, and the wall 102 may be attached to secure the ground or earth material and tree within the box 100 during transport.

The front end of the box 100 may comprise at least one curbed sled attachment so that when attached, the sled attachment may facilitate the ability of the box 100 or spoon device to be pushed or pulled along the ground to a desired location.

FIG. 20B illustrates an intermediate step 2000B of digging a tree in accordance with one embodiment with the box 100 of FIG. 1A-1C. In some aspects, at step 200B, the controller 1602 (not labeled in FIG. 20B) may be configured to facilitate operation of the hydraulic arms 2022 to alter the hydraulic arms 2022 to an at least partially extended position while the machine 20 remains generally stationary, thereby providing one or more forces to dig up the tree and the root ball associated therewith.

FIG. 20C illustrates an intermediate step 2000C of digging a tree in accordance with one embodiment with the box 100 of FIGS. 1A-1C where the root ball is completely received within the box 100. In some aspects, at step 2000C, tree and root ball may be completely received within the box 100. In some implementations, after the root ball and tree are in the box 100, the lifting apparatus 112 (not shown in FIG. 20C) may be at least temporarily installed. As shown, a second machine may be used to dig proximate to the edge of the root ball/ground closest to the front end of the spoon device and the box 100 so that the tree and root ball may be at least partially separated from the adjacent ground and dirt to facilitate lifting of the tree and root ball from the current location.

In any operation, a trench is dug to the root ball which is larger than the width of the machine 20 and spoon device and the spoon device is moved by the machine 20 within the trench until the tree spoon system reaches a position wherein a front edge of the spoon device is proximate to the root ball. In some aspects, one or more edges of the root ball may be dug up prior to the start of digging. At the remote planting location, a trench is dug such that the back wall of the trench may be substantially straight so that the tree may be off-loaded from the spoon device efficiently and effectively.

In some implementations, at the destination location, the lifting apparatus 112 may be used to lower the tree and the root ball associated therewith into a hole for transplanting the tree root ball. In some embodiments, the base plate or bottom surface 106 (not labeled in FIG. 20C) of the box 100 may at least partially comprise an amount of wood or one or more other biodegradable materials such that the bottom surface 106 may be planted with the tree and root ball while the remaining parts of the box 100 and lifting apparatus 112 are removed before filling in the hole with dirt, soil, or similar ground material.

In some aspects, the bottom surface 106 may comprise one or more pieces or sections that may be removed so that the tree and root ball may be planted without the bottom surface 106.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B. Moreover, unless specifically stated, any use of the terms front, back, etc., are used to provide a frame of reference of an element when describing said element and since an element may be turned around, the front of an element may become the back of the element.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A spoon device for transplanting trees comprising:

a box, wherein the box comprises a plurality of side walls and a bottom surface, wherein the plurality of side walls comprises at least a first side wall and a second side wall configured on opposing lateral sides of the box such that an opening is defined between front edges of the first and second side walls, wherein the first side wall is parallel to the second side wall, wherein each of the plurality of side walls extends upwardly from and is perpendicularly coupled to the bottom surface;

at least one movable pusher plate, wherein the at least one movable pusher plate is perpendicular to the first and second side walls and extends at least partially between the first and second side walls, wherein that at least one movable pusher plate is configured to achieve translational movement along a longitudinal axis that is parallel to the first and second side walls; and a plurality of elongated tubes, wherein the plurality of elongated tubes comprises at least a first elongated tube and a second elongated tube, wherein the first elongated tube is configured adjacent to the first side wall and the second elongated tube is configured adjacent to the second side wall, wherein each of the plurality of elongated tubes is configured to removably receive a fork of a forklift.

2. The spoon device of claim 1, further comprising a plurality of elongated channels, wherein the plurality of elongated channels comprises at least a first elongated channel and a second elongated channel, wherein the first elongated channel is configured along an interior surface of the first side wall and the second elongated channel is configured along an interior surface of the second side wall.

3. The spoon device of claim 2, wherein the at least one movable pusher plate comprises a plurality of tracks, wherein the plurality of tracks comprises at least a first track and a second track configured on opposing lateral ends of the at least one movable pusher plate, wherein the first track is configured to be slidably received by the first elongated channel and the second track is configured to be slidably received by the second elongated channel.

4. The spoon device of claim 3, wherein the first elongated channel extends beyond the front edge of the first side wall to mate with the first track and the second elongated channel extends beyond the front edge of the second side wall to mate with the second track.

5. The spoon device of claim 1, further comprising at least one serrated cutting blade configured to be at least temporarily secured to at least a portion of a front end of the bottom surface.

6. A tree spoon system for transplanting trees comprising:

a spoon device, wherein the spoon device comprises:

a box, wherein the box comprises a plurality of side walls and a bottom surface, wherein the plurality of side walls comprises at least a first side wall and a second side wall configured on opposing lateral sides of the box such that an opening is defined between front edges of the first and second side walls, wherein the first side wall is parallel to the second side wall, wherein each of the plurality of side walls extends upwardly from and is perpendicularly coupled to the bottom surface;

at least one movable pusher plate, wherein the at least one movable pusher plate is perpendicular to the first and second sidewalls and extends at least partially between the first and second side walls, wherein that at least one movable pusher plate is configured to achieve translational movement along a longitudinal axis that is parallel to the first and second side walls, wherein the at least one movable pusher plate comprises a plurality of tracks, wherein the plurality of tracks comprises at least a first track and a second track configured on opposing lateral ends of the at least one movable pusher plate;

a plurality of elongated tubes, wherein the plurality of elongated tubes comprises at least a first elongated tube and a second elongated tube, wherein the first elongated tube is configured adjacent to the first side wall and the second elongated tube is configured adjacent to the second side wall; and a plurality of elongated channels, wherein the plurality of elongated channels comprises at least a first elongated channel and a second elongated channel, wherein the first elongated channel is configured along an interior surface of the first side wall and the second elongated channel is configured along an interior surface of the second side wall, wherein the first track of the at least one movable pusher plate is configured to be slidably received by the first elongated channel and the second track is configured to be slidably received by the second elongated channel; and at least one machine, wherein the at least one machine comprises at least one forklift accessory coupled thereto, wherein the at least one forklift accessory comprises a fork carriage with two or more forks coupled to and extending from the fork carriage, wherein each of the plurality of elongated tubes of the spoon device is configured to removably receive one of the two or more forks of the fork carriage.

7. The tree spoon system of claim 6, further comprising one or more telescoping pusher arms, wherein each of the one or more telescoping pusher arms comprises a first end and a second end, wherein the first end of each of the one or more telescoping pusher arms is configured to be at least temporarily secured to the at least one movable pusher plate and the second end of each of the one or more telescoping pusher arms is configured to be at least temporarily secured to the fork carriage, wherein each of the one or more telescoping pusher arms is alterable between a retracted position and an extended position.

8. The tree spoon system of claim 7, wherein each of the one or more telescoping pusher arms comprises a first tubular member and a second tubular member, wherein the first tubular member and the second tubular member each comprises a diameter, wherein the diameter of the second tubular member is smaller than the diameter of the first tubular member such that the second tubular member is able to slide within the first tubular member to facilitate alteration between the retracted position and the extended position, wherein an exposed length of the second tubular member is greater in the extended position than in the retracted position.

9. The tree spoon system of claim 8, wherein the first tubular member and the second tubular member each comprises at least one hole configured to removably receive at least one fastener, wherein a position of the second tubular member relative to the first tubular member is fixed when the at least one hole of the first tubular member is aligned with the at least one hole of the second tubular member and the at least one fastener is received within the aligned at least one hole of the first and second tubular members.

10. The tree spoon system of claim 6, further comprising a plurality of hydraulic arms, wherein the plurality of hydraulic arms comprises at least a first hydraulic arm and a second hydraulic arm, wherein a first end of each of the plurality of hydraulic arms is at least temporarily secured to the at least one forklift accessory and a second end of each of the plurality of hydraulic arms is at least temporarily secured proximate to a front end of one of: the first side wall and the second side wall, wherein each of the plurality of hydraulic arms is alterable between a retracted position and an extended position.

11. The tree spoon system of claim 10, further comprising at least one controller, wherein the at least one controller is communicatively coupled to the plurality of hydraulic arms such that the at least one controller is configured to control activation and deactivation of each of the plurality of hydraulic arms.

12. The tree spoon system of claim 11, wherein the at least one controller is also communicatively coupled to one or more motors of the machine such that the at least one controller is configured to control operation of the one or more motors.

13. A method for digging a tree using a tree spoon system, comprising:

positioning the tree spoon system within a trench adjacent to the tree such that a front edge of a tree spoon device of the tree spoon system is proximate to a root ball of the tree and each of a plurality of hydraulic arms of the tree spoon system is in a retracted position, wherein each of the plurality of hydraulic arms comprises a first end and a second end, wherein the first end of each of the plurality of hydraulic arms is secured to a fork carriage coupled to a machine and the second end of each of the plurality of hydraulic arms is secured to the tree spoon device such that the tree spoon device is proximate to the fork carriage when each of the plurality of hydraulic arms is in the retracted position;

altering each of the plurality of hydraulic arms to an at least partially extended position such that at least a portion of a hydraulic arm extender of each of the plurality of hydraulic arms is exposed, wherein altering each of the plurality of hydraulic arms to the at least partially extended position causes the tree spoon device to move away from the fork carriage such that a bottom surface of a box of the tree spoon device slides under at least a portion of the root ball and the at least a portion root ball is received by an opening defined by front edges of parallel first and second side walls configured on opposing lateral sides of the box.

14. The method of claim 13, wherein each of the plurality of hydraulic arms is altered to a fully extended position.

15. The method of claim 13, further comprising:

altering each of the plurality of hydraulic arms to the retracted position while concurrently activating one or more motors of the machine such that the machine moves towards the spoon device as each of the plurality of hydraulic arms is retracted such that the spoon device remains generally stationary.

16. The method of claim 15, further comprising:

inserting one or more telescoping pusher arms between the fork carriage and a movable pusher plate of the tree spoon device, wherein the movable pusher plate is configured perpendicularly relative to the first and second side walls such that a first end of the movable pusher plate is proximate to the first side wall and a second end of the movable pusher plate is proximate to the second side wall, wherein the movable pusher plate is configured to achieve translational movement along a longitudinal axis that is parallel to the first and second side walls, wherein a first end of each of the one or more telescoping pusher arms is secured to the fork carriage and a second end of each of the one or more telescoping pusher arms is secured to the movable pusher plate, wherein each of the one or more telescoping pusher arms comprises a first tubular member and a second tubular member, wherein a diameter of the second tubular member is smaller than a diameter of the first tubular member such that the second tubular member is able to slide within the first tubular member to facilitate alteration of each of the one or more telescoping pusher arms between a retracted position and an extended position, wherein an exposed length of the second tubular member is greater in the extended position than in the retracted position;

altering each of the one or more telescoping pusher arms to a locked state, wherein the position of the first tubular member relative to the second tubular member is fixed in the locked state; and altering each of the plurality of hydraulic arms to the at least partially retracted position such that the movable pusher plate remains generally stationary via one or more forces applied by the one or more telescoping pusher arms as the box of the tree spoon device is pulled towards the fork carriage such that the tree root ball is pushed in the direction of the opening of the box.

17. The method of claim 16, further comprising:

altering each of the one or more telescoping pusher arms to an unlocked state, wherein the second tubular member is able to slide freely within the first tubular member in the unlocked state; and altering each of the plurality of hydraulic arms to the at least partially extended position while simultaneously activating at least one of the one or more motors of the machine such that the machine moves away from the spoon device as each of the plurality of hydraulic arms is extended so that the spoon device remains generally stationary.

18. The method of claim 16, wherein the altering of each of the plurality of hydraulic arms is facilitated by at least one controller.

19. The method of claim 16, wherein the first tubular member and the second tubular member each comprises at least one hole, wherein the locked state is achieved when at least one fastener is received within an aperture defined by alignment of the at least one hole of the first tubular member and the at least one hole of the second tubular member.

20. The method of claim 16, wherein the tree spoon device comprises a plurality of elongated channels, wherein the plurality of elongated channels comprises at least a first elongated channel and a second elongated channel, wherein the first elongated channel is configured along an interior surface of the first side wall and the second elongated channel is configured along an interior surface of the second side wall, wherein the movable pusher plate comprises a plurality of tracks, wherein the plurality of tracks comprises at least a first track and a second track configured on opposing lateral ends of the movable pusher plate, wherein the first track is configured to be slidably received by the first elongated channel and the second track is configured to be slidably received by the second elongated channel.

* * * * *